United States Patent
Donderici

(10) Patent No.: US 10,823,871 B2
(45) Date of Patent: Nov. 3, 2020

(54) ENHANCED RESISTIVITY MEASUREMENT WITH AT-BIT RESISTIVITY SENSOR

(71) Applicant: Halliburton Energy Services, Inc., Houston, TX (US)

(72) Inventor: Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1104 days.

(21) Appl. No.: 14/357,740

(22) PCT Filed: Nov. 9, 2012

(86) PCT No.: PCT/US2012/064405
§ 371 (c)(1),
(2) Date: May 12, 2014

(87) PCT Pub. No.: WO2013/074411
PCT Pub. Date: May 23, 2013

(65) Prior Publication Data
US 2014/0350858 A1    Nov. 27, 2014

Related U.S. Application Data

(63) Continuation-in-part of application No. PCT/US2011/060866, filed on Nov. 15, 2011.

(51) Int. Cl.
*G01V 3/38*        (2006.01)
*G01V 3/28*        (2006.01)
(Continued)

(52) U.S. Cl.
CPC .................. *G01V 3/38* (2013.01); *E21B 7/04* (2013.01); *G01V 3/26* (2013.01); *G01V 3/28* (2013.01)

(58) Field of Classification Search
CPC .. G01V 3/28; G01V 3/26; E21B 47/01; E21B 7/04
(Continued)

(56) References Cited

U.S. PATENT DOCUMENTS

| 5,279,365 A | 1/1994 | Yenulis et al. |
| 5,594,343 A | 1/1997 | Clark et al. |

(Continued)

FOREIGN PATENT DOCUMENTS

| AU | 2011381036 B2 | 8/2015 |
| AU | 2012339893 B2 | 3/2016 |

(Continued)

OTHER PUBLICATIONS

"Canadian Application Serial No. 2,855,305, Amendment and Response filed May 27, 2016 to Office Action dated Feb. 22, 2016", 39 pgs.

(Continued)

*Primary Examiner* — Regis J Bestsch
*Assistant Examiner* — Kaleria Knox
(74) *Attorney, Agent, or Firm* — Gilliam IP PLLC

(57) ABSTRACT

A deep measurement electromagnetic antenna array is operated to acquire, formation signals which depend on properties of a geological formation. Formation signals are also acquired from an at-bit resistivity (ABR) sensor, where the ABR sensor comprises a drill bit electrically coupled to a toroid or to multiple electrodes, where the electrodes are separated by at least one gap. Inverting the values of the formation signals transforms the values into an enhanced resistivity measurement of the geological formation, wherein inverting comprises determining at least one of relative distance between layers of the geological formation, relative orientation of the layers to a housing, or a resistivity gradient of the layers, wherein the layers are not locally penetrated by the bit. An ABR sensor together with a deep (Continued)

measurement electromagnetic antenna array improves look-ahead resistivity calculations upon inversion.

40 Claims, 35 Drawing Sheets

(51) Int. Cl.
  *E21B 7/04* (2006.01)
  *G01V 3/26* (2006.01)
(58) Field of Classification Search
  USPC .............................. 324/339, 338; 340/856.3
  See application file for complete search history.

(56) References Cited

U.S. PATENT DOCUMENTS

| | | | |
|---|---|---|---|
| 5,881,310 | A | 3/1999 | Airhart et al. |
| 6,181,138 | B1 | 1/2001 | Hagiwara et al. |
| 7,093,672 | B2 | 8/2006 | Seydoux et al. |
| 7,525,315 | B2 | 4/2009 | Fredette et al. |
| 7,599,825 | B2 | 10/2009 | Yang et al. |
| 7,686,099 | B2 | 3/2010 | Rodney |
| 7,755,361 | B2 | 7/2010 | Seydoux et al. |
| 8,902,703 | B2 | 12/2014 | Rodney et al. |
| 2003/0071626 | A1 | 4/2003 | Omeragic et al. |
| 2005/0034917 | A1 | 2/2005 | Mathiszik et al. |
| 2006/0033502 | A1 | 2/2006 | Bittar |
| 2007/0052551 | A1 | 3/2007 | Lovell et al. |
| 2008/0136419 | A1 | 6/2008 | Seydoux et al. |
| 2010/0097065 | A1 | 4/2010 | Itskovich et al. |
| 2010/0156424 | A1* | 6/2010 | Bittar ................. G01V 3/28 324/339 |
| 2010/0176812 | A1 | 7/2010 | Bittar et al. |
| 2010/0213943 | A1 | 8/2010 | Georgi et al. |
| 2011/0133740 | A1* | 6/2011 | Seydoux ............. G01V 3/28 324/338 |
| 2011/0238312 | A1 | 9/2011 | Seydoux et al. |
| 2011/0298461 | A1 | 12/2011 | Bittar et al. |
| 2012/0024600 | A1 | 2/2012 | Bittar et al. |
| 2012/0166086 | A1 | 6/2012 | Zhong et al. |
| 2012/0186873 | A1 | 7/2012 | Shayegi et al. |
| 2012/0298420 | A1 | 11/2012 | Seydoux et al. |

FOREIGN PATENT DOCUMENTS

| | | | | |
|---|---|---|---|---|
| CN | | 1891979 A | 1/2007 | |
| CN | | 101124489 A | 2/2008 | |
| CN | | 101918863 A | 12/2010 | |
| CN | | 101932955 A | 12/2010 | |
| CN | | 102140889 A | 8/2011 | |
| CN | | 103477247 A | 12/2013 | |
| EP | | 0314573 B1 | 1/1993 | |
| WO | WO-2011/043851 | A1 | 3/1999 | |
| WO | WO-2009/029517 | A3 | 1/2007 | |
| WO | | 2010074678 A2 | 7/2010 | |
| WO | WO-2011/049828 | A2 | 4/2011 | |
| WO | WO-2011090481 | A1 * | 7/2011 | ............. E21B 47/01 |
| WO | WO-2012/102705 | A1 | 8/2012 | |
| WO | WO 2013/074411 | A3 | 5/2013 | |
| WO | WO-2013074091 | A1 | 5/2013 | |
| WO | WO-2013074411 | A2 | 5/2013 | |

OTHER PUBLICATIONS

"Chinese Application Serial No. 200980130106.0, Office Action dated May 5, 2016", (w/ English Translation), 12 pgs.
"Canadian Application Serial No. 2,855,305, Office Action dated Feb. 22, 2016", 3 pgs.
"Canadian Application Serial No. 2,855,305, Office Action dated Jun. 10, 2015", 5 pgs.
"Canadian Application Serial No. 2,855,305, Response filed Nov. 12, 2015 to Office Action dated Jun. 10, 2015", 32 pgs.
"Australian Application Serial No. 2011381036, First Examiner's Report dated May 20, 2015", 3 pgs.
"Australian Application Serial No. 2012339893, First Examiner's Report dated May 16, 2015", 3 pgs.
"European Application Serial No. 11788300.9, Office Action dated Apr. 7, 2015", 5 pgs.
Chemali, R., et al., "Real Time Deep Electrical Images, a Highly Visual Guide for Proactive Geosteering", *AAPG GEO 2010 Middle East Geoscience Conference & Exhibition Innovative Geoscience Solutions—Meeting Hydrocarbon Demand in Changing Times*, Mar. 7-10, 2010—Manama, Bahrain, [online]. [retrieved on Mar. 26, 2015]. Retrieved from the Internet: http://www.searchanddiscovery.com/abstracts/html/2010/geo_bahrain/abstracts/Chemali.html>, (2010), 7 pgs.
Seifert, Douglas, et al., "SPE/IADC 140327 Hydrocarbon Reservoirs Where Proactive Geosteering is Most Likely to Succeed", *SPE/IADC Drilling Conference and Exhibition*, Mar. 1-3, Amsterdam, The Netherlands, (2011), 1-10.
"Chinese Application Serial No. 201180074874.6, Response filed Jul. 20, 2016 to Office Action dated May 5, 2016", (w/ English Translation of Claims), 18 pgs.
"European Application Serial No. 11788300.9, Office Action dated Jul. 12, 2016", 6 pgs.
"European Application Serial No. 12849836.7, Extended European Search Report dated Jul. 19, 2016", 8 pgs.
Bittar, M, et al., "A New Azimuthal Deep-Reading Resistivity Tool for Geosteering and Advanced Formation Evaluation", *SPE Reservoir Evaluation and Engineering*, vol. 12, No. 2, (Apr. 2009), 270-279.
Tang, Yumei, et al., "An efficient multi-boundaries determination method for geosteering complex reservoirs", *SEG Las Vegas 2012 Annual Meeting, Technical Program Expanded Abstracts*, (2012), 1-5.
"Australian Application Serial No. 2012339893, Response filed Mar. 1, 2016 to First Examiner's Report dated May 16, 2015", 17 pgs.
"Chinese Application Serial No. 201180074874.6, Response filed Jan. 15, 2016 to Office Action dated Jun. 30, 2015", (w/ English Translation of Claims), 32 pgs.
"Malaysian Application Serial No. PI 2014001257, Preliminary Examination Report dated Oct. 16, 2014", 2 pgs.
"International Application Serial No. PCT/US2011/060866, International Search Report dated Jul. 4, 2012", 4 pgs.
"International Application Serial No. PCT/US2011/060866, Written Opinion dated Jul. 4, 2012", 6 pgs.
"International Application Serial No. PCT/US2012/064405, International Preliminary Report on Patentability dated Nov. 22, 2013", 8 pgs.
"International Application Serial No. PCT/US2012/064405, International Search Report dated Jan. 25, 2013", 2 pgs.
International Application Serial No. PCT/US2012/064405, Written Opinion dated Jan. 25, 2013, 5 pgs.
Bittar, M., et al., "A New Azimuthal Deep-Reading Resistivity Tool for Geosteering and Advanced Formation Evaluation", SPE Reservoir Evaluation & Engineering, 12(2), (Apr. 2009), 270-279.
Netto, et al., "Landing a well using a deep electromagnetic directional LWD tool. Can we spare a pilot well?", SPWLA 53rd Annual Logging Symposium, Jun. 16-20, 2012, (2012).
Ortenzi, et al., "New Azimuthal Resistivity and High-Resolution Imager Facilitates Formation Evaluation and Well Placement of Horizontal Slim Boreholes", SPWLA 52nd Annual Logging Symposium, [Online]. Retrieved from Internet: <http://www.slb.com/-/media/Files/drilling/technical_papers/spwla2011_new_azimuthal_res.pdf>, (May 2011).
Zimmer, C., et al., "Drilling a Better Pair: New Technologies in SAGD Directional Drilling", Canadian Unconventional Resources and International Petroleum Conference, Oct. 19-21, 2010, Calgary, Alberta, Canada, (Oct. 2010), 1-22.
"Brazilian Application Serial No. 1120140117284, Amendment filed Jun. 6, 2014", 8 pgs.
"Chinese Application Serial No. 201180074874.6, Voluntary Amendment filed Oct. 29, 2014", (w/ English Translation of the Claims), 21 pgs.

(56) References Cited

OTHER PUBLICATIONS

"European Application Serial No. 11788300.9, Office Action dated Jul. 15, 2014", 2 pgs.
"European Application Serial No. 11788300.9, Response filed Dec. 5, 2014 to Office Action dated Jul. 15, 2014", 44 pgs.
"International Application Serial No. PCT/US2011/060866, International Preliminary Report on Patentability dated May 30, 2014", 8 pages.
"International Application Serial No. PCT/US2012/064405, Response filed Sep. 9, 2013 to Written Opinion dated Jan. 25, 2013", 3 pgs.
Iversen, M., et al., "Geosteering using Ultradeep Resistivity on the Grane Field, Norwegian North Sea", *Petrophysics*, 45(3), (May-Jun. 2004), 232-240.
Chinese Application Serial No. 201280067107.7; Chinese Office Action; dated Apr. 8, 2018, 8 pages.
Chinese Application Serial No. 201610027111.0; First Examination Report; dated May 16, 2018, 15 pages including English translation.
GCC Application Serial No. 2012/22769; Third Examination Report; dated Mar. 22, 2018, 4 pages.
Malaysian Application Serial No. PI2014001257; Substantive Clear Report; dated Jul. 31, 2018, 2 pages.
Indian Application Serial No. 3833/DELNP/2014; Examination Report; dated Dec. 6, 2018, 6 pages.
CN Application Serial No. 201280067107.7, Notice of Reexamination, dated Jun. 18, 2019, 10 pages.
Indian Application Serial No. 4011/DELNP/2014; Notice of Hearing; dated May 8, 2019, 2 pages.
European Application Serial No. 11788300.9; Communication Pursuant to Article 94(3); dated Aug. 9, 2019, 4 pages.
"Gulf Cooperation Council Application Serial No. 2012-22769, Second Examiner Report dated Jul. 25, 2017", 4 pages.
"Gulf Cooperation Council Application Serial No. 2013-25764, First Examination Report dated May 31, 2017", 4 pages.
"Malaysian Application Serial No. PI2014001257; Examination Report dated Sep. 29, 2017", 3 pages.
"Canadian Application Serial No. 2,854,440, Office Action dated Feb. 6, 2017.", 3 pages.
"Chinese Application Serial No. 201280067107.8, Office Action dated Sep. 28, 2016.", 14 pages.
"European Application Serial No. 12849836.7, Examination Report dated Mar. 30, 2017..", 4 pages.
"Gulf Cooperation Council Application Serial No. 2012-21769, First Examiner Report dated Oct. 26, 2016.", 3 pages.
Borghi, et al., "1 New Logging-While-Drilling Azimuthal Resistivity an d High Resolution Imaging in Slim Holes", The 10th Offshore Mediterranean Conference and Exhibition, Mar. 2011, pp. 1-9.
Chinese Application Serial No. 201610027111.0; Office Action; dated Feb. 19, 2019, 7 pages including English Translation.
Malaysian Application Serial No. PI2014001402; Substantive Exam Adverse Report; dated Jan. 22, 2019, 3 pages.
CN Application Serial No. 201280067107.7, Notice of Reexamination, dated Sep. 19, 2019, 14 pages.
Brazilian Application Serial No. 1120140117284; First Office Action; dated Aug. 30, 2019, 5 pages.
Canadian Application Serial No. 2,987,206; Office Action; dated Jul. 18, 2019, 3 pages.
Bittar, et al., "A New Azimuthal Deep-Reading Resistivity Tool for Geosteering and Advanced Formation Evaluation", SPE Reservoir Evaluation and Engineering,, (Apr. 1, 2009), pp. 1-10; Jan. 4, 2009.
Zimmer, et al., "Drilling a Better Pair: New Technologies in SAGD Directional Drilling", Canadian Unconventional Resources & International Petroleum Conference,, (Oct. 19, 2010), pp. 1-22, XP007920755; Oct. 19, 2010.

\* cited by examiner

```
                    ┌─ 210
┌─────────────────────────────────────────────────────────┐
│  CONTROL ACTIVATION OF A TOOL DISPOSED DOWNHOLE, THE TOOL│
│  HAVING AN ARRANGEMENT OF SPACED APART TRANSMITTER ANTENNAS│
│  AND RECEIVER ANTENNAS OPERABLE IN SELECTED              │
│  TRANSMITTER-RECEIVER PAIRS                              │
└─────────────────────────────────────────────────────────┘
                              │
                    ┌─ 220
┌─────────────────────────────────────────────────────────┐
│  ACQUIRE A DEEP SIGNAL FROM A DEEP MEASUREMENT USING A   │
│  TRANSMITTER-RECEIVER PAIR AND ACQUIRE ONE OR MORE SHALLOW│
│  SIGNALS FROM ONE OR MORE SHALLOW MEASUREMENTS USING ONE │
│  OR MORE OTHER TRANSMITTER-RECEIVER PAIRS                │
└─────────────────────────────────────────────────────────┘
                              │
                    ┌─ 230
┌─────────────────────────────────────────────────────────┐
│  PROCESS THE ONE OR MORE SHALLOW SIGNALS, GENERATING A   │
│  MODELED SIGNAL RELATIVE TO REGIONS ADJACENT SIDES AND   │
│  BACK OF THE TOOL                                        │
└─────────────────────────────────────────────────────────┘
                              │
                    ┌─ 240
┌─────────────────────────────────────────────────────────┐
│  FORM A LOOK-AHEAD SIGNAL SUBSTANTIALLY WITHOUT CONTRIBUTIONS│
│  FROM THE REGIONS ADJACENT THE TOOL BY PROCESSING THE    │
│  DEEP SIGNAL WITH RESPECT TO THE MODELED SIGNAL          │
└─────────────────────────────────────────────────────────┘
```

Fig. 2

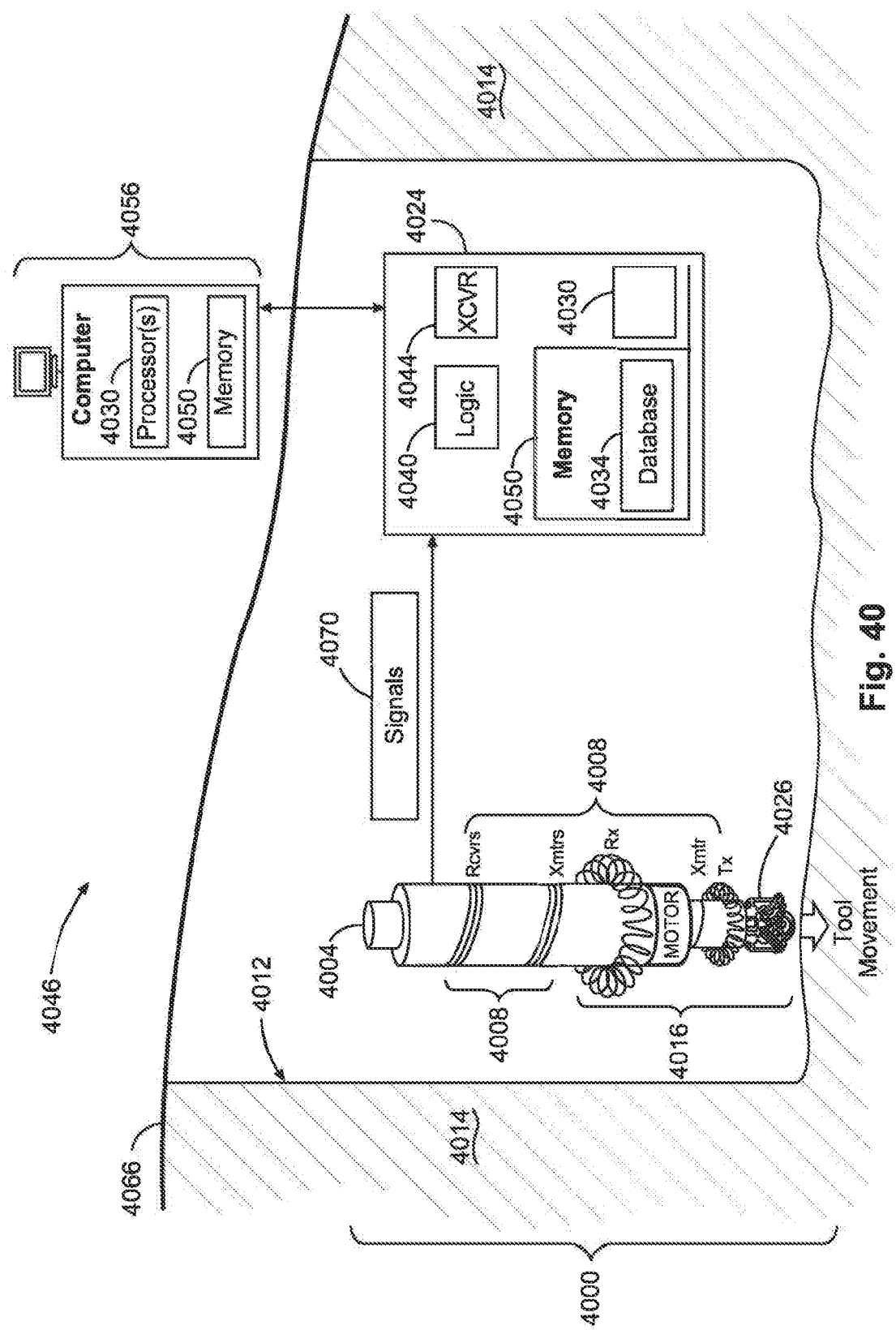

ENHANCED RESISTIVITY MEASUREMENT WITH AT-BIT RESISTIVITY SENSOR

RELATED APPLICATIONS

This application is a U.S. National Stage Filing under 35 U.S.C. 371 from International Application No. PCT/US2012/064405, filed on 9 Nov. 2012, and published as WO 2013/074411 A2 on 23 May 2013, which is a continuation-in-part from International Application Serial Number PCT/US2011/060866, filed 15 Nov. 2011 and claims the benefit of priority to International Application Serial Number PCT/US2011/060866, filed 15 Nov. 2011, entitled "LOOK-AHEAD OF THE BIT APPLICATIONS" from which U.S. application Ser. No. 14/110,683 was filed on 8 Oct. 2013 as a U.S. National Stage Filing under 35 U.S.C. 371; the content of each of the International Applications and their respective publications is hereby incorporated into this application by reference in its entirety.

BACKGROUND

In drilling wells for oil and gas exploration, understanding the structure and properties of the geological formation surrounding a borehole provides information to aid such exploration. Logging is the process of making measurements via sensors located down hole, which can provide valuable information regarding the formation characteristics. However, most down hole tools measure portions of the formation that have already been penetrated by the drill bit, instead of measuring formation characteristics ahead of the bit, prior to penetration.

BRIEF DESCRIPTION OF THE DRAWINGS

FIG. 2 shows features of an example method for a look-ahead of the bit applications in a drilling operation, in accordance with various embodiments.

FIG. 40 is a block diagram of an apparatus and system according to various embodiments of the invention.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
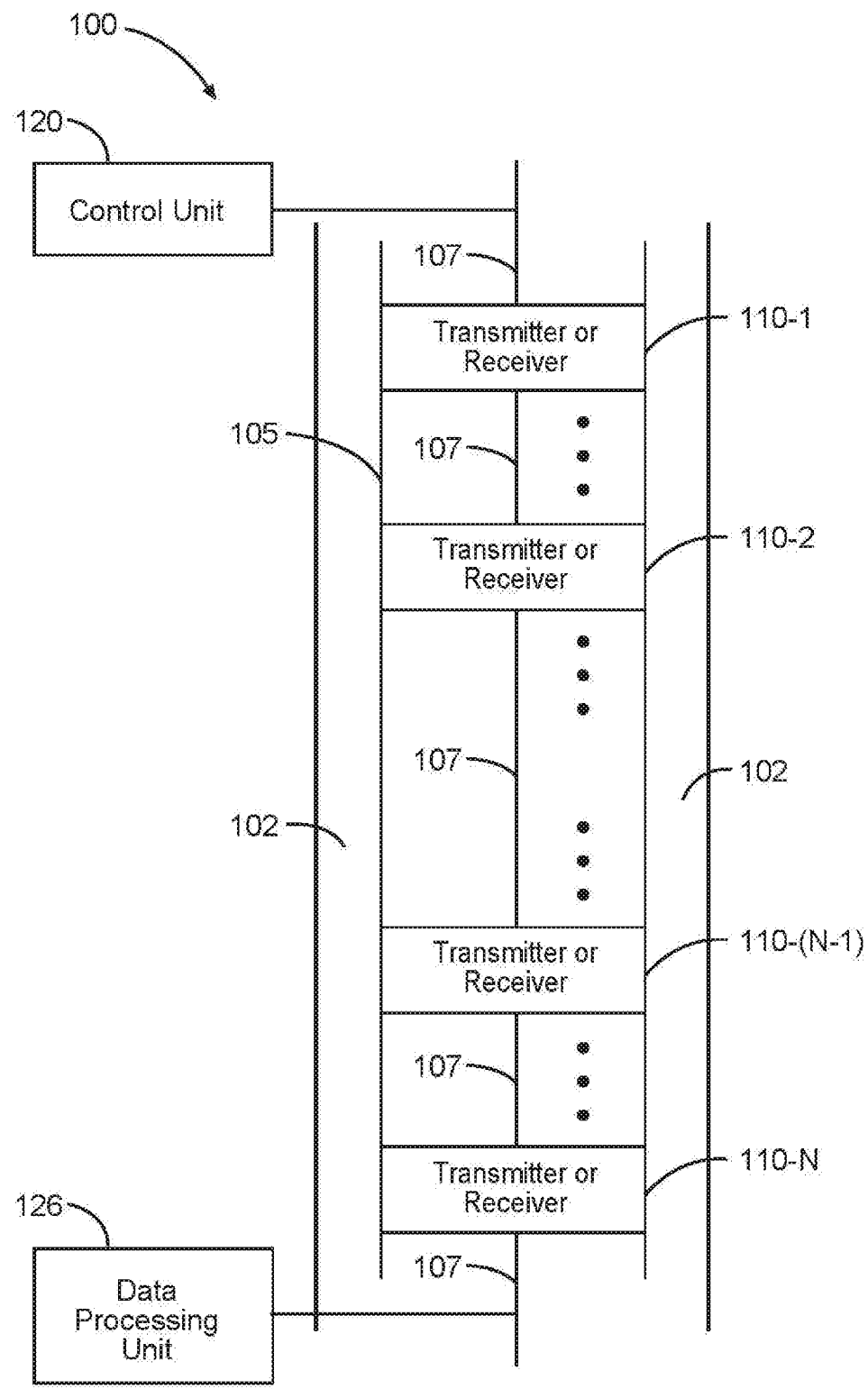
FIG. 1 shows a block diagram of an example apparatus having a tool to make measurements ahead of a drill bit, according to various embodiments.

FIG. 1 shows a block diagram of an embodiment of an apparatus 100 having a tool 105 to make measurements ahead of a drill bit that can be used to determine a look-ahead signal and to determine properties down hole in a well 102. Tool 105 can have an arrangement of transmitters and receivers 110-1, 110-2 . . . 110-(N−1), 110-N structured relative to a longitudinal axis 107 of tool 105. These transmitters and receivers can be operated to capture signals near tool 105 in regions behind tool 105 and regions adjacent to the sides of tool 105. These relatively short range signals can be referred to as shallow signals. These transmitters and receivers also can be operated to capture signals in regions in front of tool 105 and with tool 105 arranged on a drilling structure, the signals captured from in front of tool 105 can include regions ahead of a drill bit. These relatively long range signals, deeper than shallow signals, can be referred to as deep signals. The arrangement of transmitters and receivers 110-1, 110-2 . . . 110-(N−1), 110-N can be operated by selecting transmitters-receivers pairs defined by the spacing between the transmitter and the receiver in each respective pair. Large spacings can be used to probe ahead of the drill bit and acquire deep signals. Smaller spacings can be used to probe in the formation regions around tool 105. A deep signal and a shallow signal may be correlated to the transmitter-receiver spacing, which may in turn be set by the location of the transmitters and receivers behind the drill bit. For example, a shallow measurement may include contributions from regions about one inch to about 10 ft from the tool and a deep measurement may include contributions from regions about 5 ft to about 200 ft from the tool. In making shallow and deep measurements, the deep measurements include contributions from regions farther from the tool than shallow measurements. For example, the deep measurements can provide contributions from distances from the tool that are, but not limit to, at least 25% larger than the distances that provide contributions in the shallow measurements. The difference in contribution distances can be less than or more than 25% larger.

An arrangement of transmitter antennas and receiver antennas can be structured along longitudinal axis 107 of tool 105, which is essentially perpendicular to the cross section of the tool corresponding to the cross section of a collar in a drill string. The arrangement can include the transmitters and receivers spaced apart from each other such that one of the transmitters or receivers is located nearest the drill bit and a last of the transmitters or receivers in the arrangement is the farthest from the drill bit. The one transmitter or receiver nearest the drill bit can be located as close to the drill bit as possible. The closer to the drill bit that the arrangement begins, the formation properties farther away from the drill bit can be determined. The first antenna may be placed on a collar behind the drilling motor. Alternatively, the first antenna may be placed on the drilling motor rather than on a collar behind the drilling motor.

Transmitter-receiver pairs can be arranged, such as by orientation, on tool 105 relative to longitudinal axis 107 of tool 105 by using a special combination of transmitter tilt angle and receiver tilt angle such that signals from the layers between the respective transmitter and receiver of the pair can be cancelled out. The transmitter tilt angle may be the same as the receiver tilt angle or different from the receiver tilt angle. For instance, the receiver may have a zero tilt angle and the transmitter may have a non-zero tilt angle. This arrangement of the transmitter and receiver on tool 105 can make tool 105 insensitive to properties of the region to the side of the tool. Processing of signals acquired by the receiver of the pair in response to a probe signal transmitted by the transmitter of the pair can be implemented to eliminate around-the-tool effects and focus ahead of the bit. Structuring transmitters and their corresponding receivers at a particular layer signal cancelling orientation can be realized for a given dip angle. For transmitters and their corresponding receivers structured at a particular layer signal cancelling orientation for a dip angle of zero degrees, for example, operation at a different dip angle may result in less than complete layer signal cancellation. However, there can be range of dip angles different from the dip angle for which the transmitter and receiver are structured for essentially complete cancellation of the signals from layers at which the signal from the layers is substantially cancelled. Substantial cancellation can include 90% cancellation relative to the optimum cancellation. Transmitters and receivers 110-1, 110-2 . . . 110-(N−1), 110-N of tool 105 can be of sufficient number to allow for transmitter-receivers pairs of different orientation such that an optimum cancellation of a layer signal can be attained by tool 105 for a number of different dip angles.

Look-ahead measurements to provide a look-ahead signal or determine formation properties ahead of the drill bit can be made by tool 105 without using transmitter-receiver pairs oriented such that operation of the transmitter-receiver pairs do not provide layer signal cancellation. Data from one or more shallow measurements can be subtracted from a deep measurement to provide a look-ahead measurement. The data from the look-ahead can be processed to provide a look-ahead signal and to determine formation properties ahead of the drill bit.

Tool 105 can have a plurality of antennas arranged in pairs. A first transmitter-receiver antenna pair can have a spacing between the transmitter and the receiver of the first transmitter-receiver antenna pair in a range from two feet to twenty feet to make a shallow measurement such that layer signals are substantially cancelled out between the transmitter and the receiver of the first transmitter-receiver antenna pair. A second transmitter-receiver antenna pair can have a spacing between the transmitter and the receiver of the second transmitter-receiver antenna pair in a range from twenty feet to a hundred feet to make a deep measurement such that layer signals are substantially cancelled out between the transmitter and the receiver of the second transmitter-receiver antenna pair. The transmitter antenna of the first transmitter-receiver antenna pair is arranged as the transmitter antenna of the second transmitter-receiver antenna pair or the receiver antenna of the first transmitter-receiver antenna pair is arranged as the receiver antenna of the second transmitter-receiver antenna pair.

Apparatus 100 can include a control unit 120 to control activation of the transmitters of tool 105 and reception of signals at the receivers of tools 105. Control unit 105 can be structured to be operable to select antennas of a plurality of antennas in one or more transmitter-receiver pairs arranged to perform one or more deep measurements and one or more shallow measurements when the apparatus is operated down hole in a well. Control unit 120 can be arranged to be operable to select antennas of the plurality in one or more transmitter-receiver pairs arranged to substantially cancel out layer signals between the transmitter antenna and the receiver antenna of the respective transmitter-receiver pair when the tool is operated down hole in a well. Control unit 120 can be arranged to conduct, among other operations using a transmitter antenna and a corresponding receiver antenna, an absolute deep measurement, a ratio deep measurement with an additional receiver, or a compensated deep measurement with an additional receiver and an additional transmitter such that layer signals are substantially cancelled between transmitter and receiver antenna pairs in the respective measurements. Control unit 120 can operate tool 105 having four antennas arranged to make shallow measurements and deep measurements and to substantially cancel out layer signals from operation of the four antennas. Control unit 120 can operate tool 105 having less than four antennas arranged to make shallow measurements and deep measurements and to substantially cancel out layer signals from operation of the four antennas. Control unit 120 can be operated in conjunction with data processing unit 126 to process signals received from the receivers in tool 105.

Data processing unit 126 can be structured to be operable to process data from one or more deep measurements and one or more shallow measurements to generate a look-ahead signal substantially without or substantially without contributions from regions adjacent sides of the tool. Data processing unit 126 can include instrumentalities to perform one or more techniques to process signals from shallow measurements and signals from deep measurements to generate a look-ahead signal. A look-ahead signal is defined as signal correlated to the region ahead of the drill bit associated with a drilling operation. Data processing unit 126 also can use the generated look-ahead signal to determine formation properties ahead of the drill bit. The look-ahead signal and/or the determined formation properties ahead of the drill bit can be used to make geosteering decisions. Geosteering is an intentional control to adjust drilling direction.

The techniques to determine the look-ahead signal and/or the formation properties ahead of the drill bit can include various applications of inversion operations, forward modeling, using synthetic logs, and filtering techniques. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. A synthetic log is a modeled log based on modeled response of the tool in known formation parameters. The synthetic log is created by numerically modeling the interaction of the tool and the formation, usually involving simulation of each depth of the log point by point.

Data processing unit 126 can be arranged to be operable to equalize data from one or more shallow measurements in terms of geometrical factors to the data from one or more deep measurements such that difference between data from the one or more deep measurements and the equalized data from the one or more shallow measurements provides the look-ahead signal. The equalization can be realized via a deconvolution filter. Data processing unit 126 can be arranged to be operable to perform an inversion based on signals from the one or more shallow measurements and signals from the one or more deep measurements and operable to subtract an anticipated deep signal, derived from the inversion, from a measured deep measurement signal to generate the look-ahead signal. Data processing unit 126 can be arranged to be operable to perform an inversion based on signals from the one or more shallow measurements without input from the one or more deep measurements and operable to subtract a signal resulting from the inversion being applied to a forward modeling of a deep configuration to generate the look-ahead signal. Data processing unit 126 can use data attained with transmitter-receiver antenna pairs selected such that a layer signal between the transmitter antenna and the receiver antenna of the respective transmitter-receiver pair is substantially cancelled out in response to the transmitter antenna being operated. Data processing unit 126 can use data attained from transmitter-receiver antenna pairs that do not operate with signal cancellation from layers.

Transmitters and receivers 110-1, 110-2 . . . 110-(N−1), 110-N of tool 105 can be arranged with collocated multiple antennas with different tilt angles. Circuitry and processing devices executing instructions in control unit 120 and data processing unit 126 can be operated to synthetically create tilt angles by combining signals from the collocated multiple antennas with different tilt angles. This scheme allows apparatus 100 to algorithmically optimize signal cancellation for different formation dip angles. Circuitry and processing devices executing instructions in control unit 120 and data processing unit 126 can be operated to synthetically create tilt angles by combining signals from the collocated multiple antennas to synthetically create the tilt angle to cancel signals from layers between the collocated multiple antennas. The optimized signal cancellation can be used to provide a look-ahead signal and evaluation formation properties ahead of a drill bit.

Transmitters and receivers 110-1, 110-2 . . . 110-(N−1), 110-N of tool 105 can be arranged with a set of transmitters and receivers having selected tilt angles such that signals from layers outside the region between the respective transmitters and receivers of this set can be cancelled. This provides an opposite cancellation to the layer signal cancellation between transmitter and corresponding receiver previously discussed. This produces a shallow reading that is focused around the tool and it can be used in the place of other shallow measurements mentioned herein. A transmitter antenna and a receiver antenna can be arranged along a longitudinal axis of tool 105 such that at least one of the transmitter antenna or receiver antenna has a tilt angle with respect to the longitudinal axis of the tool where the orientations of transmitter antenna and the receiver antenna, with respect to the longitudinal axis and with respect to each other, provide for signals from layers outside the region between the respective transmitter and receiver to be operatively cancelled. Circuitry and processing devices executing instructions in control unit 120 and data processing unit 126 can be operated to synthetically create tilt angles by combining signals from the collocated multiple antennas to cancel signals from layers outside the region between the collocated multiple antennas. In applications where signals associated with tilt angles of transmitter and receiver are synthetically generated from collocated antennas with different tilt angles, the same transmitter and receiver pair can be used for both focusing ahead and focusing around tool 105.

Control unit 120 and/or data processing unit 126 can be located at the surface of well 102 operably in communication with tool 105 via a communication mechanism. Such a communication mechanism can be realized as a communication vehicle that is standard for well operations. Control unit 120 and/or data processing unit 126 can be distributed along the mechanism by which tool 105 is placed down hole in well 102. Control unit 120 and/or data processing unit 126 can be integrated with tool 105 such that control unit 120 and/or data processing unit 126 are operable down hole in well 102. Control unit 120 and/or data processing unit 126 can be distributed along tool 105. Such embodiments can provide stable and deep evaluation of formations that have not yet been penetrated by the drill bit during a drilling operation, prevention of dangerous situations such as blowouts, and enhanced recovery of hydrocarbons by providing a geosteering mechanism.

Apparatus 100 can be structured for an implementation in the borehole of a well as a measurements-while-drilling (MWD) system such as a logging-while-drilling (LWD) system. Tool 105 can be located at the drill bit of the drilling operation. Alternatively, apparatus 100 may be configured in a wireline configuration.

FIG. 2 shows features of an example embodiment of a method for a look-ahead of the bit application in a drilling operation. At 210, activation of a tool disposed down hole is controlled, where the tool has an arrangement of spaced apart transmitter antennas and receiver antennas operable in selected transmitter-receiver pairs. Controlling activation of the tool can include selecting operation of transmitter-receiver antenna pairs such that layer signals between the transmitter antenna and the receiver antenna of the respective transmitter-receiver pair are substantially cancelled out in response to the transmitter antenna transmitting a probe signal. Transmitter-receiver antenna pairs can be operated in which signals from layers between the transmitter antenna and the receiver antenna of the respective transmitter-receiver pair are not cancelled with respect to a probe signal from the transmitter.

At 220, a deep signal from a deep measurement using a transmitter-receiver pair is acquired and one or more shallow signals from one or more shallow measurements using one or more other transmitter-receiver pairs are acquired. In situations where there is not a cancellation of layer signals from operating the transmitter, multiple shallow measurements can be made.

At 230, the one or more shallow signals are processed, generating a modeled signal relative to regions adjacent sides and back of the tool. At 240, a look-ahead signal substantially without contributions from the regions adjacent the tool is formed by processing the deep signal with respect to the modeled signal.

Processing the one or more shallow signals and forming the look-ahead signal can include equalizing the one or more shallow signals in terms of geometrical factors to the deep signal such that difference between the deep signal and the equalized one or more shallow signals provides the look-ahead signal. Equalizing the one or more shallow measurements can include generating a shallow to deep translation filter via a deconvolution of shallow geometric factors and deep geometric factors. Processing the one or more shallow signals can include performing an inversion based on the one or more shallow signals and the deep signal such that the modeled signal is derived as an anticipated deep signal from the inversion. Subsequently, forming the look-ahead signal can include subtracting the modeled signal from the deep signal to generate the look-ahead signal. Processing the one or more shallow signals can include performing an inversion based on the one or more shallow signals without input from the deep signal and applying a signal resulting from the inversion to a forward modeling of a deep configuration to provide the modeled signal. Subsequently, forming the look-ahead signal can include subtracting the modeled signal from the deep signal to generate the look-ahead signal.

In various embodiments, an inversion can be conducted using the look-ahead signal and parameters of layers around the tool to generate resistivities and positions of deep layers ahead of a drill bit corresponding to the tool. The look-ahead signal can be analyzed down hole during a drilling operation and a geosteering decision can be made down hole based of the analysis. Alternatively, the geosteering decision can be made at the surface from reviewing the analysis or conducting the analysis at the surface. The surface activities can be conducted via a user interface operable with a display that provides the analysis or portions of the analysis to an operator. Resistivities and positions of deep layers can be generated as the drill bit moves ahead. The drilling operation can be stopped based on a determination that resistivity changes as the drill bit moves ahead exceeds a threshold for resistivity change. Exceeding the threshold may be indicative of dangerous pressure changes ahead of the drill bit.

Generally, all commercially available electromagnetic tools are most sensitive to the formation properties that are in the section between the transmitter and the receiver positions. However, in some applications, it may be desirable to have more sensitivity above or below this section. For example, such sensitivity may be desirable for geosteering. For geosteering, measurements can be made in the vicinity of the drill bit while drilling to guide the well trajectory effectively towards productive zones or to stop drilling before dangerous zones are penetrated. Although several attempts have been made to design tools that are sensitive to formation properties ahead of the bit, in almost all cases, these tools remain more sensitive to formation properties to the side of the tool. As a result, measurements are complicated by formation profile variations around the tool.

Figure 3A:
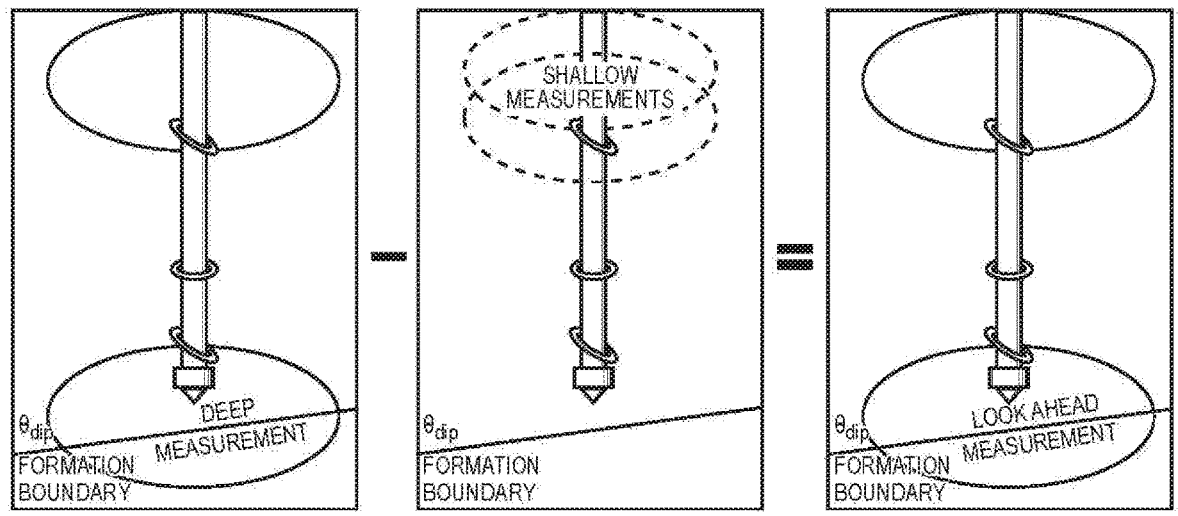
FIGS. 3A and 3B illustrate a look-ahead signal calculation, in accordance with various embodiments.
Figure 3B:
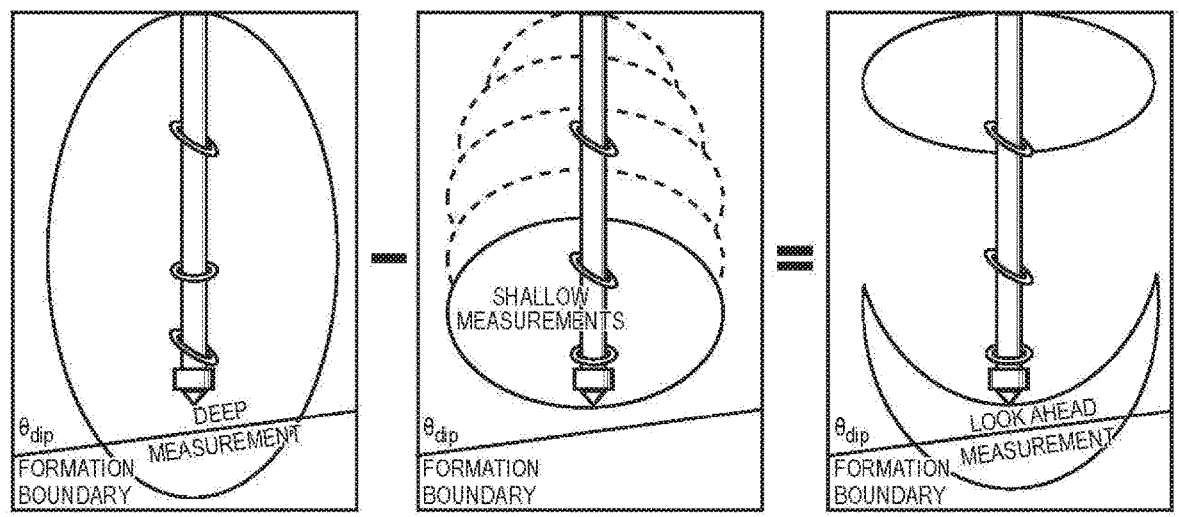

In various embodiments, a process can be implemented to eliminate around-the-tool effects and focus ahead of the bit. This process can be achieved by using a special combination of transmitter tilt angle and receiver tilt angle to cancel out signals from layers that are between transmitter and receiver and make the tool insensitive to properties of the region to the side of the tool. See, for example, FIGS. 4A and 4B. The resulting sensitive areas are shown in the left box of FIG. 3A, where FIG. 3A illustrates a look-ahead measurement from layer signal-cancelling tilt angles. As a second procedure, a separate shallower measurement can be equalized in terms of geometrical factor to the former measurement via a deconvolution filter, and then subtracted from the former measurement. See, for example, the middle and right boxes of FIG. 3A. However, it is noted that the process shown in FIG. 3A can provide significant value to evaluating a drilling operation if shallow measurements are not subtracted. Alternatively, the process can use the subtraction with arbitrary tilt angles without layer signal cancellation as shown in FIG. 3B, which illustrates a look-ahead measurement from arbitrary tilt angles.

Figure 4A:
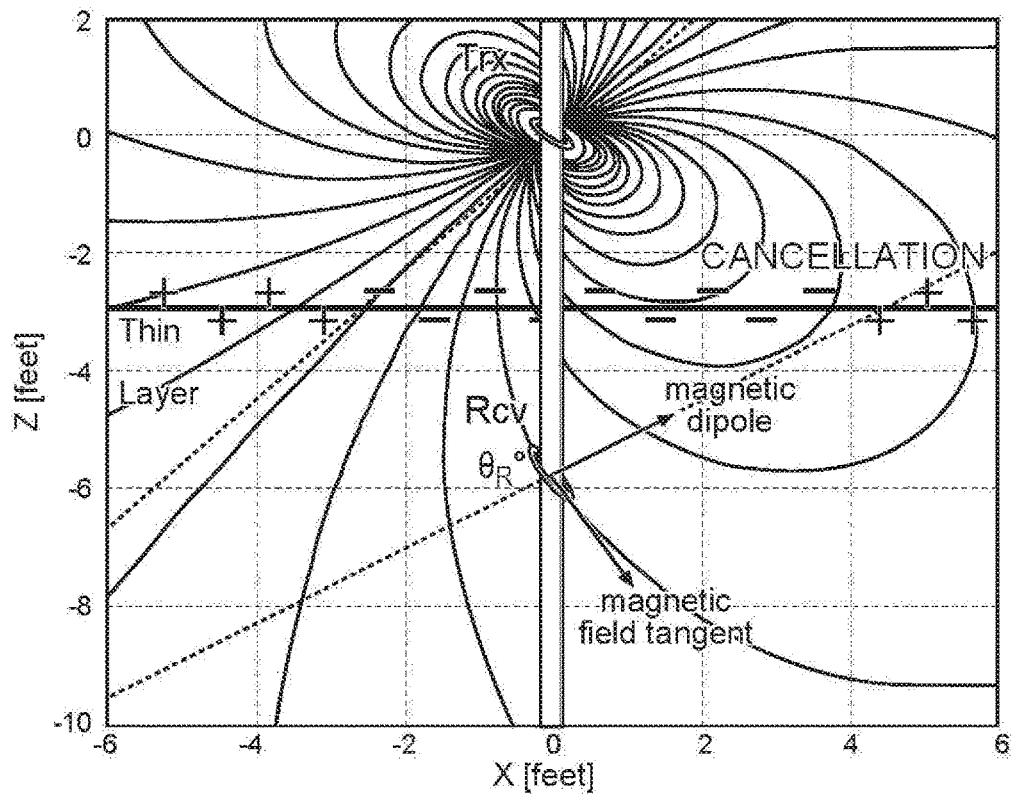
FIGS. 4A and 4B illustrate a layer signal cancellation effect, in accordance with various embodiments.
Figure 4B:
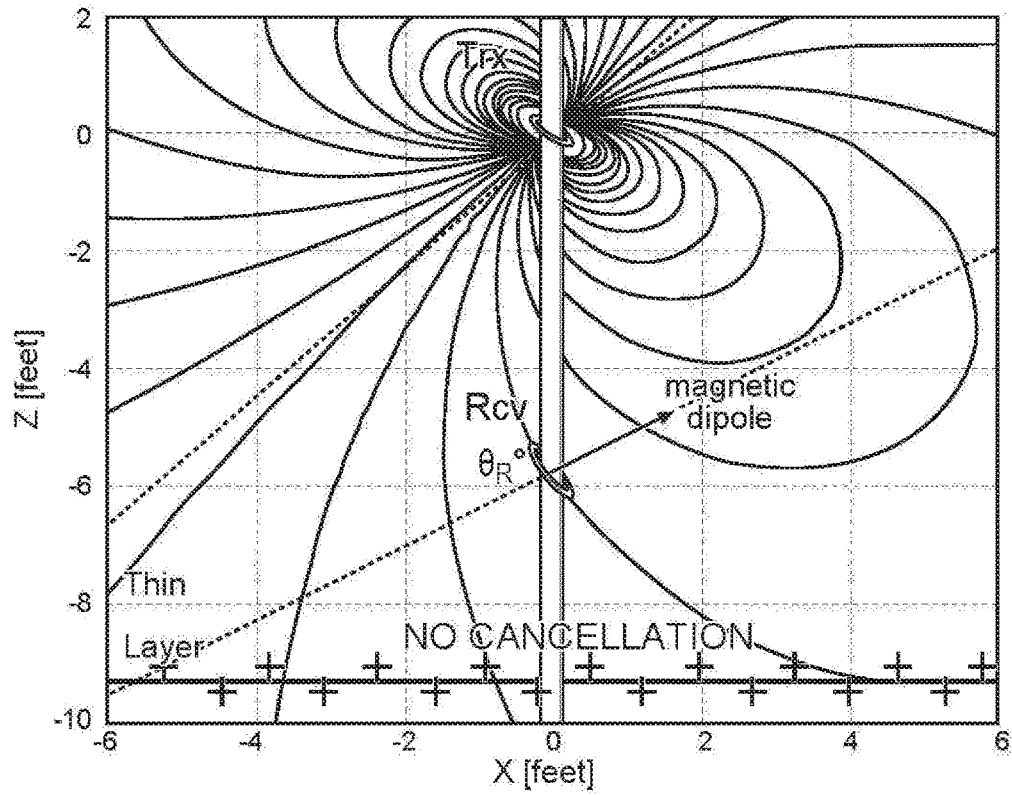

It has been disclosed previously that for a special transmitter and receiver tilt angle combination of a tool, it is possible to cancel out the direct signal from the transmitter to the receiver of the tool. In a different approach in an example embodiment, the signals that are due to formation layers in between the transmitter and receiver are cancelled out. It should be noted that, although this special tilt angle combination does not produce sensitivity reduction when individual points in the three-dimensional space are concerned, it produces sensitivity elimination on planar boundaries with given dip and strike due to layer signal cancellation effects over the surfaces as illustrated in FIGS. 4A and 4B. FIG. 4A illustrates example layer signal cancellation effects with a boundary in between transmitter and receiver. FIG. 4B illustrates example layer signal cancellation effects with a boundary outside transmitter-receiver section. As a result, an embodiment of an example process can be restricted to planar surfaces with known dip and strike angles. It has been observed from studies that even if the surfaces are not perfectly planar, or dip and strike are not precisely known, processes discussed herein can still achieve good cancellation.

Figure 5A:
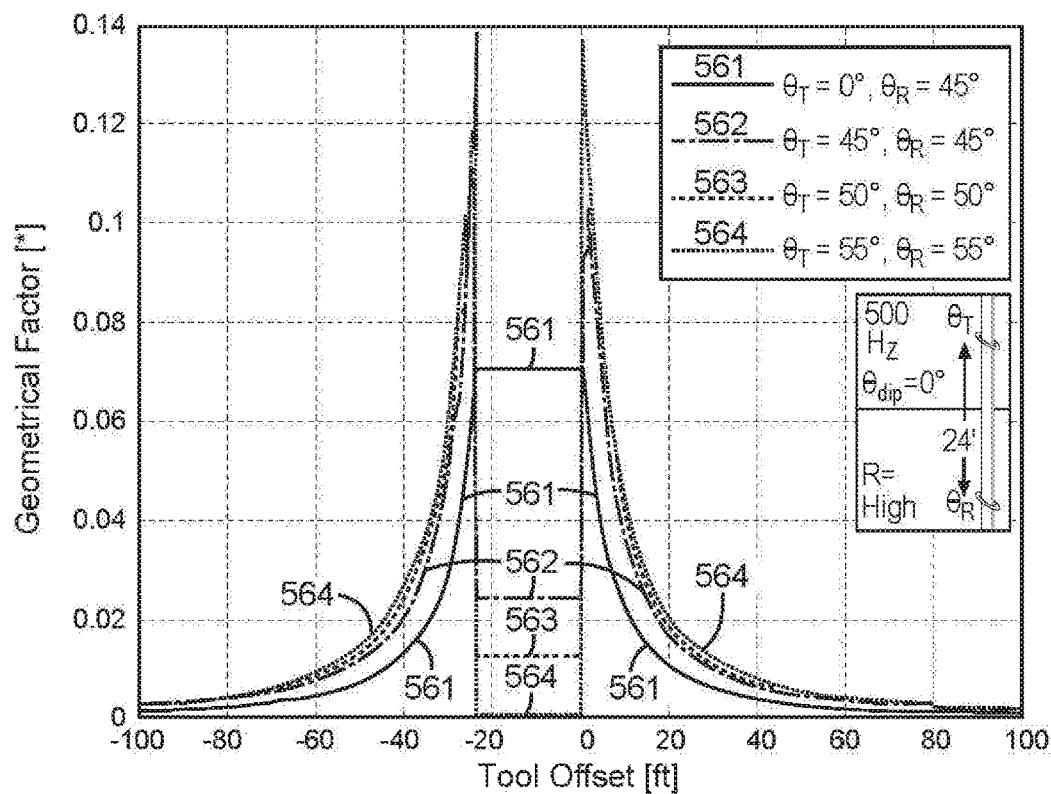
FIGS. 5A and 5B show integrated geometrical factors for a tool, in accordance with various embodiments.
Figure 5B:
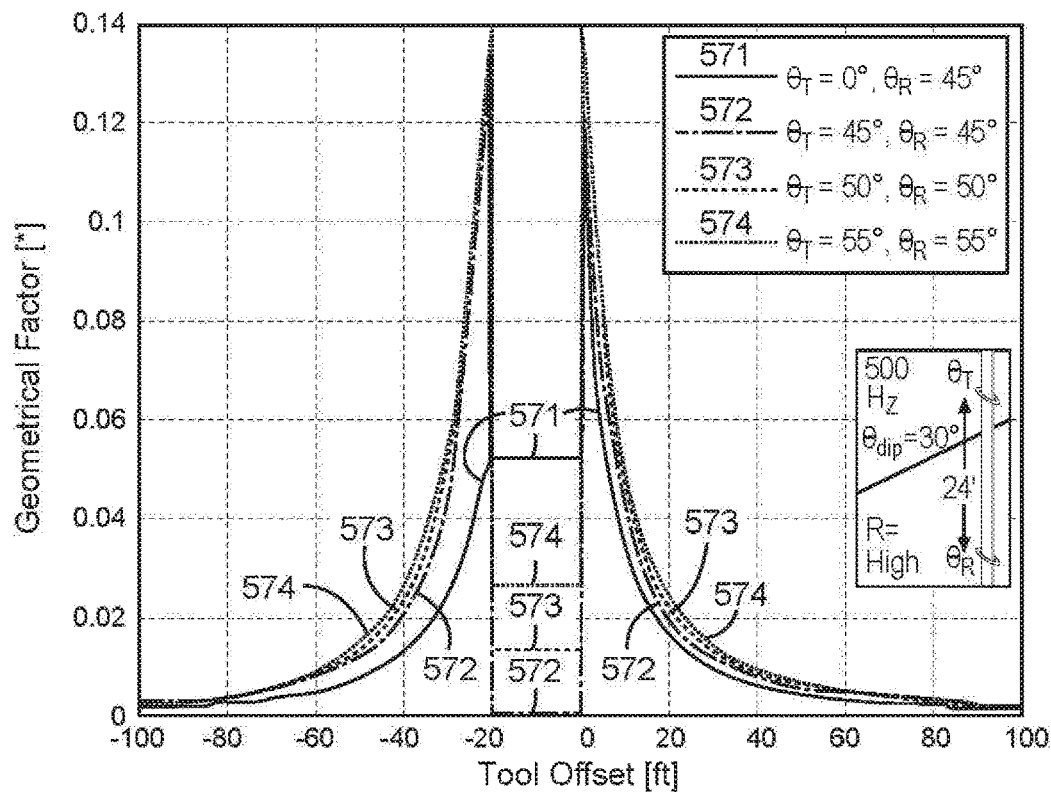

FIGS. 5A and 5B show integrated geometrical factors for a tool. These factors are for a single transmitter, single receiver tool operating at a frequency of f=500 Hz with a spacing of $d_1$=24 feet in a high resistivity region. FIG. 5A shows the integrated (in radial direction) geometrical factors obtained by creating a synthetic log of a very thin low-contrast layer at zero dip angle. Curve 561 is for a transmitter tilt angle of 0° and receiver tilt angle of 45°. Curve 562 is for a transmitter tilt angle of 45° and receiver tilt angle of 45°. Curve 563 is for a transmitter tilt angle of 50° and receiver tilt angle of 50°. Curve 564 is for a transmitter tilt angle of 55° and receiver tilt angle of 55°. It can be seen from FIG. 5A that, at the transmitter and receiver angle of 55°, the geometrical factor diminishes at all positions between the transmitter and the receiver. It should be noted that, although transmitter and receiver tilt is chosen equal in these cases, layer signal cancelling may be achieved with different transmitter and receiver tilt angles. FIG. 5B shows a similar plot but for 30° formation boundary dip angle. Curve 571 is for a transmitter tilt angle of 0° and receiver tilt angle of 45°. Curve 572 is for a transmitter tilt angle of 45° and receiver tilt angle of 45°. Curve 573 is for a transmitter tilt angle of 50° and receiver tilt angle of 50°. Curve 574 is for a transmitter tilt angle of 55° and receiver tilt angle of 55°. In this case, layer signal cancellation can still be achieved, but at a different angle of approximately 45° as shown in curve 572. Even at the non-optimum tilt angle of 55°, a relatively good cancellation is achieved. As a result, a 45 or 55° tilt angle tool is expected to perform well in the dip angle range of 0-30° for the frequency and spacing used. This methodology can be used to design tools that are optimum for different dip angle ranges. It is also important to note that similar optimization process can be used to achieve the opposite cancellation: signal from outside the region between the transmitter and receivers can be cancelled by adjusting the transmitter and receiver tilt angles accordingly. This produces a shallow reading that is focused around the tool and it can be used in the place of any shallow measurement that is mentioned herein. One way to obtain such configuration is to start with the configuration in Curve 561, and decrease the transmitter and receiver tilt angles until sensitivity between the transmitter and the receiver is substantially larger than the signal outside on that region. In the case where signals associated with tilt angles of transmitter and receiver are synthetically generated from collocated antennas with different tilt angles, same transmitter and receiver pair can be used for both focusing ahead and focusing around.

Figure 6:
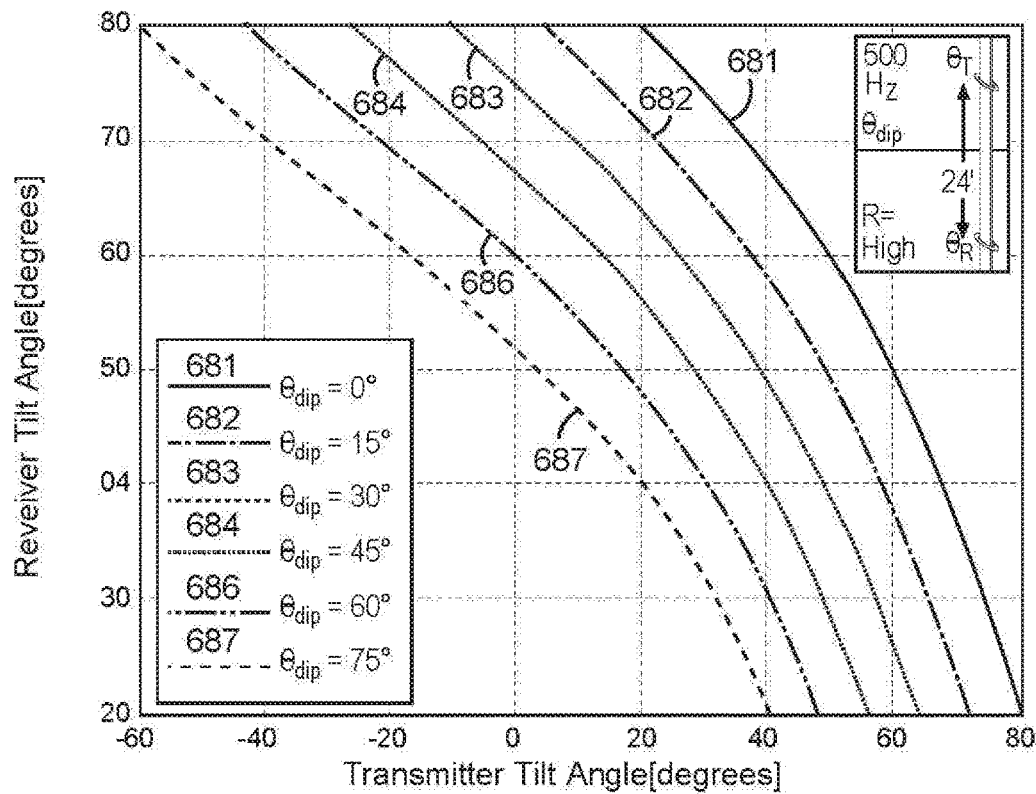
FIG. 6 shows tilt angle combinations that achieve layer signal cancellation effect for different dip angles, where the strike angle of the dip is aligned with dipoles, in accordance with various embodiments.

FIG. 6 shows tilt angle combinations that achieve layer signal cancellation effect for different dip angles, where strike angle of the dip is aligned with dipoles. The transmitter antenna-receiver antenna spacing is 24 ft with operation at 500 Hz in a high resistivity region. Curve 681 is for a dip angle of 30°. Curve 682 is for a dip angle of 15°. Curve 683 is for a dip angle of 30°. Curve 684 is for a dip angle of 45°. Curve 686 is for a dip angle of 60°. Curve 681 is for a dip angle of 75°. It can be seen from FIG. 6 that the cancellation method works up to approximately 60 degrees for a wide range of angle combinations for the configuration used. Multiple transmitters or receivers can be combined to achieve cancellation effect in a wider range. A cross-dipole or tri-axial tool can be used to synthesize dipole vectors at tilt angles that optimally cancel layer signals.

Figure 7:
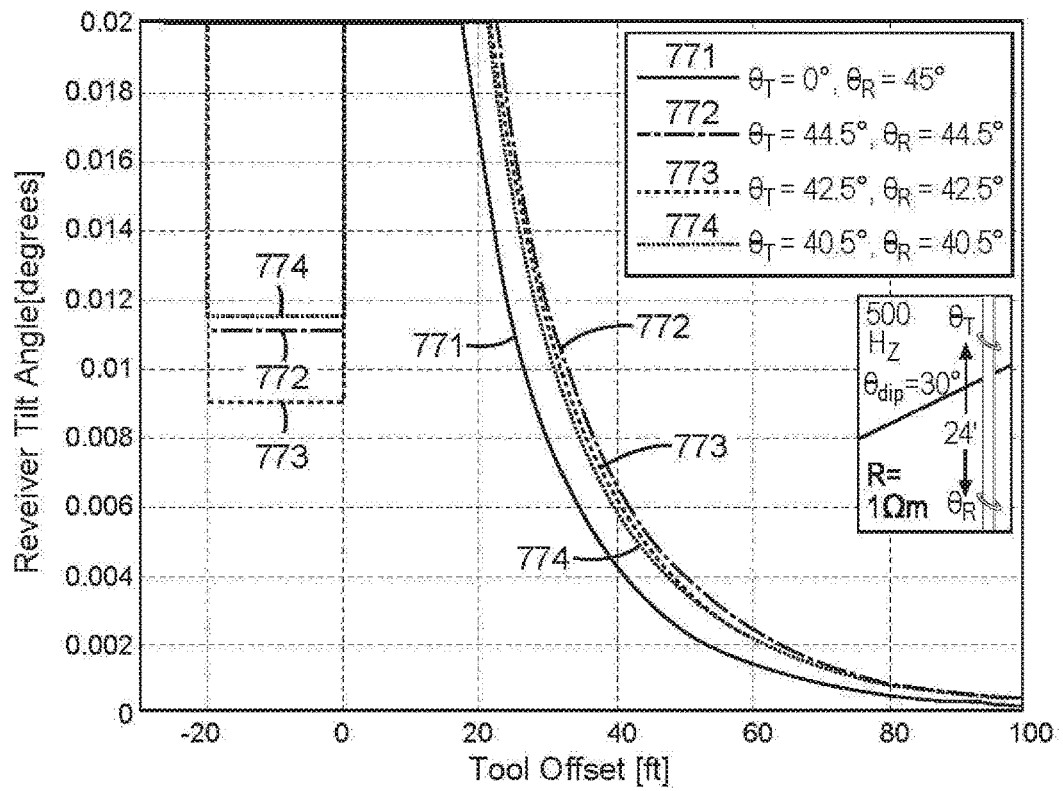
FIG. 7 shows integrated geometrical factors for a highly conductive medium, in accordance with various embodiments.

FIG. 7 shows integrated geometrical factors for a highly conductive medium. These factors are for a tool with a single transmitter, single receiver tool operating at a frequency of f=500 Hz with a spacing of $d_1$=24 feet at dip angle of $\theta_{dip}$=30° in a region having a resistance of R=1 ohm. Curve 771 is for a transmitter tilt angle of 0° and receiver tilt angle of 45°. Curve 772 is for a transmitter tilt angle of 44.5° and receiver tilt angle of 44.5°. Curve 773 is for a transmitter tilt angle of 42.5° and receiver tilt angle of 42.5°. Curve 774 is for a transmitter tilt angle of 40.5° and receiver tilt angle of 40.5°. Although very good cancellation can be achieved for any dipping angle for high resistivity background, a reduction in cancellation performance is observed in highly conductive medium as shown in FIG. 7. Here, the optimum performance is achieved at 42.5° as shown in curve 773. Operation at lower frequencies allows successful cancellation at higher conductivity values.

Figure 8:
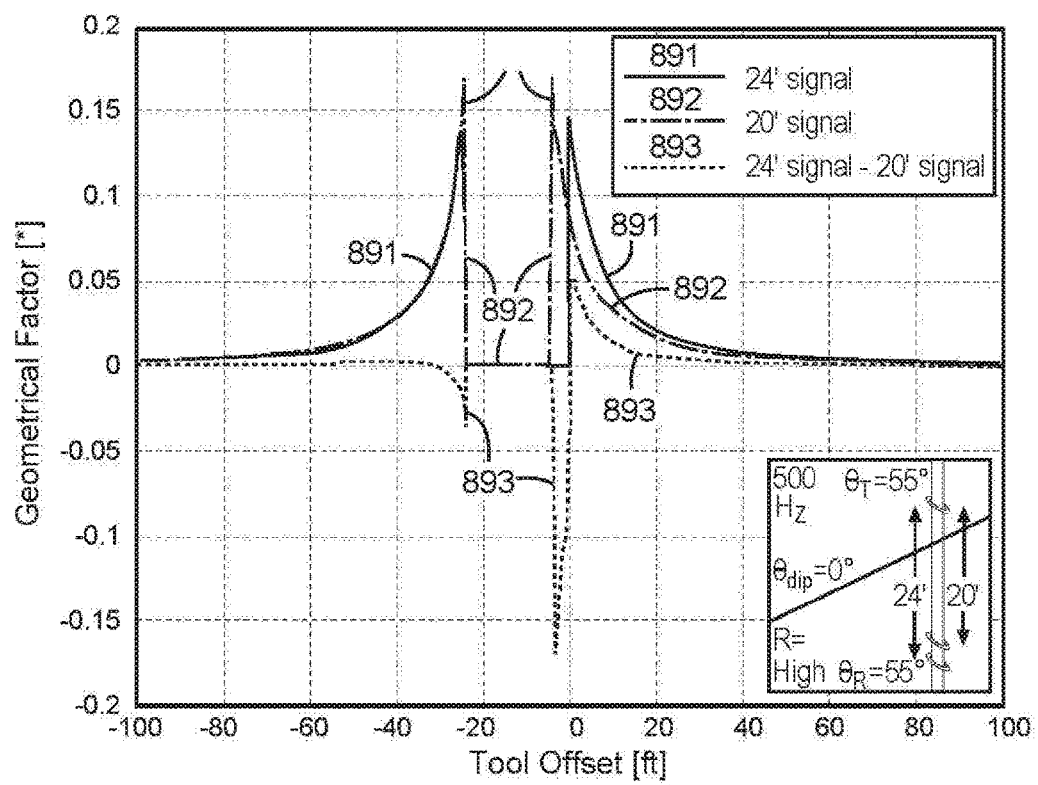
FIG. 8 shows geometrical factors associated with two different spacings, in accordance with various embodiments.

FIG. 8 shows geometrical factors associated with two different spacings. FIG. 8 also shows subtraction of geometrical factors associated with the two different spacings. These factors are for a tool operating at a frequency of f=500 Hz in a high resistivity region at a dip angle of $\theta_{dip}$=0° with a spacing of $d_1$=24 feet, having signal shown in curve 891, and a spacing of $d_1$=20 feet, having signal shown in curve 892. The geometrical factors for the 24 ft spacing are subtracted from the geometrical factors for the 20 ft spacing, indicated in curve 893. It can be seen from FIG. 8 that, by using the subtraction, geometrical factor can be minimized around the back of the tool and focused towards the front. Signals discussed herein are presented in terms of milimhos. Such signals can be obtained by multiplying the voltages by associated tool coefficients using well-known procedures.

Figures 9A, 9B, 9C:
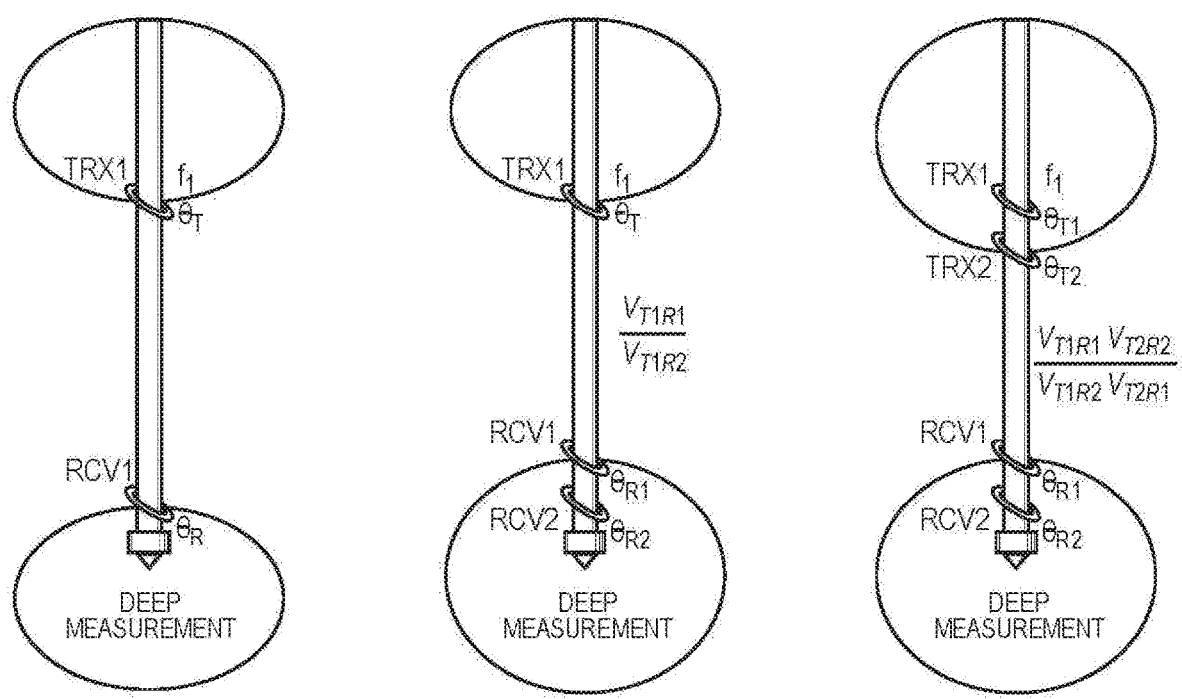
FIGS. 9A-9C show three examples of layer signal cancelling configurations and associated sensitivity regions, in accordance with various embodiments.

FIGS. 9A-9C show three embodiments of layer signal cancelling configurations and associated sensitivity regions. FIG. 9A relates an absolute measurement to a ratio measurement of FIG. 9B and to a compensated measurement of FIG. 9C. The ratio measurement in FIG. 9B may eliminate the need for calibration of the transmitter, since any multiplicative effect on transmitter signal is cancelled out. Tilt angle for both first and second receivers can be adjusted differently for cancellation. Simultaneous cancellation can be achieved at both receivers. The compensated measurement in FIG. 9C can further eliminate a requirement for calibration on both the transmitters and receivers, and can also remove the multiplicative temperature variations on the receivers. Simultaneous cancellation can be achieved at both receivers for both transmitters, especially when distance between antennas in front of the tool and back of the tool is kept small. In various embodiments, one of the antennas can be placed as close as possible to the bit to increase depth of detection ahead of the bit.

Figure 10A:
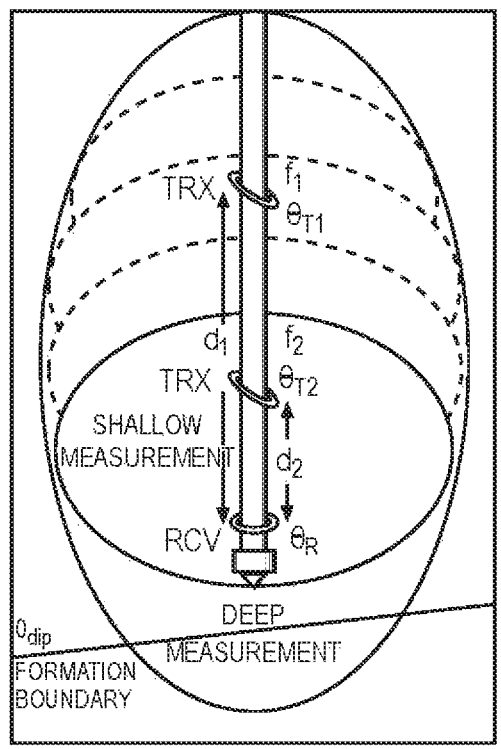
FIGS. 10A and 10B show examples of basic configurations of a deep measurement and a shallow measurement, in accordance with various embodiments.
Figure 10B:
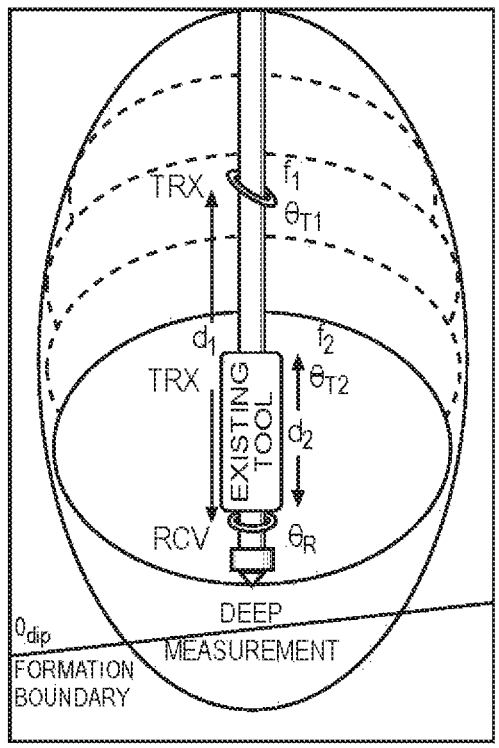

FIGS. 10A and 10B show examples of configurations of a deep measurement and a shallow measurement. In general, a total of four antennas can be used: a transmitter and a receiver for shallow measurements and a transmitter and a receiver for deep measurements. However, as shown in FIG. 10A, a common transmitter or receiver can be used to reduce the number of antenna elements. A deep measurement has a sensitivity that extends farther than a shallow measurement and receives signals earlier than the shallow measurement, as drilling commences. A deep measurement typically has longer transmitter-receiver spacing when compared to a shallow measurement; however, this is not absolutely required. Lower operating frequencies can provide for larger distances of investigation than higher frequencies for the same transmitter-receiver antenna pair. Typical transmitter/receiver spacing for deep measurement is 20-100 feet, while the transmitter/receiver spacing for shallow measurement is 2 feet to 20 feet. Shallow spacing can be large enough to allow compensation for sensitivity to borehole and invasion effects. To ensure optimum focusing, shallow measurement should be made as close as possible to the drill bit. Deep sensitivity increases with increasing transmitter and receiver tilt angles, however this also amplifies borehole and mandrel effects. At least one of transmitter or receiver can be tilted to produce azimuthal sensitivity. Azimuthal sensitivity is important for a geosteering application, since it allows for determination of a distinction between signals coming from different directions. Typical frequency ranges for shallow and deep measurements include 500 Hz-10 MHz and 50 Hz-100 KHz, respectively. Multiple frequencies can be used for differentiating different deep layer distances. FIG. 10B indicates that an existing tool configuration, such as a commercially available tool, can be used for shallow or deep measurements. Such a tool can be realized by an azimuthal deep resistivity (ADR) sensor.

An ADR sensor having tilted antennas in an azimuthal array can acquire measurements in a number of discrete directions, called bins or bin directions, allowing for a number of different depths of investigation to determine distance and direction to multiple bed boundaries. For example, an ADR can be arranged with transmitters and receivers to use 32 discrete directions and 14 different depths of investigation. However, ADR arrangements can use more or less than 32 discrete directions and/or more or less than 14 different depths of investigation. An ADR sensor can add a dimension to measurements by using tilted receiver antennas and acquiring data from all possible transmitter-to-receiver spacings a number of times (corresponding to the number of bins) per tool revolution. Tilt of the receivers confers directional sensitivity to the array of ADR sensors. Deeper readings provided by the ADR can improve reaction time, allowing for increased drilling speed. An ADR sensor can provide fully compensated petrophysical-quality resistivity measurements and deep reading geosteering measurements combined in one tool to minimize bottom hole assembly (BHA) length. The azimuthal readings provide for derivation of anisotropy resistivity values, $R_h$ (horizontal) and $R_v$ (vertical), and dip.

Figure 11:
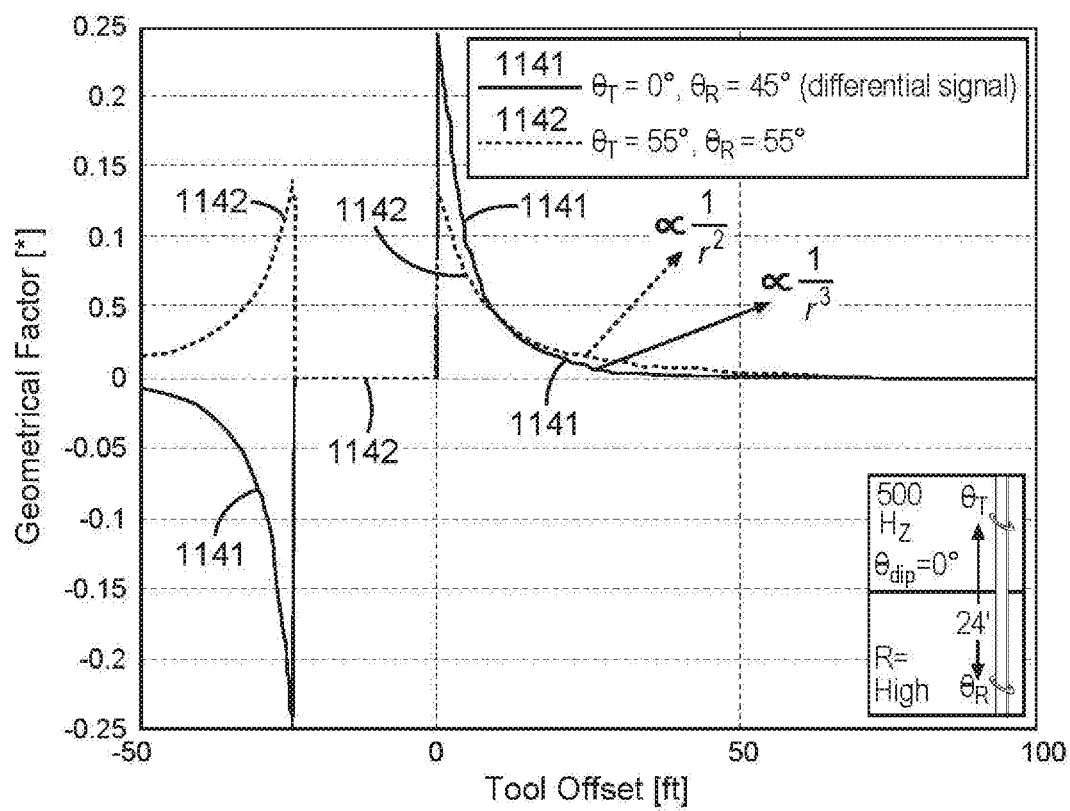
FIG. 11 shows a comparison of a time lapse differential measurement versus a layer signal cancelling measurement, in accordance with various embodiments.

FIG. 11 shows a comparison of a time lapse differential measurement versus a layer signal cancelling measurement. The layer signal cancelling measurement in this example is made with transmitter tilt angle and receiver tilt angle at 55° operating at 500 Hz in a high resistivity region, where its signal is represented by curve 1142. The time lapse differential measurement in this example is made with transmitter tilt angle at 0° and receiver tilt angle at 45°, where the differential signal is represented by curve 1141. The time lapse differential measurement can be calculated by subtracting the signal received at one tool position from another tool position 0.2 inches away. It can be seen from FIG. 11 that layer signal cancelling measurement can focus much deeper due to second order decay with respect to depth, when compared to third order decay of the differential time-lapse measurement.

Figure 12:
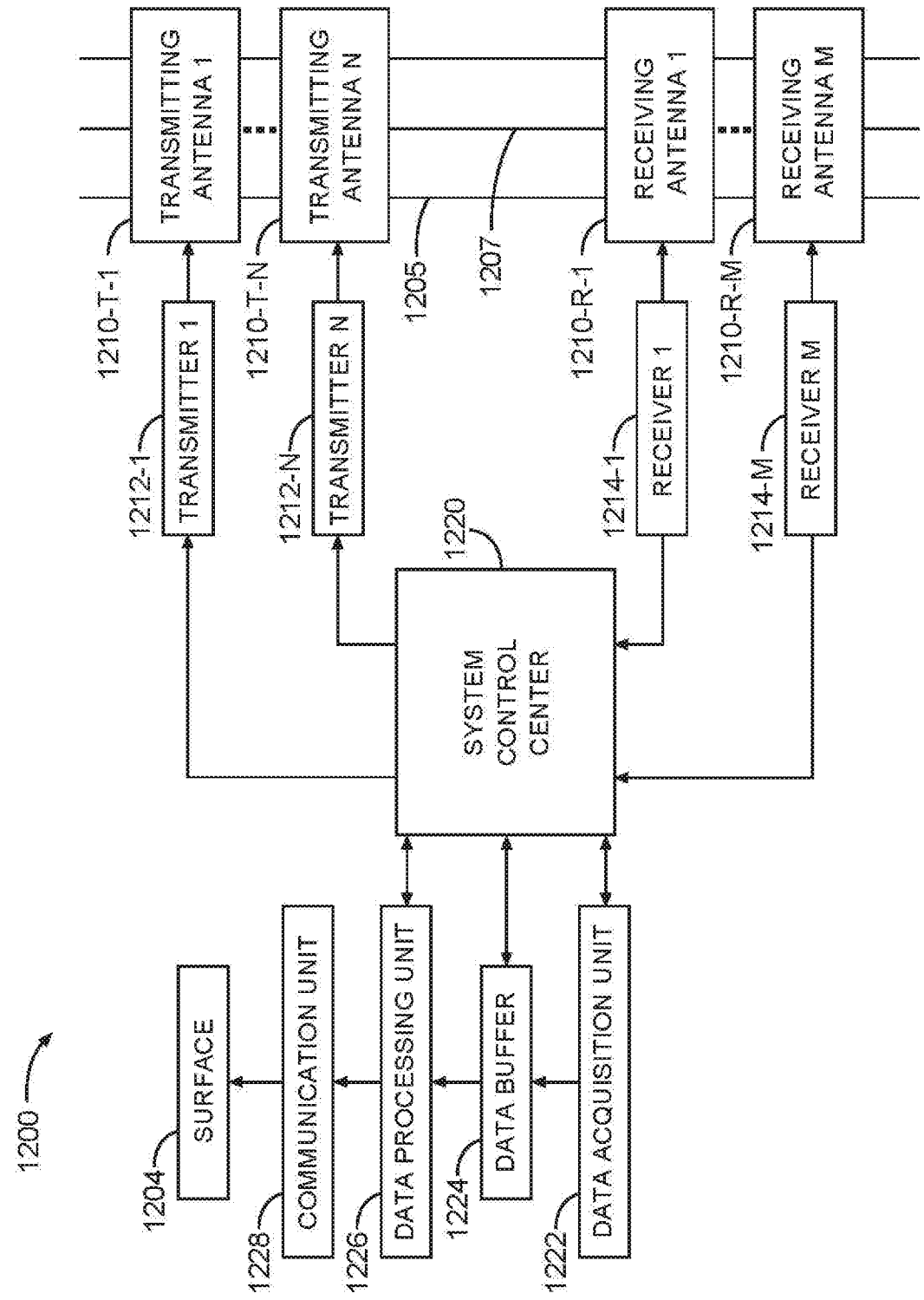
FIG. 12 shows an example data acquisition system, in accordance with various embodiments.

FIG. 12 shows a block diagram of an embodiment of an apparatus 1200, such as a data acquisition system, having a tool 1205 with transmitting antennas 1210-T-1 . . . 1210-T-N and receiving antennas 1210-R-1 . . . 1210-R-M, operable in a borehole in which tool 1205 is placed. Transmitting antennas 1210-T-1 . . . 1210-T-N and receiving antennas 1210-R-1 . . . 1210-R-M can be configured along tool 1005 such that each has a tilt angle with respect to longitudinal axis 1207 of tool 1005. Transmitter antennas or receiver antennas may have a tilt angle of zero degrees. At least one combination of a transmitting antenna and a receiving antenna can be arranged with tilt angles such that the transmitting antenna and the receiving antenna of the combination are arranged to cancel out signals from layers that are between the transmitting antenna and the receiving antenna of the combination and make tool 1205 insensitive to properties of the region to the side of tool 1205, when tool 1205 is operatively disposed down hole in a well. The tilt angles of the transmitting antenna and the receiving antenna of the combination can be different. At least one combination of a transmitting antenna and a receiving antenna can be arranged with tilt angles such that the transmitting antenna and the receiving antenna of the combination are arranged to cancel out signals from layers outside the region between the transmitting antenna and the receiving antenna of the combination, when tool 1205 is operatively disposed down hole in a well. The tilt angles of the transmitting antenna and the receiving antenna of the combination can be different. Transmitting antennas 1210-T-1 . . . 1210-T-N and receiving antennas 1210-R-1 . . . 1210-R-M may include collocation of antennas with different tilt angles in which one or more tilt angles are synthetically created and signal cancellation is realized synthetically. The synthetic cancellation can be for signals from layers between the collocated antennas or from signals from layers outside the region between the collocated multiple antennas.

Apparatus 1200 can include a system control center 1220, transmitters 1212-1 . . . 1210-N, receivers 1214-1 . . . 1214-M, a data acquisition unit 1222, a data buffer 1224, a data processing unit 1226, and a communication unit 1228 in addition to tool 1205 with transmitting antennas 1210-T-1 . . . 1210-T-N and receiving antennas 1210-R-1 . . . 1210-R-M. System control center 1220 can include a central processing unit (CPU), analog electronics, digital electronics, or various combinations thereof to manage operation of other units of apparatus 1200. System control center 1220 can generate a signal and feed the signal to transmitters 1212-1 . . . 1212-N. The signal can be generated within a frequency in range 100 Hz to 10 MHz. Other frequency ranges may be used. Transmitters 1212-1 . . . 1212-N can direct currents to transmitting antennas 1210-T-1 . . .

1210-T-N, which emit electromagnetic waves into the formation. Although tool 1205 is operable to cancel out signals from layers that are between the transmitting antenna and the receiving antenna of a selected combination and make tool 1205 insensitive to properties of the region to the side of tool 1205, multiple transmitting antennas can be used to gather additional data to improve sensing of formation parameters. For example, transmitting antennas at different distances to the receiving antennas may produce images with different depth and resolution. As another example, antennas with different tilt angles or orientations may be used to produce sensitivity to anisotropic formation parameters.

One of more of N transmitting antennas can be driven by the signal provided by system control center 1220. The signal may consist of a sine wave at the desired frequency for frequency domain applications. In a time domain application, the signal can be a pulse with a certain shape and frequency spectrum. The transmitters can be simultaneously or sequentially activated and they can be kept on for a time long enough to allow transients to die off and noise effects to diminish via stacking. The received signals can be transformed into a domain where incident portion of the signal can be separated from the reflected portion. One particular example for such transformation is Hilbert transform. The signals at the receivers are provided to system control center 1220, which can be stored at the data buffer 1224 before finally being communicated to the surface. System control center 1220 can also control or interfere with the geosteering operation essentially autonomously without consulting to the surface, so that decisions can be made with minimal delay.

Electromagnetic wave signals that are received at receiving antennas 1210-R-1 . . . 1210-R-M can be directed to corresponding receivers 1214-1 . . . 1214-M and system control center 1220. Operation of apparatus 1200 can include multiple frequencies being transmitted and received at the same time for better time utilization. In such an operation, a sinusoidal waveform, a square waveform, or other time-based waveforms may be used to excite multiple frequencies simultaneously at each transmitting antenna 1210-T-1 . . . 1210-T-M or individual frequencies at transmitter antennas 1210-T-1 . . . 1210-T-M. Received signals corresponding to the multiple frequencies can be separated by filters at the receiving end in data acquisition unit 1222. For each transmitting antenna 1210-T-1 . . . 1210-T-M, received signals at all receivers 1214-1 . . . 1214-M can be recorded. Data buffer 1224 can be used to store received signal for processing.

Data processing unit 1226 can be used to perform inversion or other processing on the data. The processing and the inversion can be continued in accordance with processing features similar to or identical to embodiments taught herein. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. In various embodiments, an inversion process, conducted with respect to apparatus 1200, may be performed down hole or in an analysis unit, such as a computer, at surface 1204 after the data is transferred to surface 1204. Communication unit 1228 can communicate the data or results to surface 1204 for observation and/or determination of subsequent action to be taken in a drilling operation related to the measurements taken with apparatus 1200. The data or results may also be communicated to other tools down hole and used to improve various aspects of locating and extracting hydrocarbons.

Figure 13:
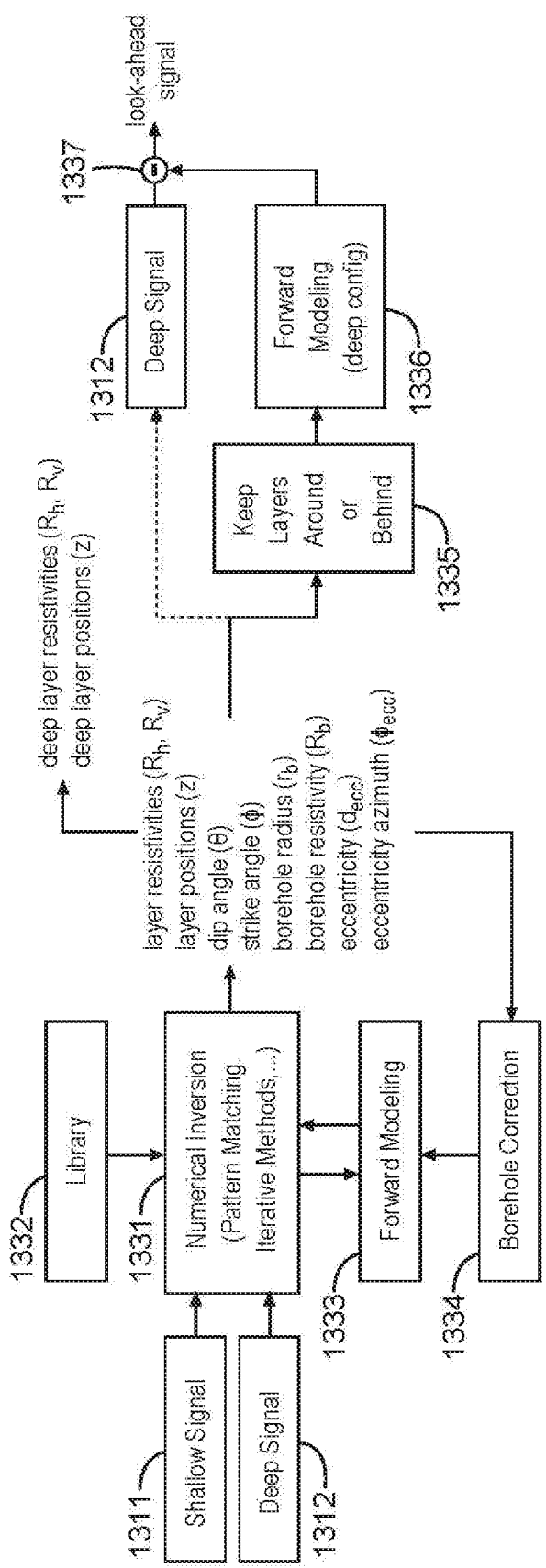
FIG. 13 shows features of an example method of calculation of look-ahead signal via shallow and deep inversion, in accordance with various embodiments.

With the shallow and deep data obtained, it is possible to do brute-force inversion on a full set of received measurements. However, instead enhanced processing may be attained with a procedure to divide the whole operation into two parts: calculation of a look-ahead signal and calculation of formation layer properties from the look-ahead signal. This two part approach allows interpretations directly from the look-ahead signal, even if solution for deep layer horizontal resistivity $R_h$, vertical resistivity $R_v$ and position is not unique. FIG. 13 shows features of an example embodiment of a method of calculation of look-ahead signal via shallow and deep inversion. This calculation can take advantage of full inversion using both a shallow signal 1311 and a deep signal 1312. Shallow signal 1311 and deep signal 1312 can be provided for numerical inversion 1331. Numerical inversion 1331 can use a number of different conventional techniques including, but not limited to, pattern matching and iterative methods. A library 1332 and forward model 1333 can assist numerical inversion 1331. Inverted borehole parameters from borehole correction 1334 can be fed back to numerical inversion 1331 to obtain better estimates. Output from numerical inversion 1331 can include layer resistivities ($R_h$, $R_v$), layer positions (z), dip angle (θ), strike angle (φ), borehole radius ($r_b$), borehole resistivity ($R_b$), eccentricity ($d_{ecc}$), and eccentricity azimuth ($\varphi_{ecc}$). These parameters can be feedback to borehole correction 1334 to update borehole correction 1334. These factors can also be fed forward to provide data for layers around or behind the tool 1335 for further processing. Deep layer resistivities ($R_h$, $R_v$), deep layer positions (z) output from numerical inversion 1331 are not provided for determination of the look-ahead signal, the data kept for further processing with measured deep signal 1312 relates to layers around or behind the tool. Data for layers around or behind the tool 1335 can be provided for forward modeling 1336 to provide a deep configuration correlated to the layers around or behind the tool. Output from forward modeling 1336 provides a modeled signal that is an anticipated deep signal from the layers around the tool, which can be directed to subtraction node 1337. A look-ahead signal can be obtained by subtracting an anticipated deep signal from the layers around the tool from the measured deep signal.

Figure 14:
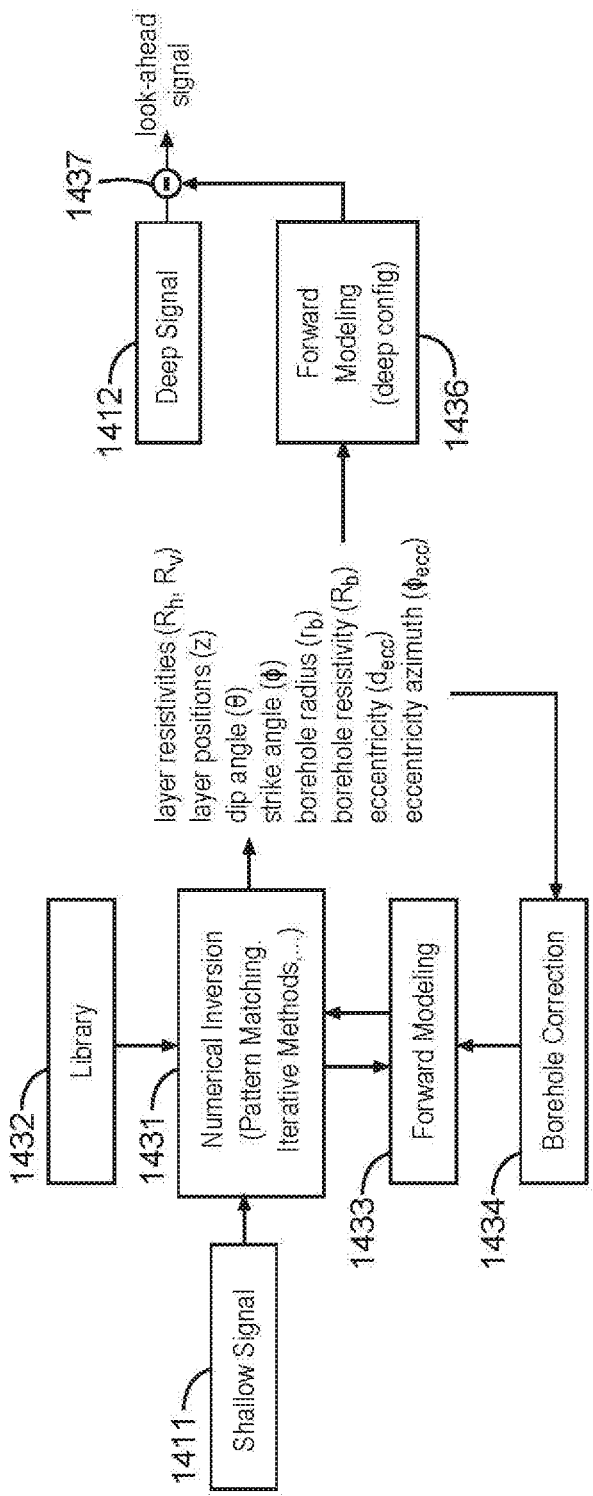
FIG. 14 shows features of an example method of the look-ahead signal calculation by using only shallow signals, in accordance with various embodiments.

FIG. 14 shows features of an example embodiment of a method of the look-ahead signal calculation by using only a shallow signal 1411. In this case, inverted layers are all near the tool since shallow measurement is mostly sensitive near the tool. Shallow signal 1411 can be provided for numerical inversion 1431. Numerical inversion 1431 can use a number of different conventional techniques including, but not limited to, pattern matching and iterative methods. A library 1432 and forward model 1433 can assist numerical inversion 1431. Inverted borehole parameters from borehole correction 1434 can be fed back to numerical inversion 1431 to obtain better estimates. Output from numerical inversion 1431 can include layer resistivities ($R_h$, $R_v$), layer positions (z), dip angle (θ), strike angle (φ), borehole radius ($r_b$), borehole resistivity ($R_b$), eccentricity ($d_{ecc}$), and eccentricity azimuth ($\varphi_{ecc}$). These parameters can be feedback to borehole correction 1434 to update borehole correction 1434. These factors can also be fed to forward modeling 1436 with the deep configuration to yield a signal that only includes layers near the tool. Output from forward modeling 1436 provides a modeled signal that only includes layers near the tool, which can be directed to subtraction node 1437. As a result, when the modeled signal is subtracted from the measured deep signal 1412, the look-ahead signal can be obtained.

Figure 15:
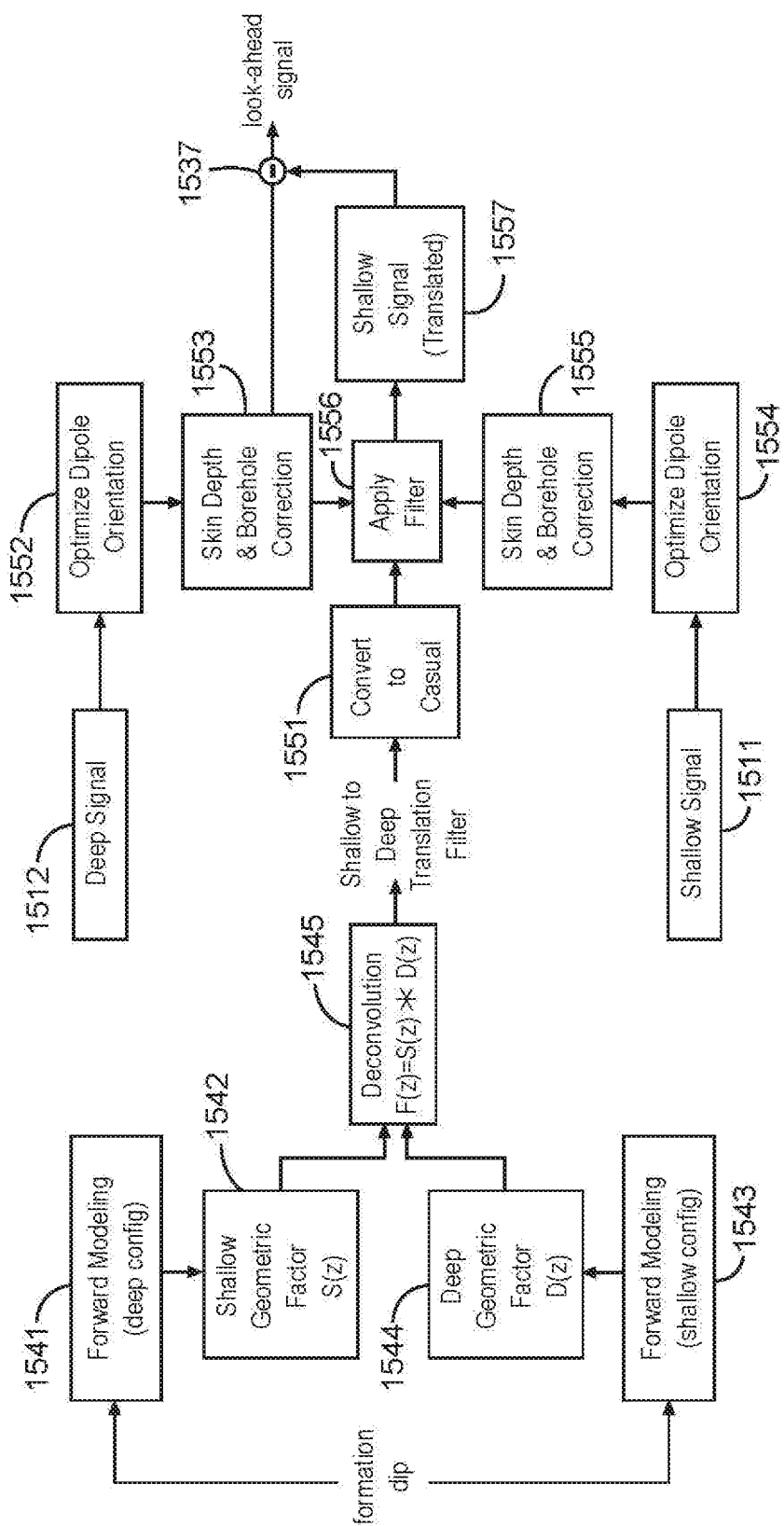
FIG. 15 illustrates an example calculation of a look-ahead signal via deconvolution, in accordance with various embodiments.

FIG. 15 illustrates an example embodiment of a calculation of look-ahead signal via deconvolution. Such a look-ahead signal calculation can be performed in a manner that does not involve an inversion. In this case, forward modeling 1541 can be performed to obtain shallow geometrical factors 1542 as a function of depth, associated with deep configurations. Forward modeling 1543 can be performed to obtain deep geometrical factors 1544 as a function of depth, associated with shallow configurations. The formation dip may be provided to forward modeling 1541 and forward modeling 1543. One way to obtain the geometric factor is to perform a synthetic log of a formation that consists of a background resistivity and a very thin layer at depth 0. Background resistivity is assumed to be sufficiently larger compared to inverse of the frequency, in which case, no significant skin effect is observed. The method illustrated in FIG. 15 is also expected to work when there are some skin effects, but such method uses custom geometric factors to be calculated with the specific resistivity. However, resulting look-ahead signal may be contaminated by shallow signal due to non-linearity induced by the skin effect.

After geometrical factors are computed, a filter is calculated by deconvolving a shallow geometric factor from a deep geometric factor 1545. In geosteering applications, there is no access to future signal values, so filter can be converted to causal 1551, for example, by enforcing zero values on the future side of the filter and adding a sum of removed values to the last available filter coefficient. In situations where dipole orientations of the transmitter and receiver are not optimal (for example, if they do not provide good layer signal cancellation), the transmitter and receiver can be rotated to any angle provided that cross-dipole measurements can be made to optimize dipole orientation 1552 for deep signal 1512 and to optimize dipole orientation 1554 for shallow signal 1511. In situations where transmitting or receiving antennas are rotating, the resulting different antenna dipole orientations can be combined for similar optimization.

Filter application 1556 to shallow signal equalizes its resolution and centering to the deep measurement providing a translated shallow signal 1157. This allows effective subtraction of the shallow signal from the deep signal, at subtraction node 1537, without creating effects due to resolution difference. A skin depth and borehole correction procedure 1555 for shallow signal 1511 and a skin depth and borehole correction procedure 1553 for deep signal 1512 can also be applied before subtraction and filtering to remove, and hence equalize, skin depth and borehole effects. The above methodology is free of inversion and it can work even in situations where inversion is not supposed to work very well. The methodology can be processed very quickly to be applied while geosteering, since the biggest computational part is the filter application.

Figure 16:
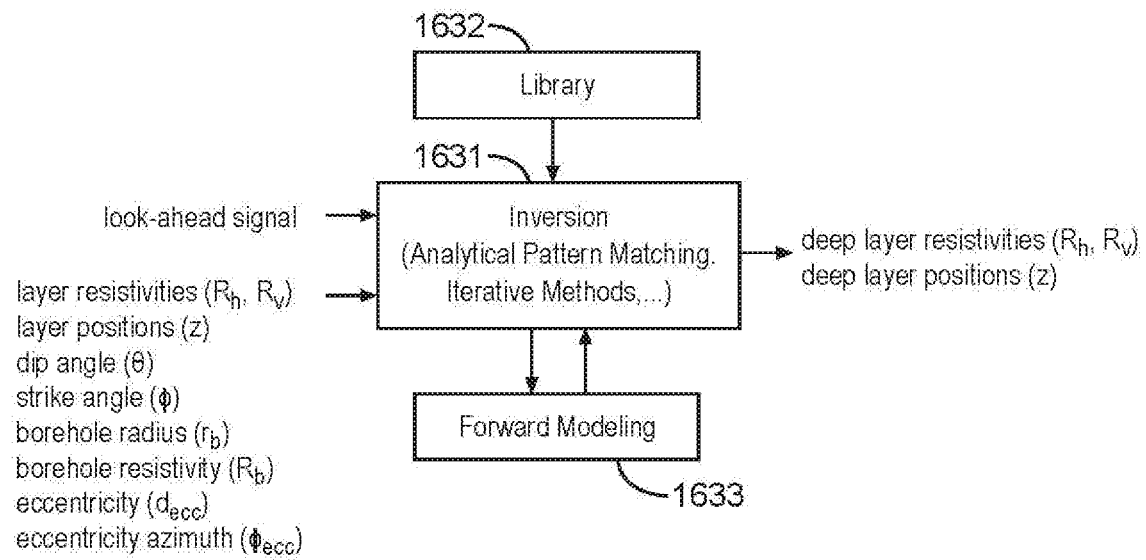
FIG. 16 illustrates an example calculation of deep layer properties via full inversion, in accordance with various embodiments.

FIG. 16 illustrates an example embodiment of a calculation of deep layer properties via full inversion. Even though look-ahead signal alone can be useful in applications, it may be desired to calculate resistivity and position of the layers ahead of the bit. This can be performed by an inversion algorithm that takes into account all known information such as around the tool layer parameters, as shown in FIG. 16. A look-ahead signal can be provided for inversion 1631 along with near tool parameters such as layer resistivities ($R_h$, $R_v$), layer positions (z), dip angle ($\theta$), strike angle ($\varphi$), borehole radius ($r_b$), borehole resistivity ($R_b$), eccentricity ($d_{ecc}$), and eccentricity azimuth ($\varphi_{ecc}$). A library 1632 and forward model 1633 can assist inversion 1631. Inversion 1631 can include using one or more techniques, such as but not limited to, analytical formulas, pattern matching, and iterative methods to output deep layer resistivities ($R_h$, $R_v$) and deep layer positions (z).

Figure 17:
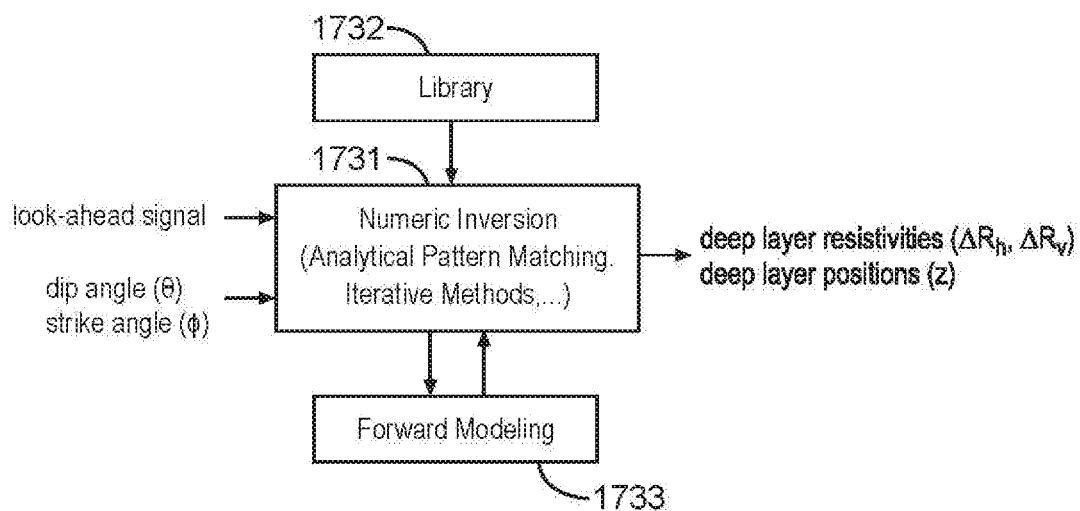
FIG. 17 illustrates an example calculation of deep layer properties via simple inversion, in accordance with various embodiments.

FIG. 17 illustrates an example embodiment of a calculation of deep layer properties via simple inversion. In cases where only the dip angle ($\theta$) and the strike angle ($\varphi$) are known, the resistivity change and layer position can be obtained by inversion as shown in FIG. 17. A look-ahead signal can be provided for inversion 1731 along with dip angle ($\theta$) and strike angle ($\varphi$). A library 1732 and forward model 1733 can assist inversion 1731. Inversion 1731 can include using one or more techniques, such as but not limited to, analytical formulas, pattern matching, and iterative methods to output deep layer resistivities ($R_h$, $R_v$) and deep layer positions (z). Since the geometrical factor is inversely proportional to square of the distance to layer boundary, analytical formulas can be utilized for inversion. Since large resistivity changes may indicate large pressure changes, results from this calculation may be used in stopping the drilling for safety before approaching dangerous zones.

Figure 18:
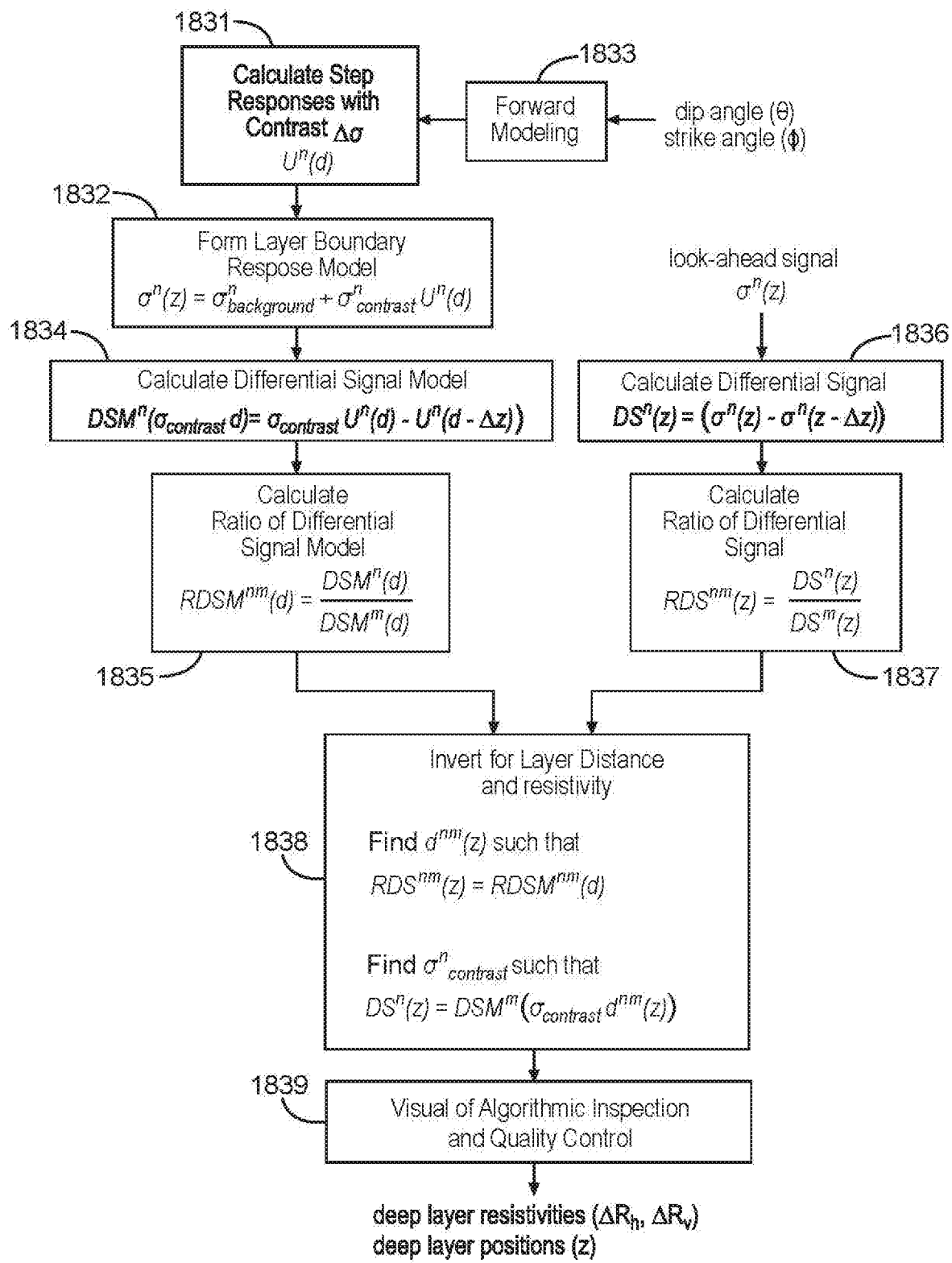
FIG. 18 illustrates an example of a calculation of deep layer properties via inversion, in accordance with various embodiments.

FIG. 18 illustrates an example embodiment of a calculation of deep layer properties via inversion. The calculation method shown in FIG. 18 can be used to invert distance and resistivity of layers. The calculation may begin with dip angle ($\theta$) and strike angle ($\varphi$) provided for forward modeling 1833. If skin depth is sufficiently small or it can be sufficiently compensated, there is an approximately linear relationship between the conductivity at each layer and the signal that it generates at the receivers. As a result, given the signal due to a small perturbation on the conductivity distribution, what the signal contribution would be for a layer with any conductivity can be predicted. For that purpose, at 1831 from forward modeling 1833, a step response, $U^n(d)$, can be generated by synthetically logging a two layer formation, where only a very small contrast of $\Delta\sigma$ exists in between layer conductivities. At 1832, based on the linearity property, the total signal at a n'th measurement at depth z in a case with a single layer perturbation can be written as $$\sigma^n(z) = \sigma_{background}^n + \sigma_{contrast}^n U^n(d), \quad (1)$$

where $\sigma_{contrast}$ is the conductivity difference between the layer that the tool is in and the layer that is ahead of the tool, and $\sigma_{background}$ is the conductivity due to the layer that the tool is current in. At 1834, in order to remove the effect of unknown background, a differential signal can be calculated $$DSM^n(\sigma_{contrast}, d) = \sigma_{contrast}(U^n(d) - U^n(d - \Delta z)) \quad (2)$$

At 1835, effect of conductivity contrast can be removed by considering a ratio of differential signals from the n'th and m'th measurements as follows $$RDSM^{nm}(d) = \frac{DSM^n(d)}{DSM^m(d)} \quad (3)$$

A look-ahead signal, $\sigma^n(z)$, at a n'th measurement at depth z can be provided, at 1836, to calculate differential signal $DS^n(z) = (\sigma^n(z) - \sigma^n(z - \Delta z))$. At 1837, a ratio of a differential signal can be calculated using the result from 1836 as $RDS'''^n(z)=DS^n(z)/DS'''(z)$. At 1838, as shown in FIG. 16, a differential signal obtained from the measurements can be inverted for distance, $d'''^n(z)$, and conductivity, $\sigma^n_{contrast}(z)$, of the layers ahead of the tool by using the relationships in equations 1-3. Distance $d'''^n(z)$ can be found such that $RDS'''^n(z)=RDSM'''^n(d)$. Conductivity $\sigma^n_{contrast}(z)$ can be found such that $DS^n(z)=DSM^n(\sigma^n_{contrast}, d'''^n(z))$. Each estimation with different n and m produce results with different depth of detection and the optimum measurements can be visually or algorithmically picked, at 1839. Deep layer resistivities ($R_h$, $R_v$) and deep layer positions (z) can be output from this inversion process. When the tool is far from the boundary, only deep measurement is expected to produce good results. As the tool gets closer to the boundary, measurements with lower depth of detection can be valid. The processing disclosed in FIG. 18 requires the layer boundary to be in range of at least two different measurements. Although deep measurements can see deeper, shallow measurements can be more accurate since they are less affected by boundaries of multiple layers.

Figure 19:
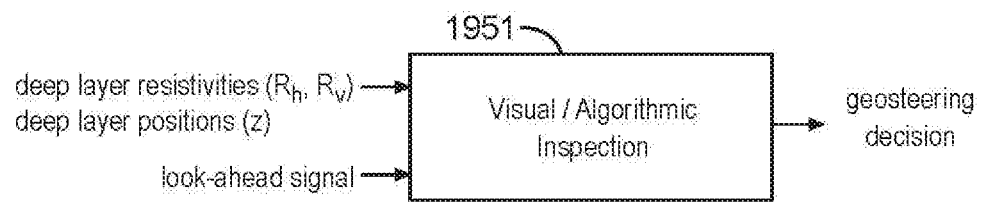
FIG. 19 illustrates an example of a geosteering decision chart, in accordance with various embodiments.

In various embodiments, the processing schemes taught herein can be repeated and new measurements can be added as the tool drills/moves. FIG. 19 illustrates an example embodiment of a geosteering decision chart. A look-ahead signal along with deep layer resistivities ($R_h$, $R_v$) and deep layer positions (z) can be provided for visual and/or algorithmic inspection 151 from which a geosteering decision can be made. Geosteering decisions can be made by a person who is observing the results of the processing of the measurements at the surface. Alternatively, geosteering decisions can be made down hole by an automated system. An automated system can respond much more quickly, due to inherent lags associated with down hole telemetry to provide data to the surface. The look-ahead signal is proportional to the strength of the resistivity contrast and distance of the change. As a result, the look-ahead signal can give useful indication about the nature of the approaching layers. Since deep layers that are far with large contrast create very similar signal with near layers with small resistivity contrast, it may be difficult in some cases to find unique results for resistivity and distance. In such cases, the look-ahead signal itself can be used for making a decision. Another alternative is to use a-priori knowledge about layer resistivities or distances to remove the non-uniqueness problem.

Existing efforts in the literature have focused on increasing sensitivity ahead of the tool, but reduction of sensitivity around the tool has not been addressed. As a result, existing tools receive a mix of signals from around and ahead of the tool, which is either very difficult or not possible to separate. In various embodiments, special antenna tilt angles to achieve layer signal cancellation effect on the layers between the transmitters and receivers can be utilized. This essentially completely eliminates the sensitivity to those layers. Furthermore, an alternative method that utilizes deconvolution and inversion of multiple spacing data to reduce sensitivity to layers that are near the tool can be used. The resulting method can provide look-ahead capability in practical scenarios with multiple layers of varying resistivities, as opposed to the methods that suffer significant difficulties and complications.

Figure 20:
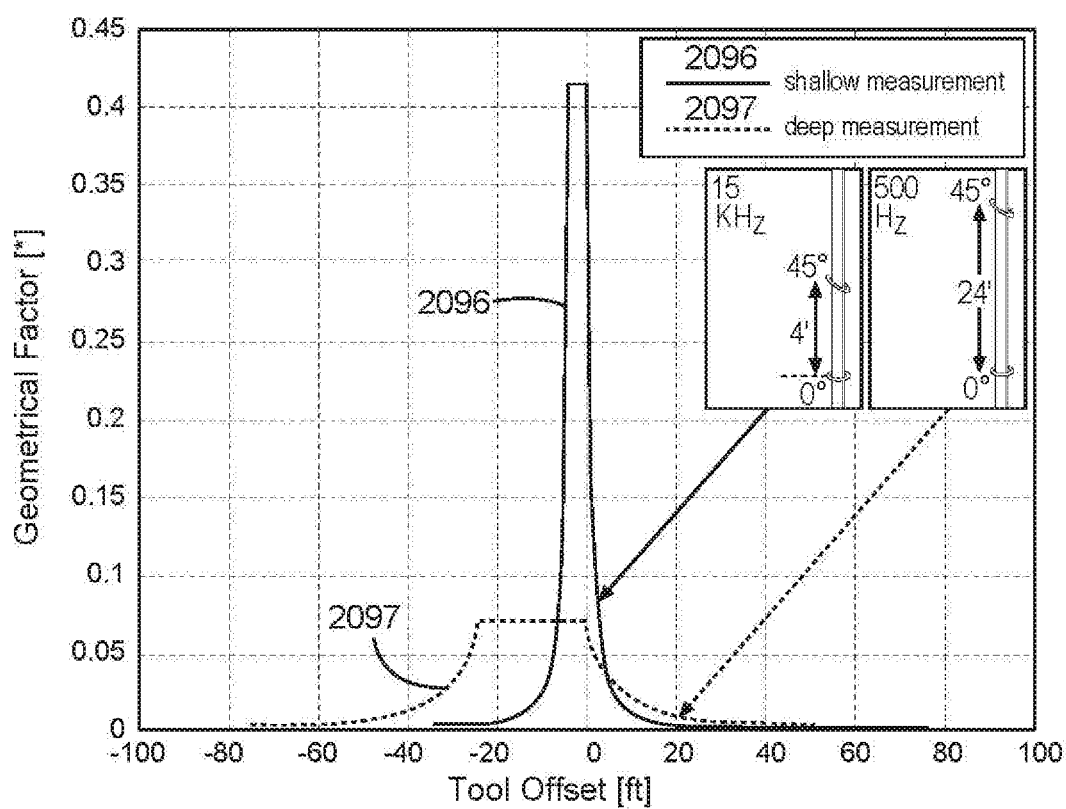
FIG. 20 shows geometric factors associated with two different spacings between transmitter and receiver, in accordance with various embodiments.
Figure 21:
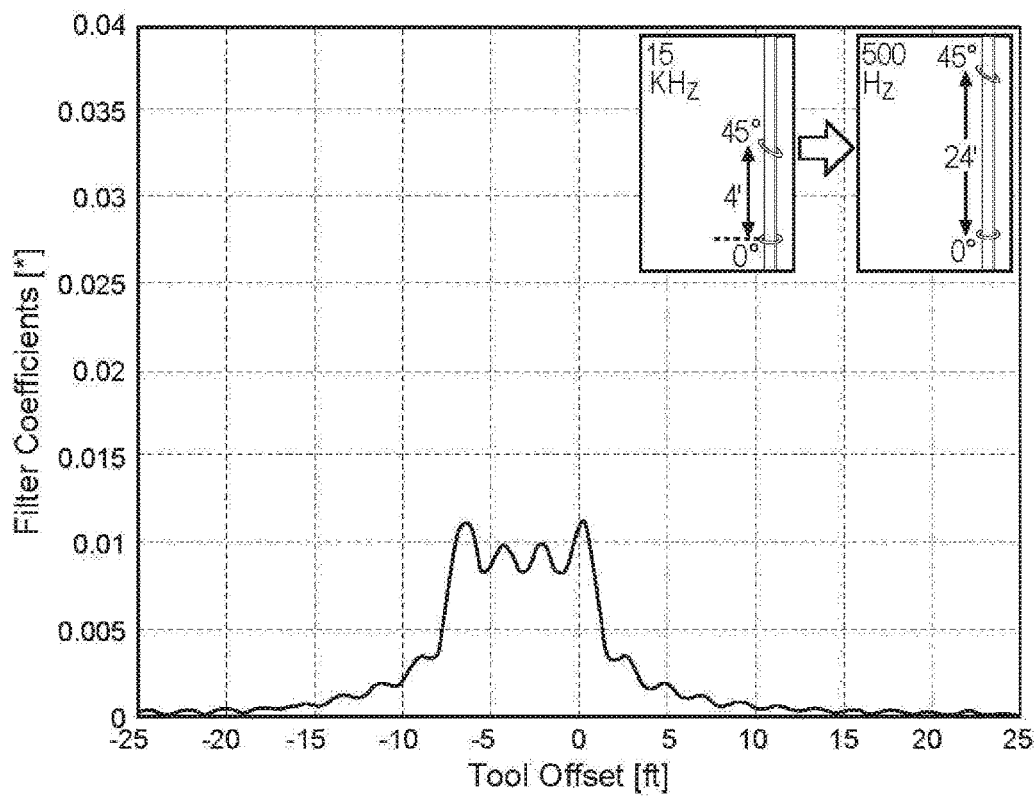
FIG. 21 illustrates a non-causal deconvolution filter, in accordance with various embodiments.
Figure 22:
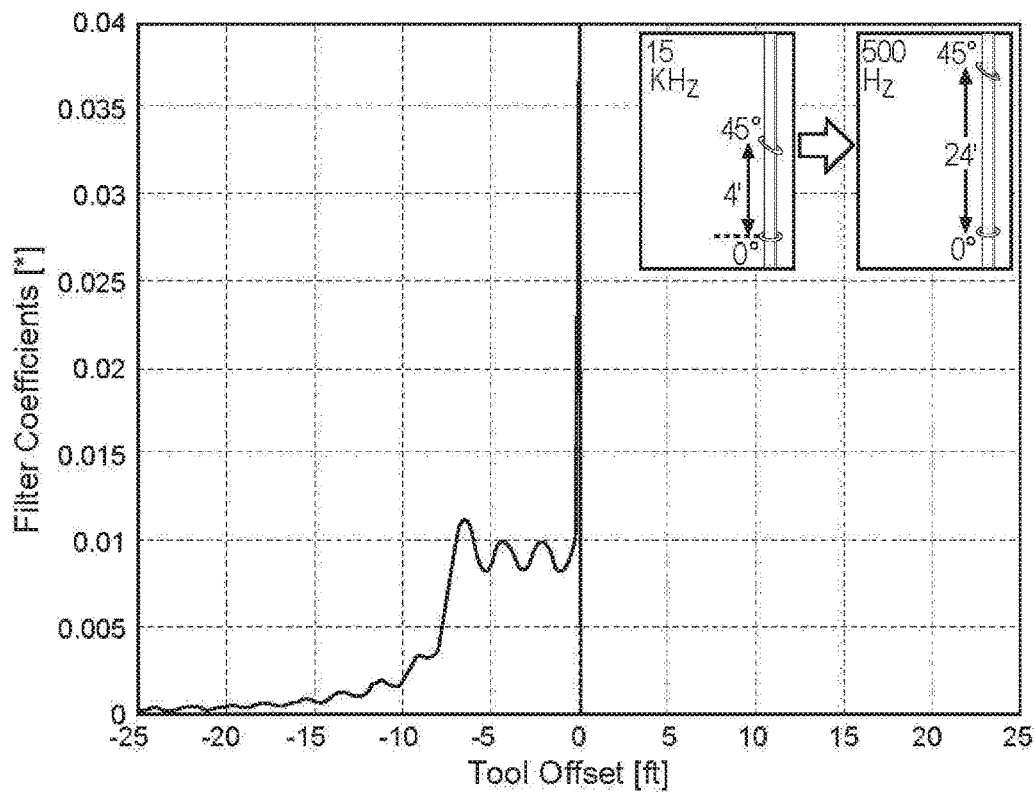
FIG. 22 illustrates a causal deconvolution filter, in accordance with various embodiments.

FIG. 20 shows geometric factors associated with two different spacings between transmitter and receiver. In this example, a 4 ft. spacing is used for a shallow measurement operating at 15 kHz with an antenna tilted at 45° and an antenna tilted at 0° having signal shown in curve 2096. A 24 ft. spacing is used for a deep measurement operating at 500 Hz with an antenna tilted at 45° and an antenna tilted at 0° having signal shown in curve 2097. The tool offset is defined as the true vertical position of the tool along the z-axis, where z-axis is pointing upward. It can be seen from FIG. 20 that the deep measurement is more sensitive to deep positions (z>0). The sensitivity is maximum and constant when the layer boundary is between the transmitter and the receiver (−4<z<0 for shallow measurements and −24<z<0 for deep measurements). The deconvolution filter is calculated from these two curves as shown in FIG. 21, which illustrates a non-causal deconvolution filter. This filter is made causal as shown in FIG. 22.

Figure 23:
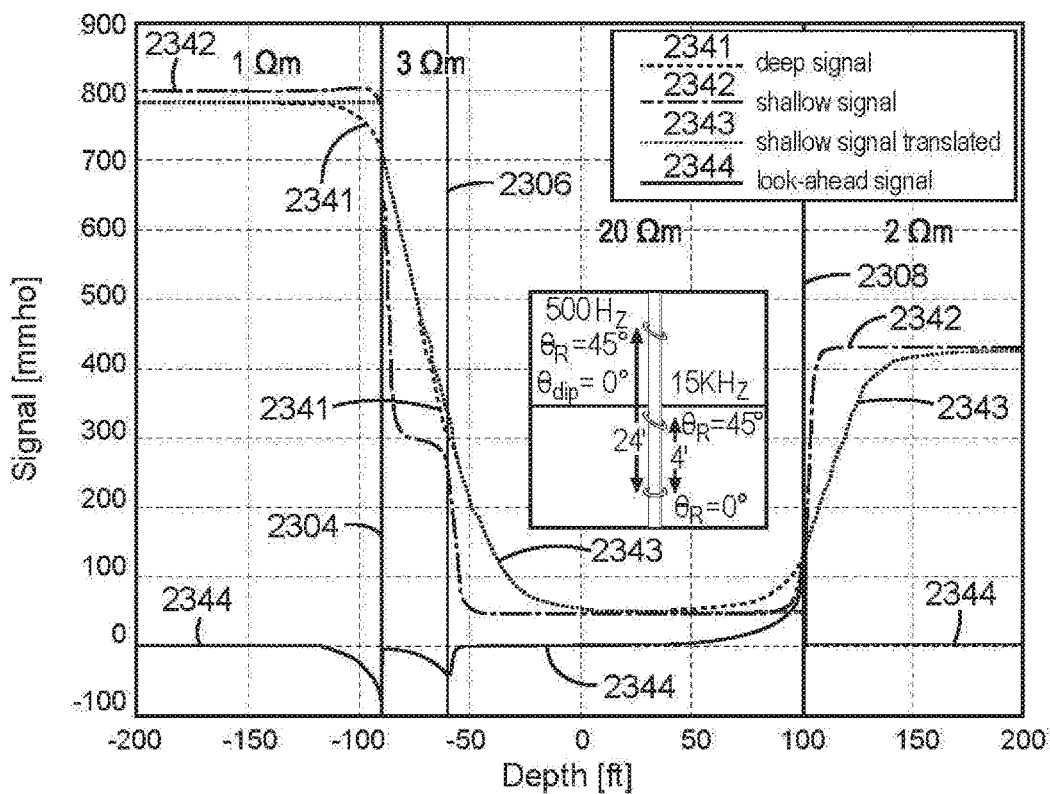
FIGS. 23 and 24 each shows a synthetic log with a zero dip angle and four layers in an inversion process, in accordance with various embodiments.
Figure 24:
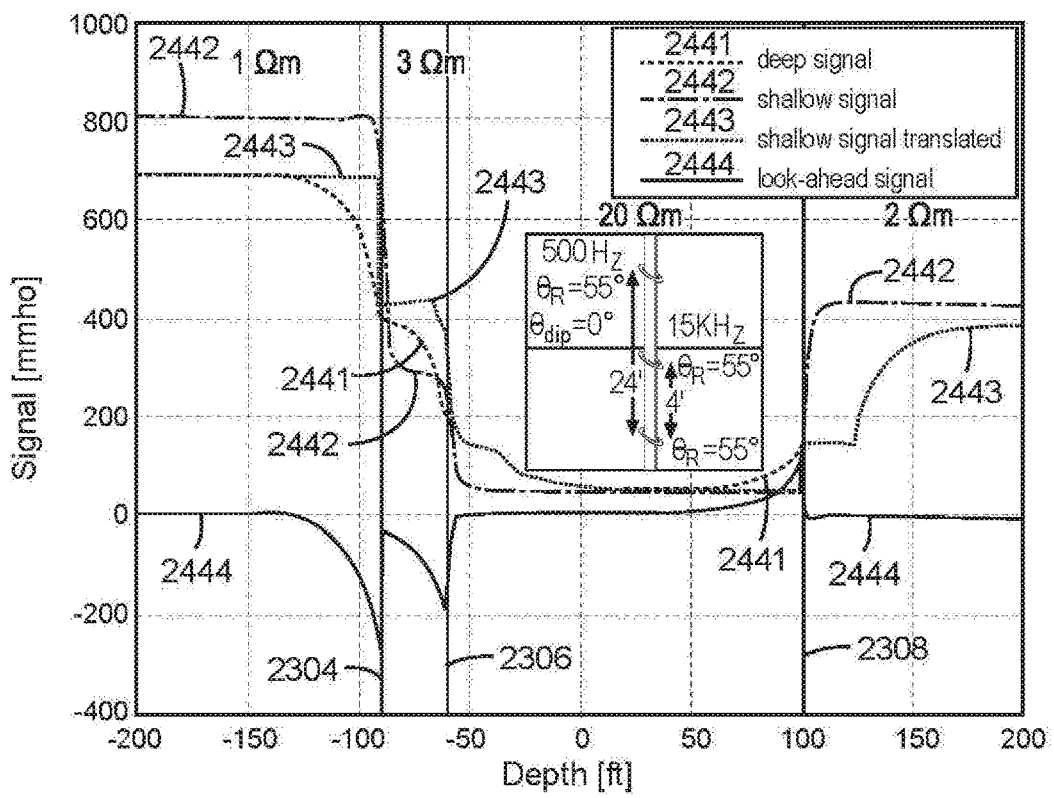

FIG. 23 and FIG. 24 each shows a synthetic log with a zero dip angle and four layers in an inversion process. Layer boundaries are shown as vertical lines 2304, 2306, and 2308 with the resistivity of each layer indicated in each region. FIG. 23 shows a transmitter operating at 500 Hz with tilt angle of 45° with a spacing of 24 ft. to receiver antenna having tilt angle of 0° and a transmitter operating at 15 KHz with tilt angle of 45° with a spacing of 4 ft. to the same receiver antenna. Curve 2341 shows a deep signal. Curve 2342 shows a shallow signal. Curve 2343 shows a shallow signal translated. Curve 2344 shows a look-head signal. FIG. 24 shows a transmitter operating at 500 Hz with tilt angle of 55° with a spacing of 24 ft. to receiver antenna having tilt angle of 55° and a transmitter operating at 15 KHz with tilt angle of 55° with a spacing of 4 ft. to the same receiver antenna. Curve 2441 shows a deep signal. Curve 2442 shows a shallow signal. Curve 2443 shows a shallow signal translated. Curve 2444 shows a look-head signal. The tool is assumed to move from z=200 ft to z=−200 ft, where the depth is defined as −z. The inversion method shown in FIG. 14 is used for translated shallow and look-ahead signal calculations. It can be seen that the look-ahead signal clearly indicates approaching layers, where higher signal is produced for higher resistivity contrast. Distance and resistivity of the approaching layer can be determined from inversion by taking advantage of the look-ahead curve profile as discussed earlier. Although a single spacing provides adequate information for such inversion, higher accuracy can be obtained by utilizing multiple deep spacings. Much higher signal levels are obtained in FIG. 24, where both transmitting and receiving antennas are tilted to achieve layer signal cancellation and deep focusing.

Figure 25:
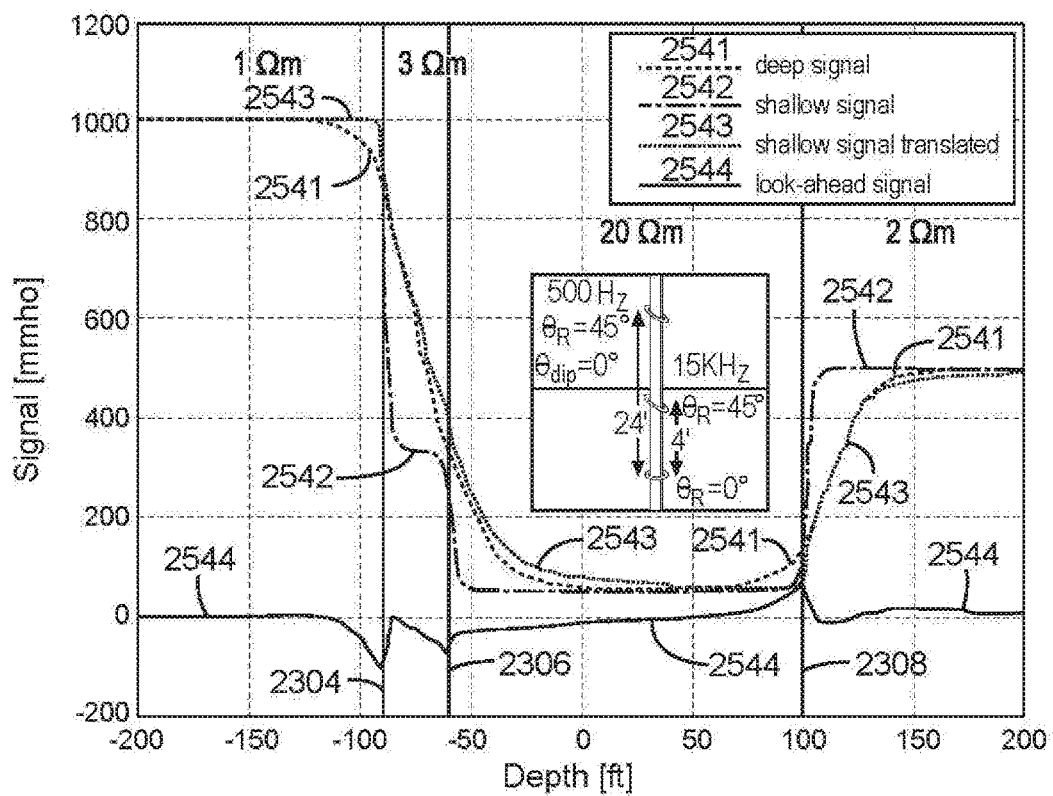
FIG. 25 shows a synthetic log with four layers in a deconvolution process, in accordance with various embodiments.

FIG. 25 shows the results obtained for the configuration of FIG. 23 with the deconvolution methodology described in FIG. 15. FIG. 25 shows a transmitter operating at 500 Hz with tilt angle of 45° with a spacing of 24 ft. to receiver antenna having tilt angle of 0° and a transmitter operating at 15 KHz with tilt angle of 45° with a spacing of 4 ft. to the same receiver antenna. Curve 2541 shows a deep signal. Curve 2542 shows a shallow signal. Curve 2543 shows a shallow signal translated. Curve 2544 shows a look-head signal. Comparable results are obtained with the inversion method result, however some noise due to causal implementation and skin depth effects is observed.

Figure 26:
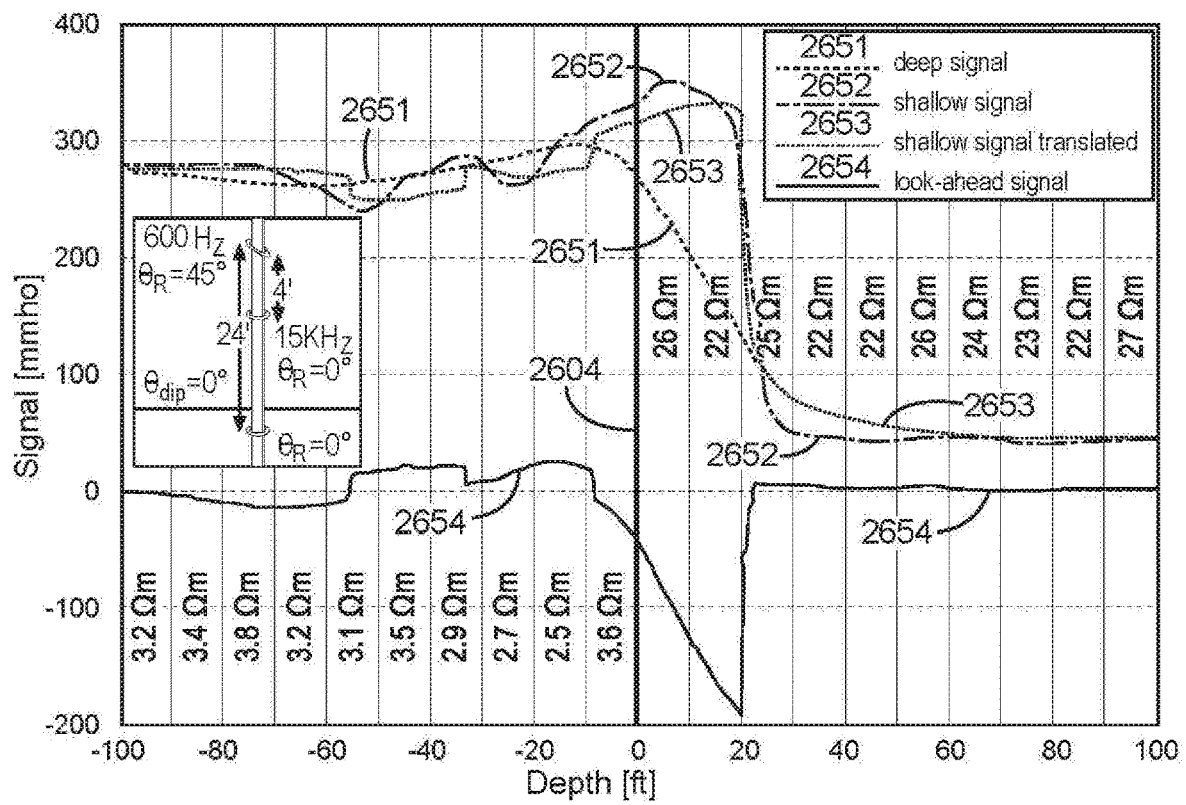
FIGS. 26 and 27 compare standard and layer signal cancelling configurations for a case with a large number of layers with resistivity variation, in accordance with various embodiments.
Figure 27:
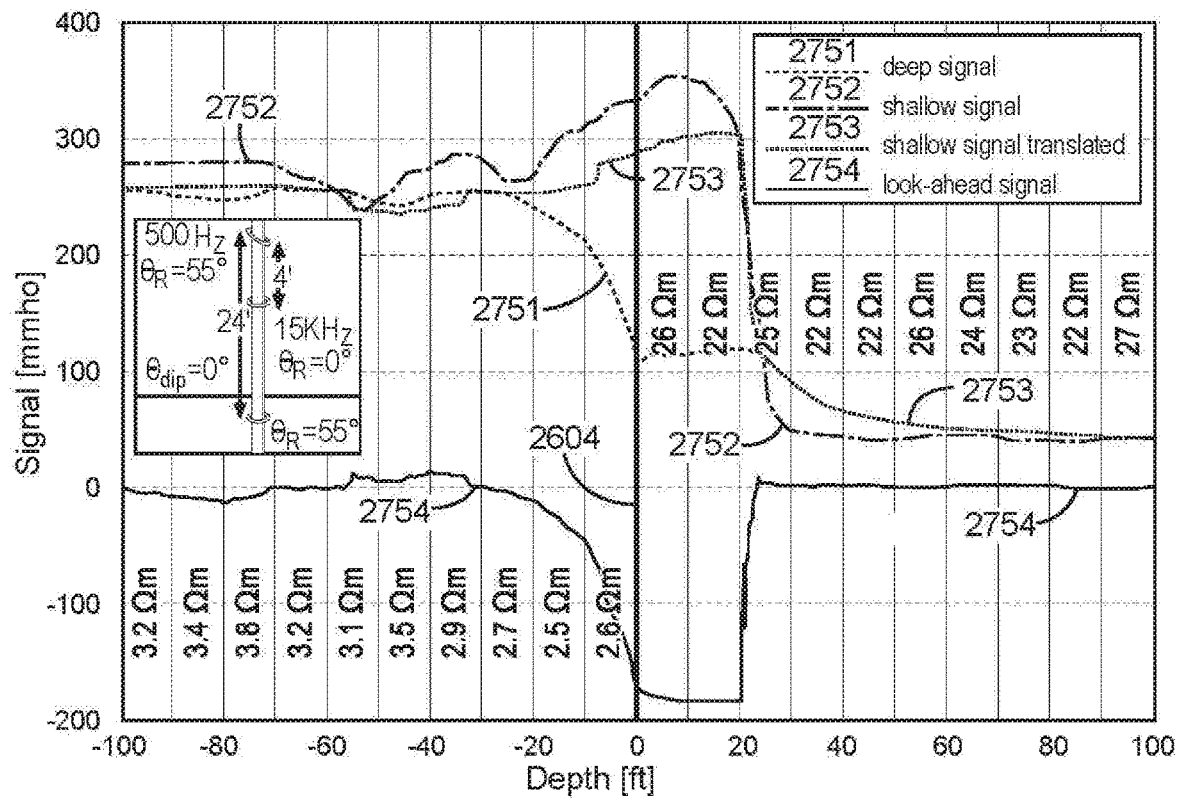

FIGS. 26 and 27 compare standard and layer signal cancelling configurations for a practical case with a large number of layers with some resistivity variation. FIG. 26 shows a synthetic log with 2 zones (separated by interface 2604) and 20 layers with respect to a standard measurement configuration. FIG. 27 shows a synthetic log with 2 zones (separated by interface 2604) and 20 layers with respect to a layer signal cancelling configuration. In this example, the first zone resistivity ranges between 2.5 and 3.8 Ωm and the second zone resistivity ranges between 22 and 27 Ωm with an interface 2604 between the zones. In both configurations, the same antenna locations are used but with different tilt angles. FIG. 26 shows an antenna having tilt angle of 45° with a spacing of 24 ft. to another antenna having a tilt angle of 0° operating at 500 Hz and the antenna having tilt angle of 45° with a spacing of 4 ft. to another antenna having a tilt angle of 0° operating at 15 KHz. FIG. 27 shows an antenna having tilt angle of 55° with a spacing of 24 ft. to antenna having a tilt angle of 55° operating at 500 Hz and the antenna having tilt angle of 55° with a spacing of 4 ft. to another antenna having a tilt angle of 0° operating at 15 KHz. Curve 2651 shows a deep signal. Curve 2652 shows a shallow signal. Curve 2653 shows a shallow signal translated. Curve 2654 shows a look-head signal. Curve 2751 shows a deep signal. Curve 2752 shows a shallow signal. Curve 2753 shows a shallow signal translated. Curve 2754 shows a look-head signal.

In the layer signal cancelling configuration, tilt angles for the deep reading with an example 24 ft spacing between antennas are set such that the effect illustrated in FIG. 3 is achieved. In the standard configuration, the boundary effect becomes significant around at 5 ft distance from the boundary due to large sensitivity to layers between the bottom and the middle antenna. For the layer signal cancelling configuration, the depth of detection is increased to 15 ft. Another important feature of layer signal cancellation is that the shape of the deep signal itself also becomes directly indicative of the layers ahead of and behind the tool as shown, for example, in FIG. 9. The effect of the layers behind the tool is removed in the process illustrated in FIG. 14 and cannot be seen in the look-ahead signal. The plateau observed between depths 0 and 20 ft is due to insensitivity of the tool to the formations between the middle antenna and bottom antenna. This effect can be removed by using a configuration such as that in FIG. 23.

Figure 28A:
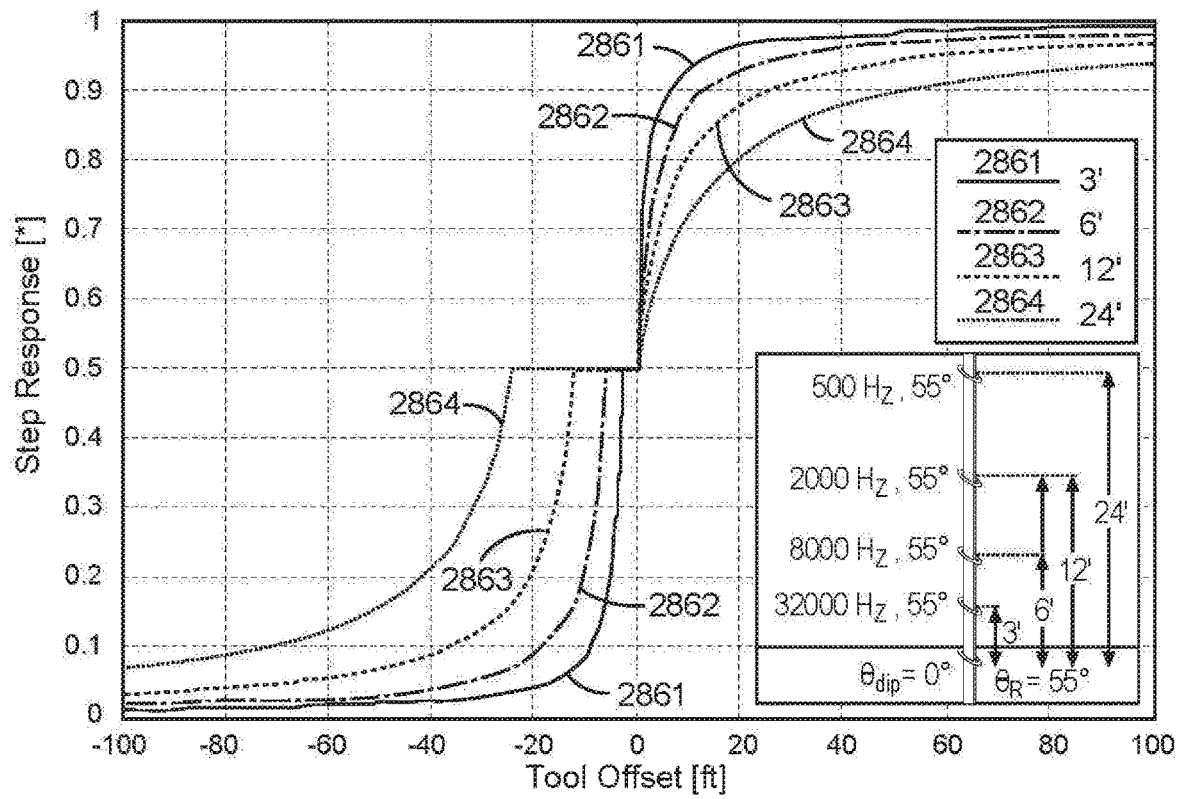
FIG. 28A-C shows an example step response model and example differential signal models, in accordance with various embodiments.
Figure 28B:
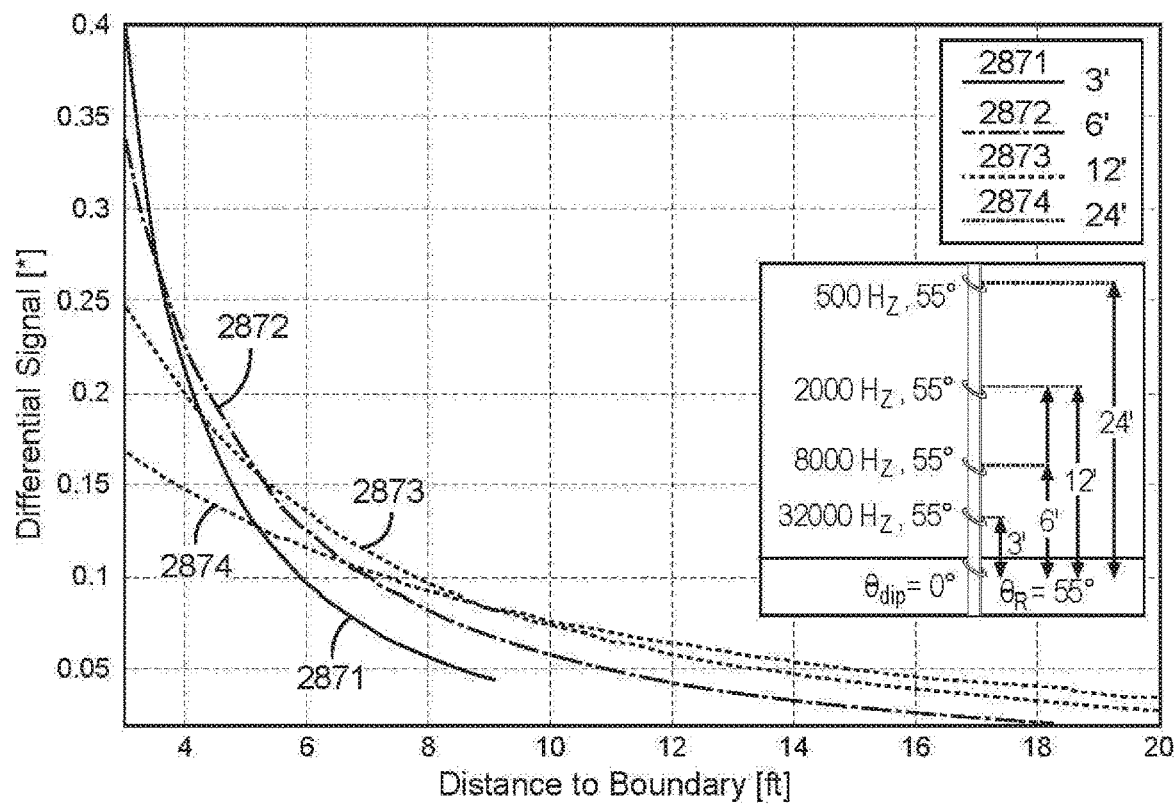
Figure 28C:
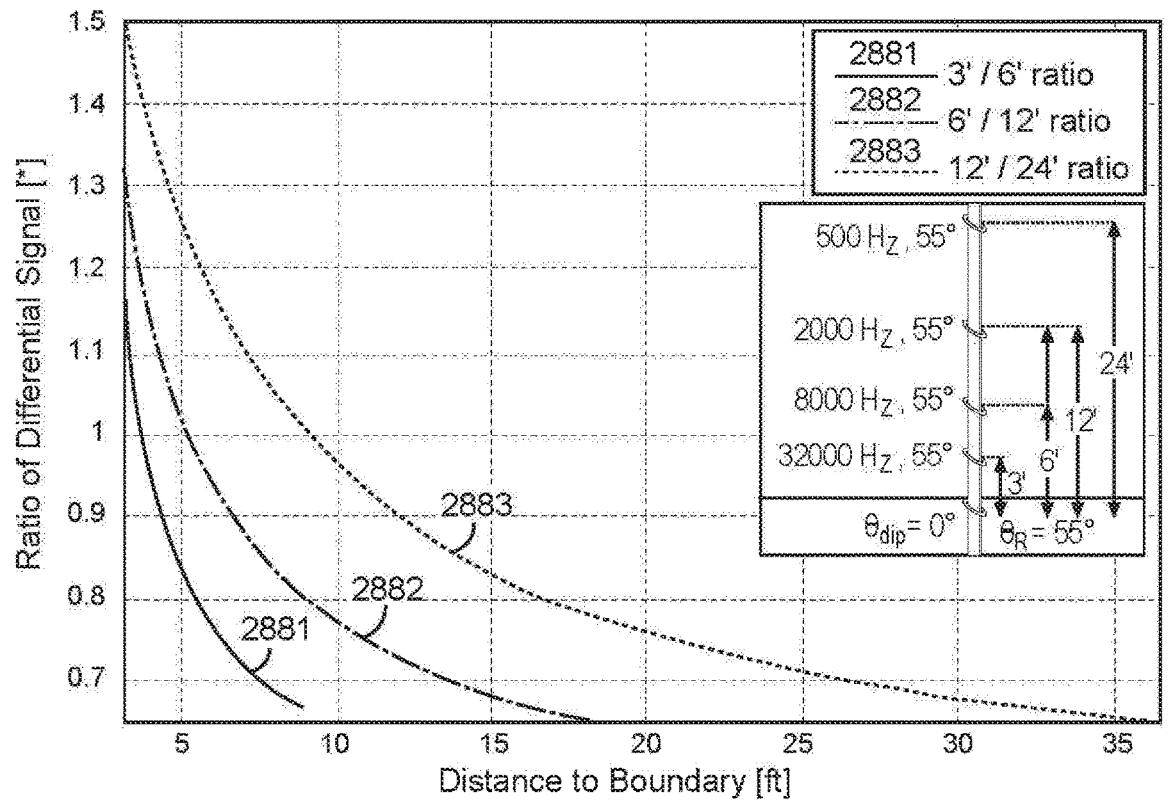

FIGS. 28A-C shows an example step response model and example differential signal models. FIG. 28A shows the step response model, FIG. 28B shows a differential signal model, and FIG. 28C shows a differential signal ratio model. These models can be obtained via the equations associated with FIG. 16. A tool with multiple spacings can be used. The multiple spacings in FIGS. 28A-C from four antennas each at tilt angle of 55° include spacings of 3 ft. operating at 32000 Hz, 6 ft. operating at 8000 Hz, 12 ft. operating at 2000 Hz, and 24 ft operating at 500 Hz each from a common antenna with tilt angle of 55°. Since profile step transition is assumed to be at z=0, the tool offset is equal to distance to boundary for positive values. Curve 2861 shows a step response for the 3 ft spacing. Curve 2862 shows a step response for the 6 ft spacing. Curve 2863 shows a step response for the 12 ft spacing. Curve 2864 shows a step response for the 24 ft spacing. Curve 2871 shows a differential signal for the 3 ft spacing. Curve 2872 shows a differential signal for the 6 ft spacing. Curve 2873 shows a differential signal for the 12 ft spacing. Curve 2874 shows a differential signal for the 24 ft spacing. Curve 2881 shows a ratio of a differential signal for a ratio of the 3 ft spacing to the 6 ft spacing. Curve 2882 shows a ratio of a differential signal for a ratio of the 6 ft spacing to the 12 ft spacing. Curve 2883 a ratio of a differential signal for a ratio of the 12 ft spacing to the 24 ft spacing. It can be seen from the differential signal plot that, for each differential signal value in the considered range, a unique distance to boundary can be found. The sensitivity of differential signal with distance to boundary decreases as the latter increases. Similar observations can be made for the differential signal ratio.

Figure 29:
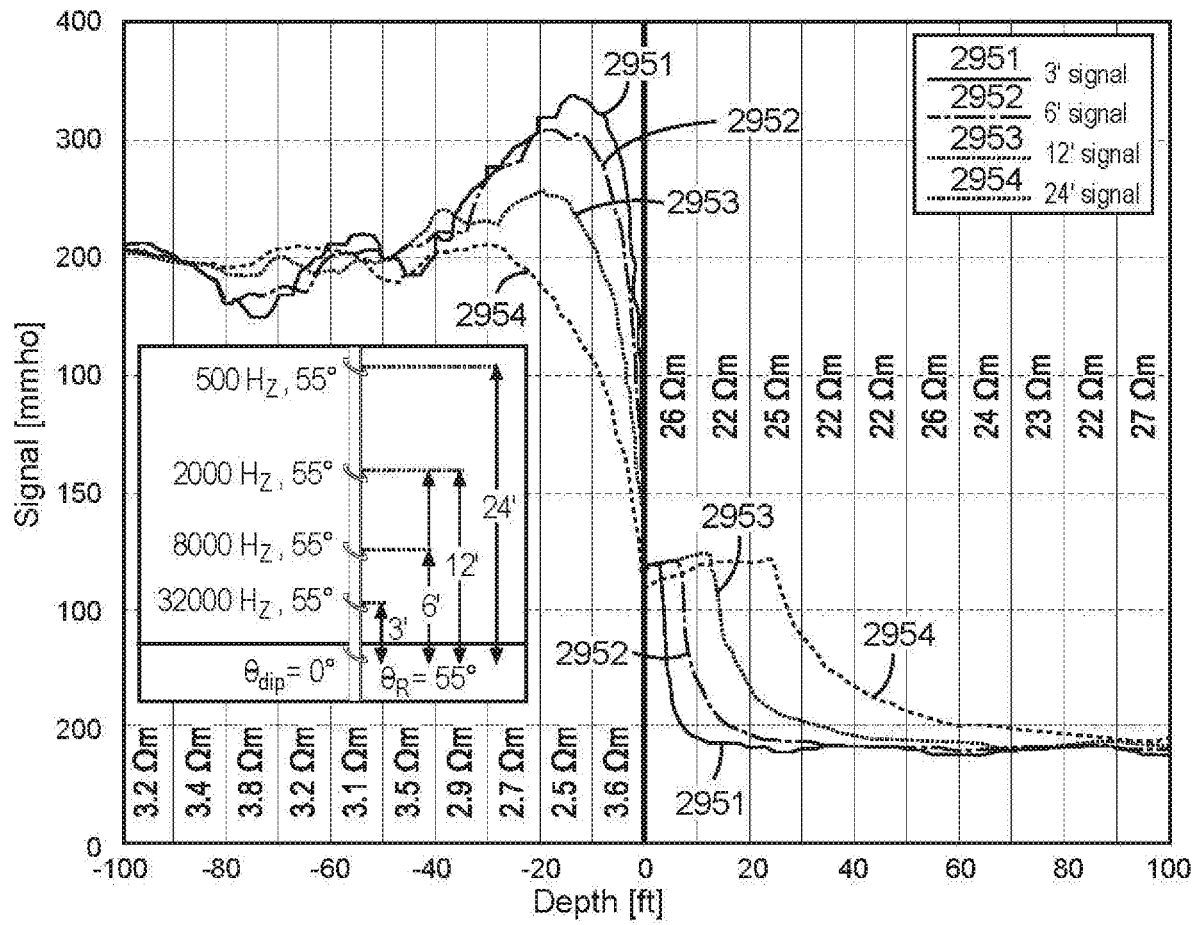
FIG. 29 shows skin effect corrected signals for an example case, in accordance with various embodiments.

FIG. 29 shows skin effect corrected signals for an example case having multiple boundaries and two zones. In this example, multiple spacings are shown from four antennas each at tilt angle of 55° with respective spacings of 3 ft. operating at 32000 Hz, 6 ft. operating at 8000 Hz, 12 ft. operating at 2000 Hz, and 24 ft operating at 500 Hz each from a common antenna with tilt angle of 55°. Example conductivity values are shown in FIG. 29. Curve 2951 shows a signal for the 3 ft spacing. Curve 2952 shows a signal for the 6 ft spacing. Curve 2953 shows a signal for the 12 ft spacing. Curve 2954 shows a signal for the 24 ft spacing.

Figure 30A:
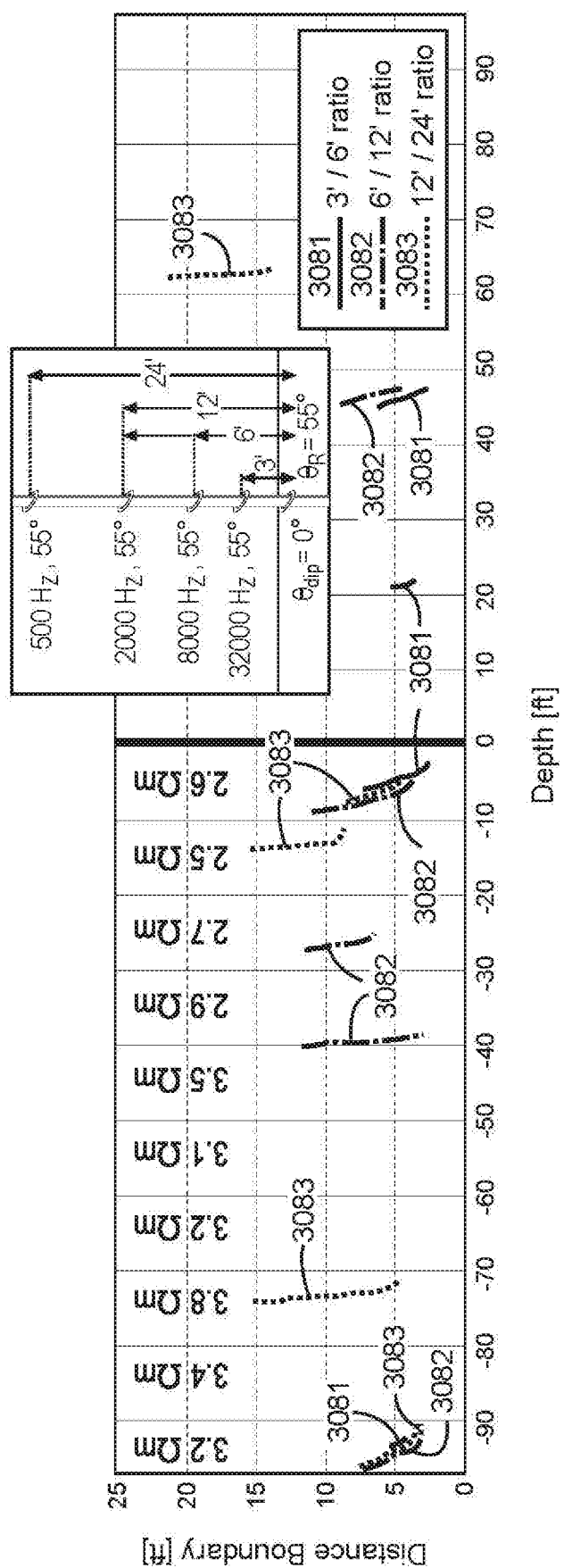
FIG. 30A-B shows inverted distance to boundary and conductivity contrast for an example case, in accordance with various embodiments.
Figure 30B:
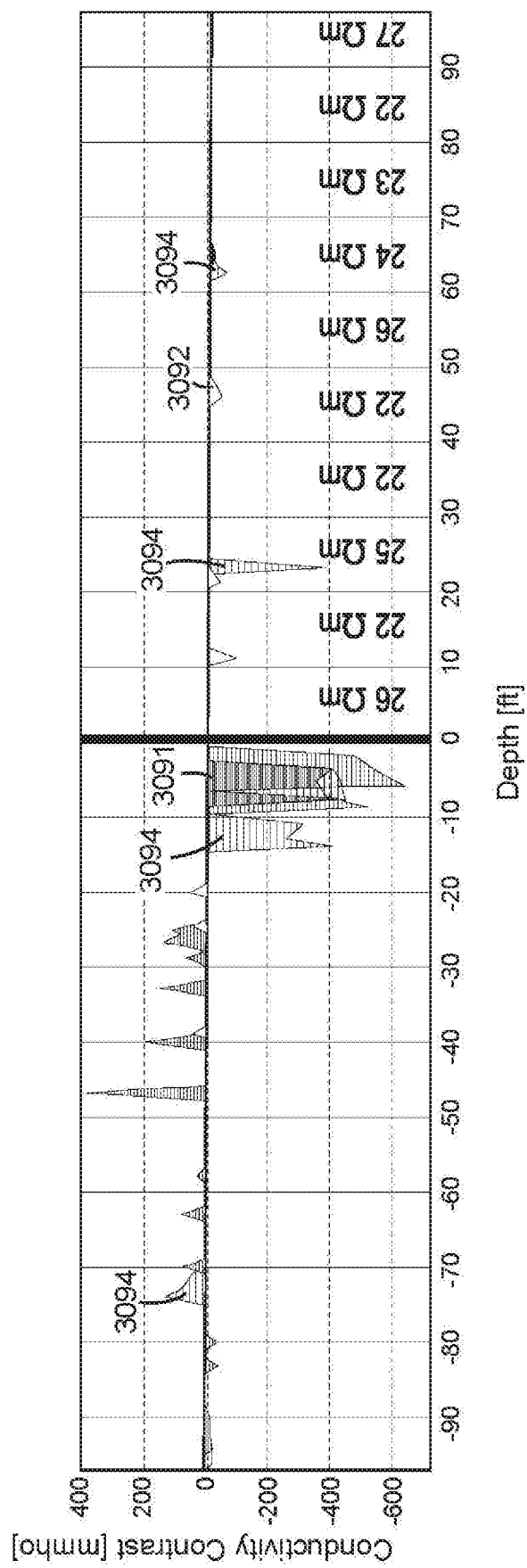

FIGS. 30A-B show inverted distance to boundary and conductivity contrast for the example case of FIG. 29. In this example, multiple spacings are shown from four antennas each at tilt angle of 55° with respective spacings of 3 ft. operating at 32000 Hz, 6 ft. operating at 8000 Hz, 12 ft. operating at 2000 Hz, and 24 ft operating at 500 Hz each from a common antenna with tilt angle of 55°. The inverted distance to boundary and conductivity contrast values can be obtained using the algorithm associated with FIG. 18. In FIG. 30A, curve 3081 shows distance for a ratio of the 3 ft spacing to the 6 ft spacing. Curve 3082 shows distance for a ratio of the 6 ft spacing to the 12 ft spacing. Curve 3083 shows distance for a ratio of the 12 ft spacing to the 24 ft spacing. In FIG. 30B, area 3091 shows conductivity contrast for the 3 ft spacing. Area 3092 shows conductivity contrast for the 6 ft spacing. Area 3094 shows conductivity contrast for the 24 ft spacing. In this case, instead of using the look-ahead signal, the total signals in FIG. 29 are used directly. This can produce good results due to layer signal cancelling property of the measurement which focuses the signal ahead of the tool. Even though this also produces some focusing towards the back of the tool, back sensitivity does not produce artifacts if no large conductivity variations exist at the back of the tool as it approaches the zone boundary. The differential measurement spacing is chosen with Δz=2 ft. in this example, large enough to eliminate effect of measurement noise and small enough to allow small depth of detection measurement. It can be seen from the figure that the two deepest measurements in this example at 24 ft spacing and 12 ft spacing can read distance and resistivity at around 15 feet away from the boundary. Resistivity values obtained from the algorithm are close to the actual contrast of about 300-400 mmho. Distance measurement is also close to the actual values. Using an embodiment of an inversion method as taught herein, determination of the desired parameters can be successful attained, even without fully separating the look-ahead signal and with multiple layers. In additional tests, it has been determined that if no layer signal cancellation is used, signal from multiple layers overwhelm the results and inversion is unsuccessful.

Look-ahead of the bit resistivity tools can make measurements of formations that are not yet drilled, and allow better geosteering decisions to maximize production and reduce dangerous situations such as drilling into pressure abnormalities. Existing efforts have been focused to increasing the sensitivity ahead of the tool, but have not completely addressed the sensitivity around the tool. A tool with large sensitivity around the tool is expected to have much greater difficulties in sensing the signal ahead of the tool. In various embodiments, apparatus are configured to essentially completely eliminate electromagnetic deep reading sensitivity to regions located sideways to the measurement tool and focus ahead of the tool. This arrangement can provide enhanced measurement sensitivity as compared to tools and methods that eliminate the direct signal between a transmitter and its associated receiver on a tool by utilizing special tilt angles. This arrangement may significantly increase the success of the deep reading tool, since one of the biggest sensor physics-related risks is considered to be complications due to layers that are around the tool. Tools arranged and structured to operate according to embodiments similar to or identical to the embodiments taught herein can be used in geosteering and pore pressure measurement applications.

Various components of a measurement tool and a processing unit that generates a look-ahead signal and formation properties ahead of a drill bit using shallow measurements and deep measurements with and without a transmitter-receiver antenna pair oriented to cancel or substantially cancel out signals from layers between the transmitter antenna and the receiver antenna in response to the transmitter being operated down hole in a well, as described herein or in a similar manner, can be realized in combinations of hardware and software implementations. These implementations may include a machine-readable medium having machine-executable instructions, such as a computer-readable medium having computer-executable instructions, for operating a system to control activation of a tool disposed down hole, the tool having an arrangement of transmitter antennas and receiver antennas spaced apart operable in selected transmitter-receiver pairs; to acquire a deep signal from a deep measurement using a transmitter-receiver pair and one or more shallow signals from one or more shallow measurements using one or more other transmitter-receiver pairs; to process the one or more shallow signals, generating a modeled signal relative to regions adjacent sides and back of the tool; and to form a look-ahead signal substantially without contributions from the regions adjacent the tool by processing the deep signal with respect to the modeled signal. The instructions can include instructions to operate a tool having a plurality of transmitter-receiver pairs and process signals from deep measurements and shallow measurements similar to or identical to processes discussed with respect to FIGS. 1-30A-B. The instructions can include instructions to operate a tool and a geosteering operation in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 31:
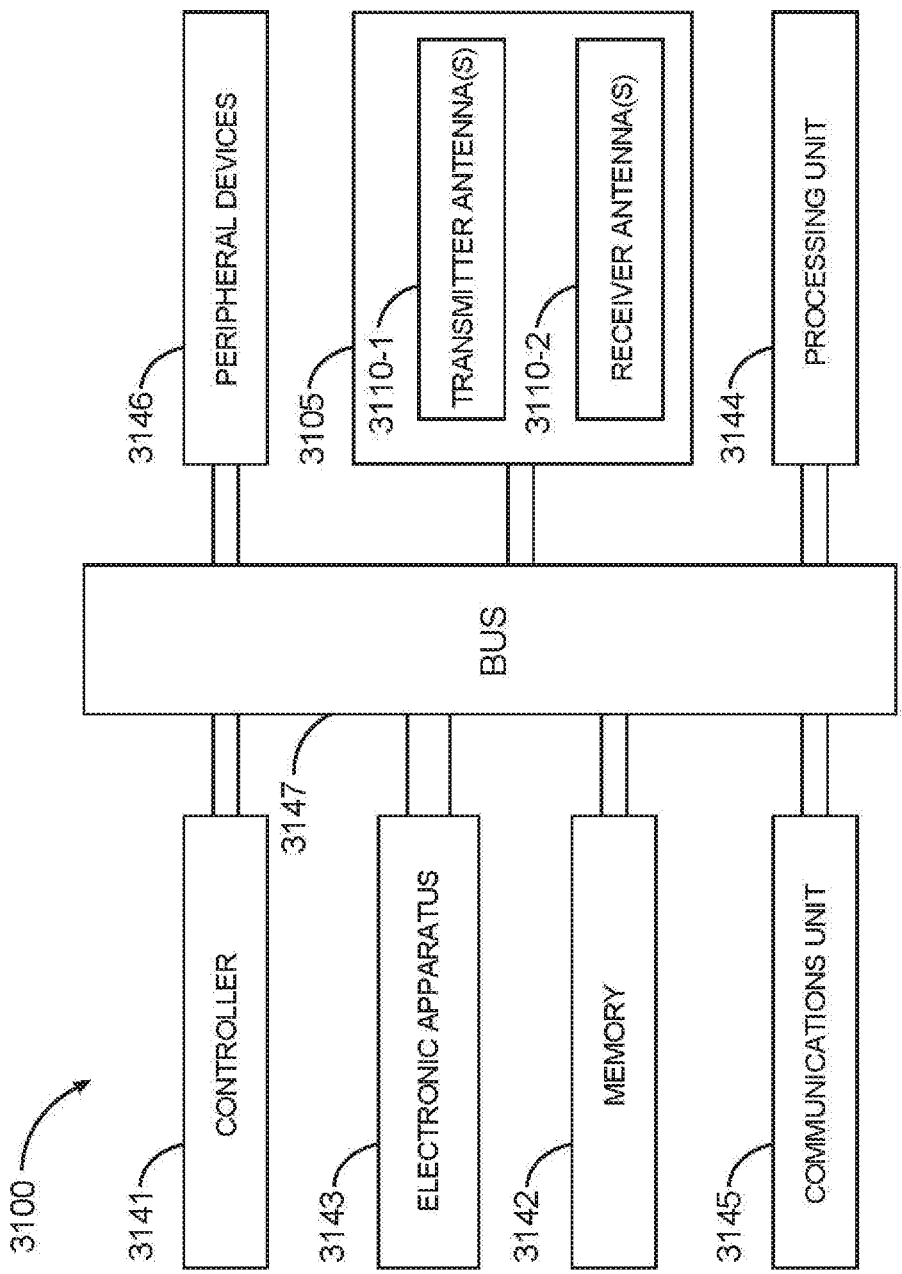
FIG. 31 depicts a block diagram of features of an example system to control activation of arrangements of antennas and process received signals for look-ahead of the bit applications, according to various embodiments.

FIG. 31 depicts a block diagram of features of an embodiment of a system 3100 including a sensor tool 3105 having an arrangement of transmitters and receivers in which measurement signals can be acquired for deep measurements and shallow measurements to generate a look-ahead signal and determine formation properties ahead of a drill bit. The arrangements of transmitters 3110-1 and receivers 3110-2 of sensor tool 3105 can be realized similar to or identical to arrangements discussed herein. The arrangements can include one or more transmitter-receiver antenna pairs arranged to cancel or substantially cancel out signals from layers between the transmitter antenna and the receiver antenna in response to the transmitter being operated down hole in a well.

System 3100 can also include a controller 3141, a memory 3142, an electronic apparatus 3143, and a communications unit 3145. Controller 3141, memory 3142, and communications unit 3145 can be arranged to operate sensor tool 3105 to determine a look-ahead signal and to determine properties of the region ahead of sensor tool 3105. With sensor tool 3105 affixed to a drill string close to or at the drill bit, the region ahead of sensor tool 3105 is the region ahead of the drill bit. Controller 3141, memory 3142, and electronic apparatus 3143 can be realized to include control activation of transmitter antennas and selection of receiver antennas in sensor tool 3105 and to manage processing schemes in accordance with measurement procedures and signal processing as described herein. Communications unit 3145 can include down hole communications in a drilling operation. Such down hole communications can include a telemetry system.

System 3100 can also include a bus 3147, where bus 3147 provides electrical conductivity among the components of system 3100. Bus 3147 can include an address bus, a data bus, and a control bus, each independently configured. Bus 3147 can also use common conductive lines for providing one or more of address, data, or control, the use of which can be regulated by controller 3141. Bus 3147 can be configured such that the components of system 3100 are distributed. Such distribution can be arranged between down hole components such as transmitters and receivers of sensor tool 3105 and components that can be disposed on the surface of a well. Alternatively, the components can be co-located such as on one or more collars of a drill string or on a wireline structure.

In various embodiments, peripheral devices 3146 can include displays, additional storage memory, and/or other control devices that may operate in conjunction with controller 3141 and/or memory 3142. In an embodiment, controller 3141 can be realized as one or more processors. Peripheral devices 3146 can be arranged with a display with instructions stored in memory 3142 to implement a user interface to manage the operation of sensor tool 3105 and/or components distributed within system 3100. Such a user interface can be operated in conjunction with communications unit 3145 and bus 3147. Various components of system 3100 can be integrated with sensor tool 3105 such that processing identical to or similar to the processing schemes discussed with respect to various embodiments herein can be performed down hole in the vicinity of the measurement or at the surface.

Figure 32:
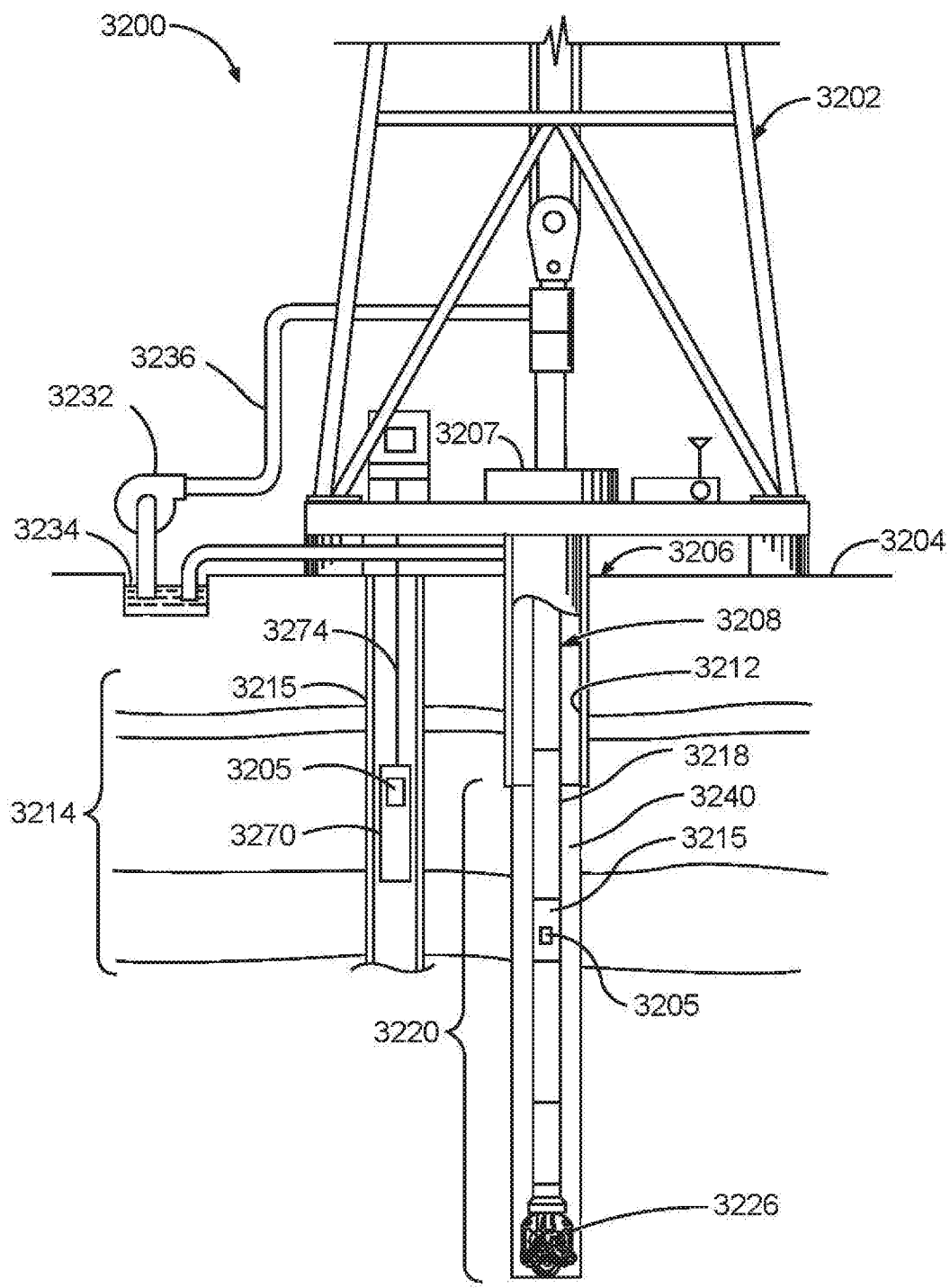
FIG. 32 depicts an embodiment of a system at a drilling site, according to various embodiments.

FIG. 32 depicts an embodiment of a system 3200 at a drilling site, where system 3200 includes a sensor tool 3205 (which may be similar to or identical to the tool 3105 of FIG. 31 in some embodiments) having an arrangement of transmitters and receivers in which measurement signals can be acquired for deep measurements and shallow measurements to generate a look-ahead signal and determine formation properties ahead of a drill bit. The arrangements of transmitters and receivers of sensor tool 3105 can be realized in similar to or identical to arrangements discussed herein. The arrangements can include one or more transmitter-receiver antenna pairs arranged to cancel or substantially cancel out signals from layers between the transmitter antenna and the receiver antenna in response to the transmitter being operated down hole in a well.

System 3200 can include a drilling rig 3202 located at a surface 3204 of a well 3206 and a string of drill pipes, that is, drill string 3208, connected together so as to form a drilling string that is lowered through a rotary table 3207 into a wellbore or borehole 3212. The drilling rig 3202 can provide support for drill string 3208. The drill string 3208 can operate to penetrate rotary table 3207 for drilling a borehole 3212 through subsurface formations 3214. The drill string 3208 can include drill pipe 3218 and a bottom hole assembly 3220 located at the lower portion of the drill pipe 3218.

The bottom hole assembly 3220 can include drill collar 3215, sensor tool 3205, and a drill bit 3226. In various embodiments, sensor tool 3205 can include a sensor located as close as possible to drill bit 3226. The drill bit 3226 can operate to create a borehole 3212 by penetrating the surface 3204 and subsurface formations 3214. Sensor tool 3205 can be structured for an implementation in the borehole of a well as an MWD system such as an LWD system. Sensor tool 3205 can be realized with a housing containing electronics to activate a transmitting source and to collect responses at selected receiving sensors. Such electronics can include a processing unit to analysis signals collected by sensor tool 3205 and provide processed results to the surface over a standard communication mechanism for operating a well. Alternatively, electronics can include a communications interface to provide signals sensed by sensor tool 3205 to the surface over a standard communication mechanism for operating a well, where these sensed signals can be analyzed at a processing unit at the surface.

In various embodiments, sensor tool 3205 may be included in a tool body 3270 coupled to a logging cable 3274 such as, for example, for wireline applications. Tool body 3270 containing sensor tool 3205 can include electronics to activate a transmitting sensor of sensor tool 3205 and collect responses from selected receiving sensors of sensor tool 3205. Such electronics can include a processing unit to analysis signals collected by sensor tool 3205 and provide processed results to the surface over a standard communication mechanism for operating in a well. Alternatively, electronics can include a communications interface to provide signals collected by sensor tool 3205 to the surface over a standard communication mechanism for operating in a well, where these collected signals are analyzed at a processing unit at the surface. Logging cable 3274 may be realized as a wireline (multiple power and communication lines), a mono-cable (a single conductor), and/or a slick-line (no conductors for power or communications), or other appropriate structure for use in bore hole 3212.

During drilling operations, the drill string 3208 can be rotated by the rotary table 3207. In addition to, or alternatively, the bottom hole assembly 3220 can also be rotated by a motor (e.g., a mud motor) that is located down hole. The drill collars 3215 can be used to add weight to the drill bit 3226. The drill collars 3215 also can stiffen the bottom hole assembly 3220 to allow the bottom hole assembly 3220 to transfer the added weight to the drill bit 3226, and in turn, assist the drill bit 3226 in penetrating the surface 3204 and subsurface formations 3214.

During drilling operations, a mud pump 3232 can pump drilling fluid (sometimes known by those of skill in the art as "drilling mud") from a mud pit 3234 through a hose 3236 into the drill pipe 3218 and down to the drill bit 3226. The drilling fluid can flow out from the drill bit 3226 and be returned to the surface 3204 through an annular area 3240 between the drill pipe 3218 and the sides of the borehole 3212. The drilling fluid may then be returned to the mud pit 3234, where such fluid is filtered. In some embodiments, the drilling fluid can be used to cool the drill bit 3226, as well as to provide lubrication for the drill bit 3226 during drilling operations. Additionally, the drilling fluid may be used to remove subsurface formation 3214 cuttings created by operating the drill bit 3226.

Still further embodiments of the invention may be realized. For example, some embodiments include apparatus and systems that operate to convert the lower portion of the BHA into an antenna, using a toroid or a non-conducting gap to form an ABR sensor. This toroid or gap-based ABR sensor is combined with deep measurement using an electromagnetic antenna array to provide an enhanced resistivity measurement.

While these toroid and gap-based ABR embodiments are mechanically easier to construct and place than coils, the combination of an ABR coil or gap sensor and deep measurement coils is not straightforward, because the ABR sensor is based on conduction principles (which does not have a well-defined geometric factor), while the deep measurement sensors are based on electromagnetic induction. Thus, it is noted that in conventional resistivity measurement operations, only induction or conduction is used—not both. One of ordinary skill in the art would therefore not be motivated to mix the different measurements types, since this leads to the increased expense of using different electrical components, separate processing algorithms, etc.

For the purposes of this document, references to a "coil" antenna mean an antenna that can operate as a magnetic dipole equivalent. A coil antenna can be made by winding a wire to form at least one loop in a circle, so that the center of the coil (its azimuthal axis) follows a linear path. References to a "toroid" antenna mean an antenna that can operate as an electric dipole equivalent. A toroid antenna can be made by winding a wire to make several coils, with the center of the coils following a closed circular path. As an example, a toroid can be made by forming a series of coils around a ring-shaped body, such as a torus.

The ABR sensor in these embodiments is fundamentally different when compared to other sensors that can be placed at the bit. Using a toroid or gap as part of the ABR implementation, instead of a simple coil, enables focusing farther ahead of the bit when used in combination with deep measurement sensors. For example, in some cases, the depth of measurement can be doubled.

The processing for the ABR sensor component in this new combination is also different, because a toroidal sensor will have a different resistivity calculation. As will be discussed in more detail below (see method 3711 in FIG. 37), using an ABR sensor that is based on a toroid or gap permits using a very efficient inversion mechanism—one that is not available when a coil-based ABR sensor is used. This is because processing toroid measurement data to determine apparent resistivity can be accomplished by multiplying the measured toroid signal by a tool constant. As a matter of contrast, most coil processing methods make use of a look-up table.

Figure 33:
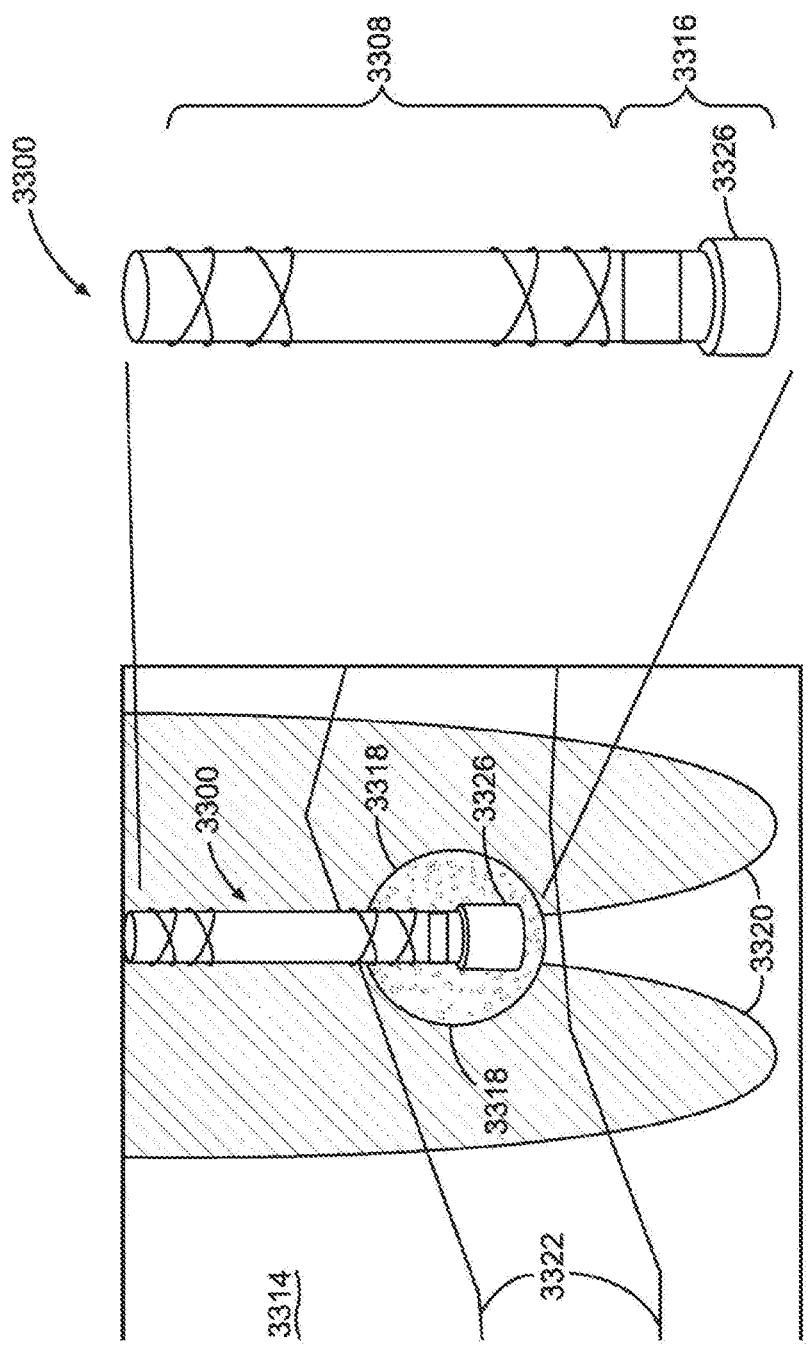
FIG. 33 illustrates an apparatus configured to make combined at-bit and deep measurement resistivity measurements, according to various embodiments of the invention.

FIG. 33 illustrates an apparatus 3300 configured to make combined at-bit and deep measurement resistivity measurements, according to various embodiments of the invention. In some embodiments, the apparatus 3300 comprises a down hole tool. In many embodiments, the apparatus 3300 comprises one or more deep measurement electromagnetic antenna arrays 3308, one or more ABR sensors 3316, and a drill bit 3326.

Due to geometrically and exponentially decreasing sensitivity farther from the tool position, almost all down hole tools are more sensitive to formation features that are near, than those that are far. Furthermore, electrical signals that characterize near and far formation features are usually mixed in non-trivial ways that are resolved by utilizing multiple sensor positions and operation frequencies.

Thus, the apparatus 3300 combines ABR sensor 3316 measurements using formation signals 3318 near the bit 3326, with the deep reading measurements of formation signals 3320 provided by a deep measurement electromagnetic antenna array 3308 to enhance the resolution of the information that can be obtained from ahead of the drill bit 3326. It can be seen from the sub-plot in FIG. 33 that the ABR sensor 3316 can make relatively high resolution measurements of the formation profile down to the bit position, and even 1-2 meters ahead of the bit under ideal conditions, while the deep measurement array 3308 looks further down into the formation 3314. Since the ABR measurements of formation signals 3318 resolve the formation layer boundaries 3322 up to the bit position, the unknowns to be solved by the deep measurement of the array 3308 are significantly reduced. In this way, both depth of detection and reliability of the measurements are enhanced.

Here the apparatus 3300, in the form of a down hole tool, comprises a combination of two systems: the ABR sensor 3316 and the deep measurement array 3308. The deep measurement array 3308 may comprise a multitude of transmitters and a multitude of receivers that may be placed in grooves in the borehole tool assembly, perhaps realized as magnetic dipoles using coils, tilted coils, or solenoids. Pulsed or steady-state signals can be generated to drive the transmitting antennas in the array 3308 and the ABR sensor 3316. The resulting signals interact with the formation 3314 and layer boundaries 3322 in the vicinity of the apparatus 3300 to produce formation signals 3318, 3320 that are picked up by the receivers in the array 3308, and the ABR sensor 3316.

Figure 34:
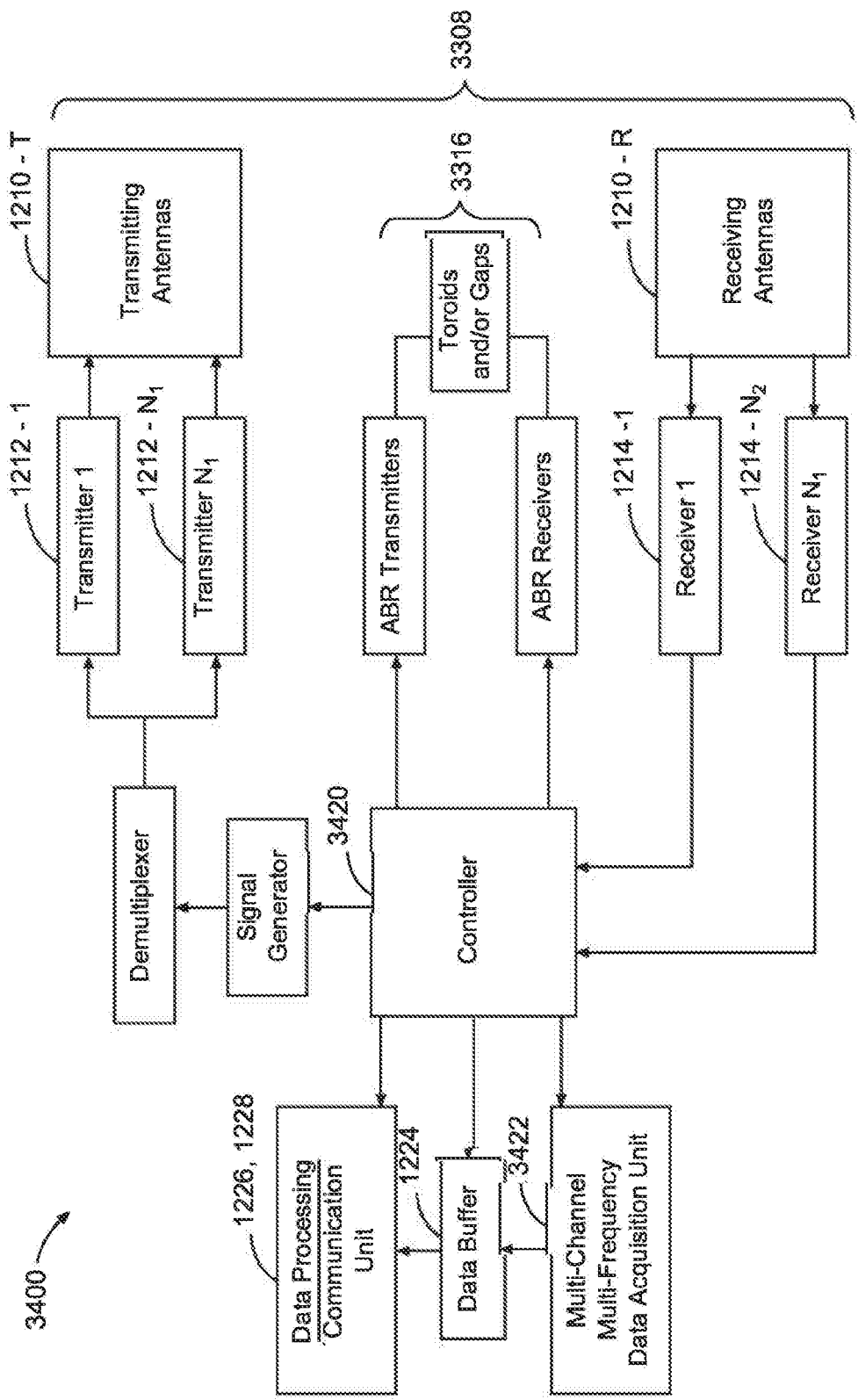
FIG. 34 is a block diagram of a system to acquire at-bit and deep measurement resistivity measurements, according to various embodiments of the invention.

FIG. 34 is a block diagram of a system 3400 to acquire at-bit and deep measurement resistivity measurements, according to various embodiments of the invention. A system controller 3420 operates to drive the transmitters 1212-1 . . . 1212-N1 for the transmitter antennas 1210-T of the deep measurement array 3308. The controller 3420 also drives the ABR transmitters in the ABR sensor 3316. After the signals have interacted with the formation, the controller 3420 collects and records formation signal data to a buffer 1224, optionally applies pre-processing, and then communicates the data to the surface for inversion processing. In some embodiments, the inversion processing and interpretation are accomplished by the data processor 1226 down hole, and the results are communicated to the surface via the communication unit 1228 (e.g., a transceiver). Decisions with respect to starting, stopping, and direction of drilling can also be made down hole by the controller 3420, to improve response time and increase telemetry bandwidth for other tools that might be housed in the BHA.

Figure 35:
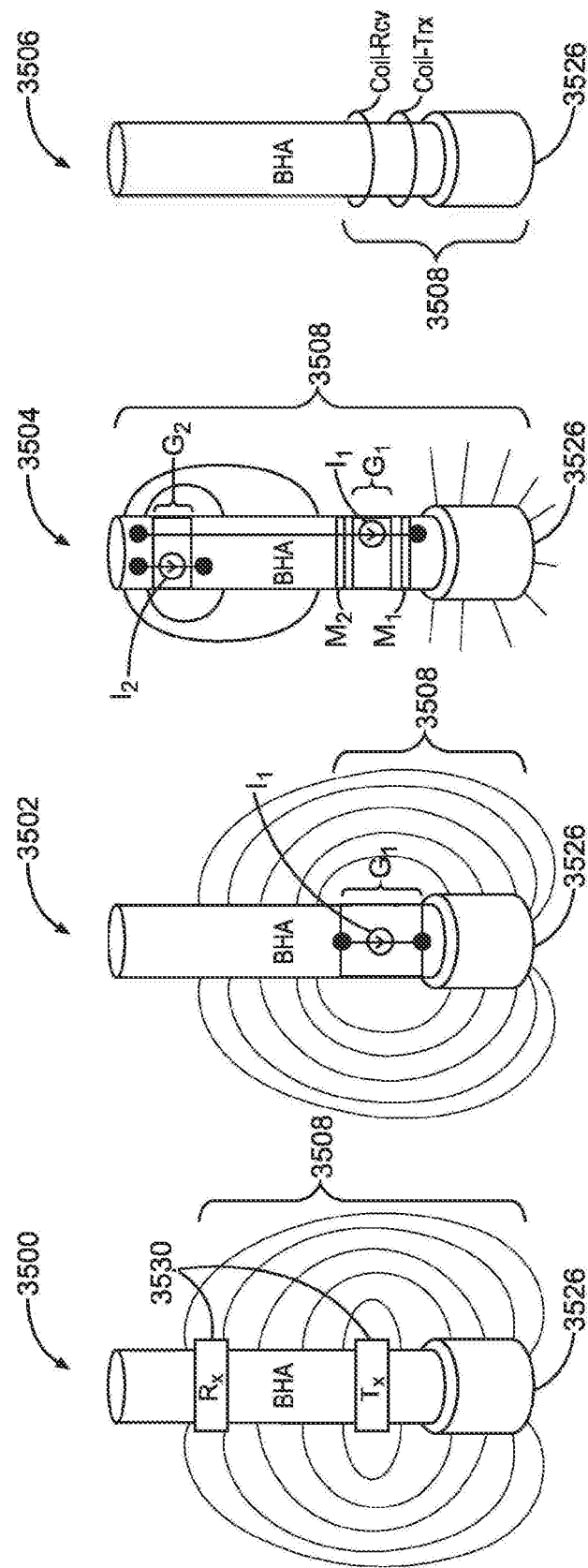
FIGS. 35A-35D illustrate various embodiments of an at-bit resistivity (ABR) sensor, and a supplemental measurement sensor, according to various embodiments of the invention.

FIGS. 35A-35D illustrate various embodiments of an ABR sensor 3500, 3502, 3504, and a supplemental measurement sensor 3506, according to various embodiments of the invention. FIG. 35A is a toroid implementation, FIG. 35B is a gap sub implementation, FIG. 35C is a focused implementation, with two gaps, and FIG. 35D is an inductive implementation (used to supplement ABR measurements made by the primary ABR sensors shown in FIGS. 35A, 35B, 35C). Each implementation includes a bit 3526.

In FIG. 35A, two toroids 3530 are shown. A toroid transmitter Tx and a toroid receiver Rx operate at a relatively high frequency (500-50 KHz). The toroid transmitter Tx can be mounted proximate to the bit 3526, on the bit 3526, or formed within the bit 3526.

In FIG. 35B, a non-conducting gap $G_1$ is used to electrically separate upper and lower portions of the BHA. When a current $I_1$ is injected to travel between the top and bottom portions of the BHA, currents flow through the drilling fluid and the formation (e.g. formations 3214 or 3314). The voltage created across the gap $G_1$ is indicative of the local formation resistivity.

In FIG. 35C, two gaps $G_1$, $G_2$ are used to define three different electrical regions: above, below, and between the gaps $G_1$, $G_2$. Currents $I_1$, $I_2$ are injected in such a way that the voltage difference is reduced to zero between two measurement electrodes $M_1$, $M_2$ that are placed on top of the bottom sub. This "focusing" approach can be achieved using either software or hardware. The final result is based on the voltage between the bottom measure electrode M1 and the topmost part of BHA. It should be noted that a combination of toroid and gap devices can also be used (i.e., a combination of FIGS. 35A and 35B or 35C).

In FIG. 35D, a supplemental measurement sensor 3506 made of coils can be used to make an inductive type of measurement. Due to space restrictions near the bit, this measurement can be a shallow and non-azimuthal. In this case, the transmitter and receiver coils Coil-Trx, Coil-Rcv, respectively are separated by a distance of about 5 cm to 60 cm, and the transmitter coil Coil-Trx is placed as close as possible to the bit 3526, or located on or in the bit 3526 itself.

Figure 36:
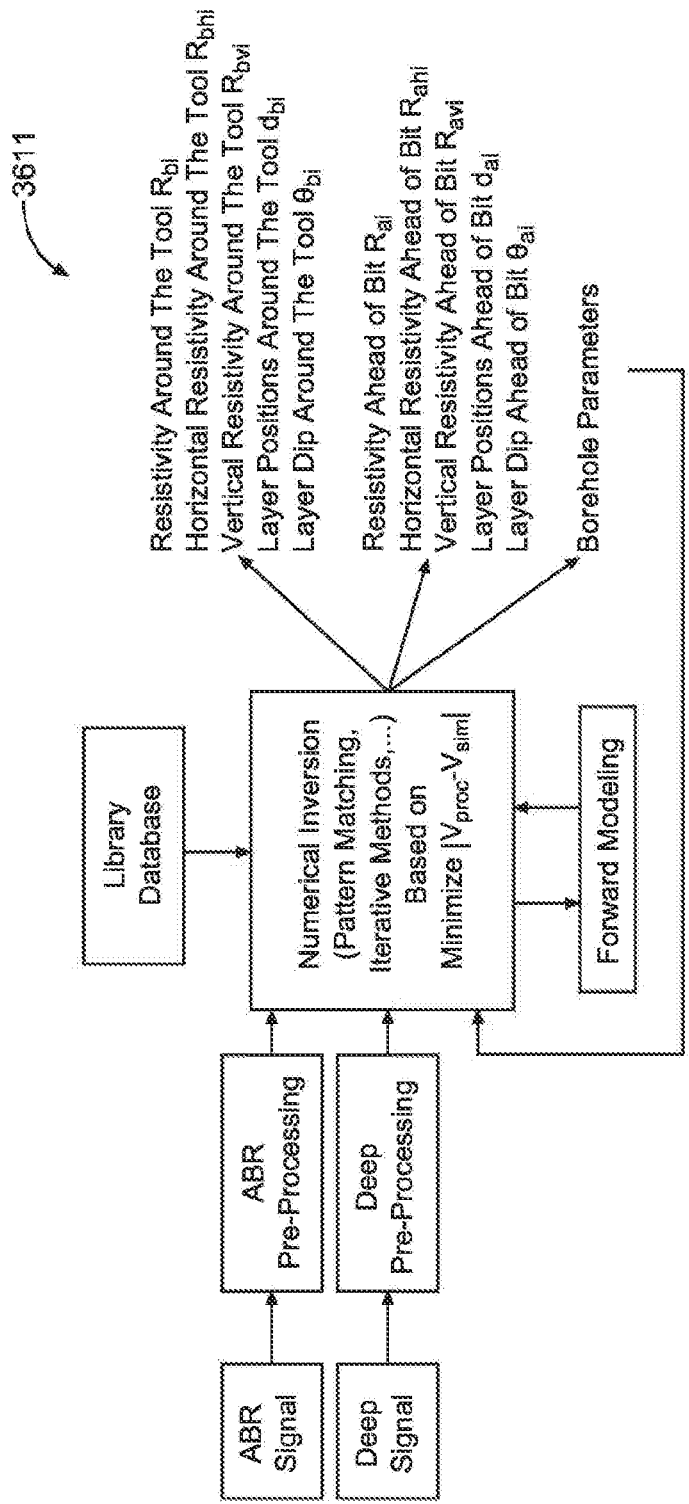
FIG. 36 is a flow diagram for a first method of formation signal processing according to various embodiments of the invention.

FIG. 36 is a flow diagram for a first method 3611 of formation signal processing according to various embodiments of the invention. This is the processing that is applied to the formation signal data after it is acquired.

First, both ABR and deep measurements are made and pre-processing is applied to this formation signal data. Pre-processing, prior to inversion, may include filtering, focusing, conversion to resistivity via table-lookup, multiplication with a tool constant, multi-depth array synthesis, binning, recovery of multiple-components from tool rotation, and azimuthal shifting to pre-determined strike angle.

Second, the pre-processed formation signal values are inverted to produce formation parameters both around the bit and ahead of the bit, to provide electrical and geological properties of the formation. These include layer resistivities, distances, and direction to layers, among others. During inversion, the difference between a modeled signal (e.g., a modeled voltage) and a measured signal (e.g., a measured voltage) is minimized, in an attempt to match the measured signal to the modeled signal. A library database is used to provide input to the numerical inversion process, which produces an enhanced resistivity measurement as a combination of the ABR and deep measurement formation signal measurements.

Finally, drilling decisions can be made based on the available information. In the case of landing, the drilled well approaches the reservoir from above, and the reservoir boundary is detected ahead of time to enable steering the well into the reservoir without overshoot. In the case of well placement, the drilled well is kept inside the reservoir at the optimum position, preferably closer to the top of the reservoir to maximize production. In the case of geostopping, well drilling is stopped before penetrating a possibly dangerous zone. The various embodiments are notably useful in geo-stopping applications, because the depth of investigation for vertical drilling is maximized.

Figure 37:
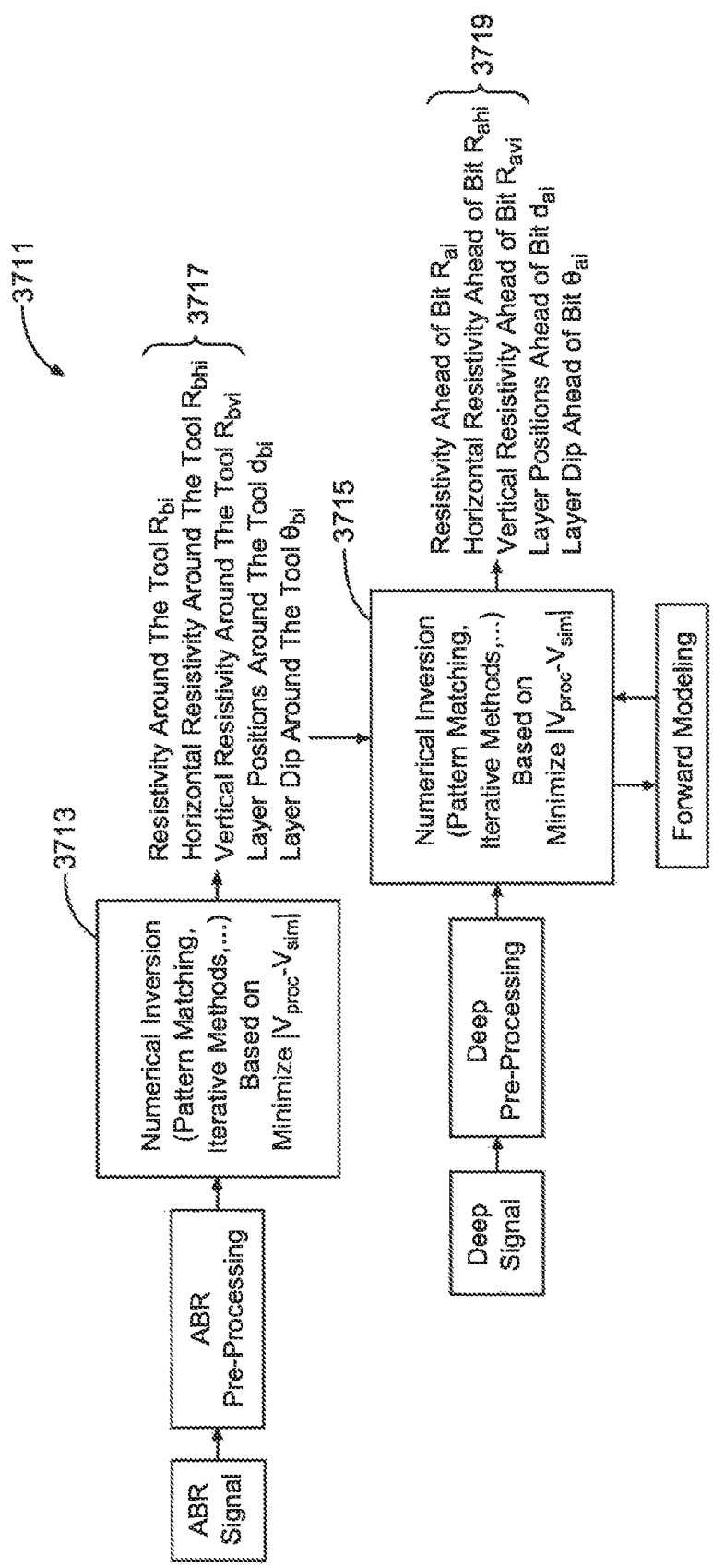
FIG. 37 is a flow diagram for a second method of formation signal processing according to various embodiments of the invention.

FIG. 37 is a flow diagram for a second method 3711 of formation signal processing according to various embodiments of the invention. In the method 3711, a more efficient mechanism to providing an enhanced resistivity measurement is provided by separating the problem into two parts that can be solved sequentially.

First, the ABR formation signal values are inverted to solve for formation parameters all the way down to the bit. Since the ABR sensor has relatively high resolution when compared to deep measurement array, the first inversion 3713 provides a relatively accurate representation of the formation properties, including layer boundaries, up to the bit position. Since an iterative approach is used, no library database need be used to find an intermediate value of resistivity 3717 from the ABR measurements.

Second, using the a priori formation layer information provided by the first inversion 3713, and the intermediate value of resistivity 3717, layers ahead of the bit are processed in a second inversion 3715 to determine an enhanced resistivity value 3719.

It is useful to implement borehole correction for ABR sensor measurements as part of the method 3711. For example, the ABR sensor formation signals can be supplemented by other shallow sensors on the BHA (e.g., see the sensor 3506 in FIG. 35D), or sensors that provide structural or intrinsic dip information.

Figure 38:
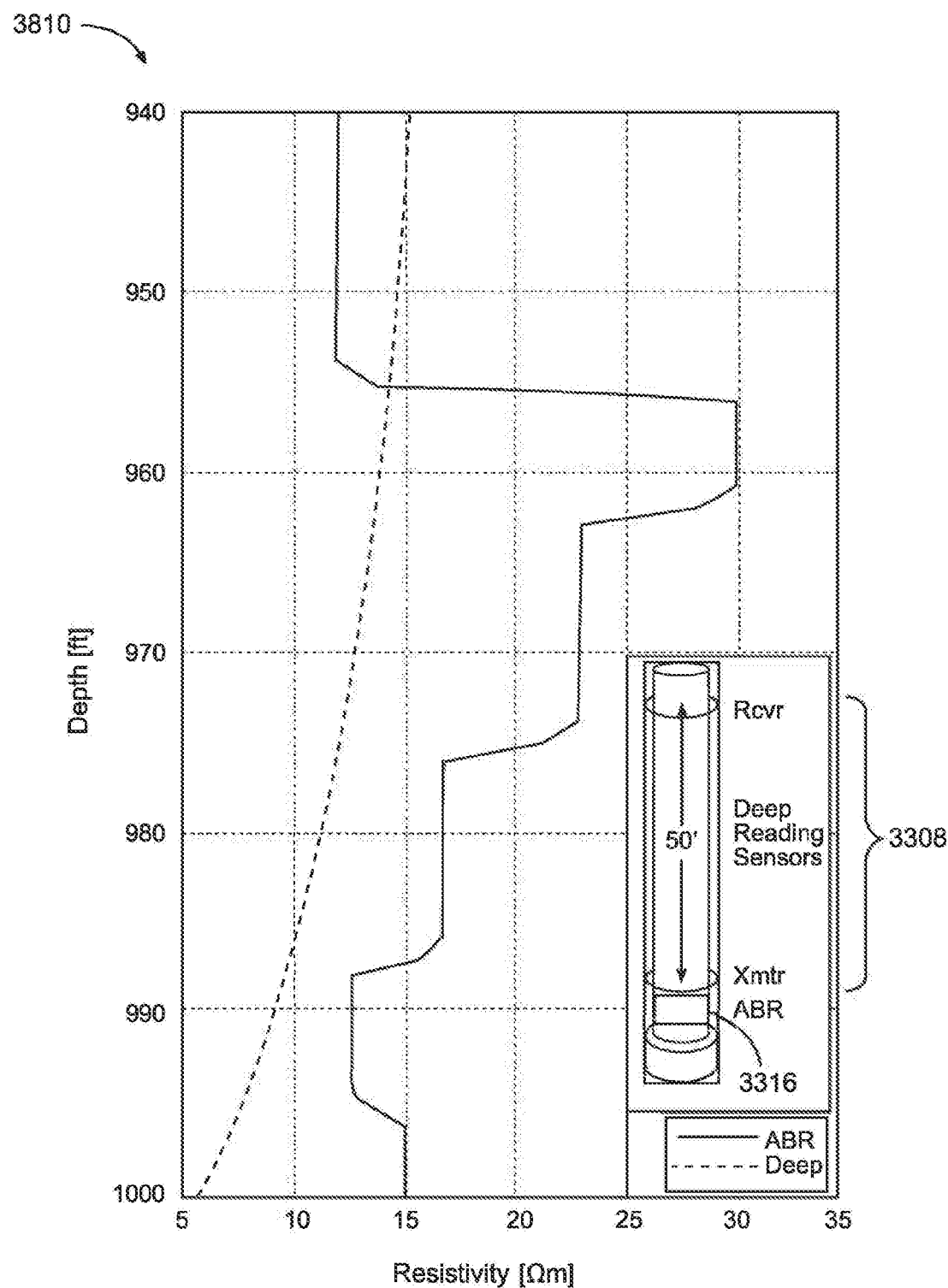
FIG. 38 is a synthetic graph of tool response to formation resistivity, according to various embodiments of the invention.

FIG. 38 is a synthetic graph 3810 of tool response to formation resistivity, according to various embodiments of the invention. Here the log results for the ABR sensor 3316 and deep measurement array 3308 are shown, as obtained from the tool as shown in the figure inset. An excitation drive frequency of 5 KHz was used for the deep measurement array.

In the graph 3810, the ABR measurement results (solid line) are shown after being inverted, using a single layer boundary inversion method. The deep measurement results (dashed line) were obtained using a zero-dimensional inversion algorithm, based on the absolute phase of the measured signal. The formation layer model that was assumed can be seen from the high resolution ABR results, where resistivity ranges from 12 to 30 Ωm. The target is a 1 Ωm formation layer that is at a depth>1000 ft. A dip of 0° was used for all layers, to simulate a vertical drilling scenario.

Figure 39A:
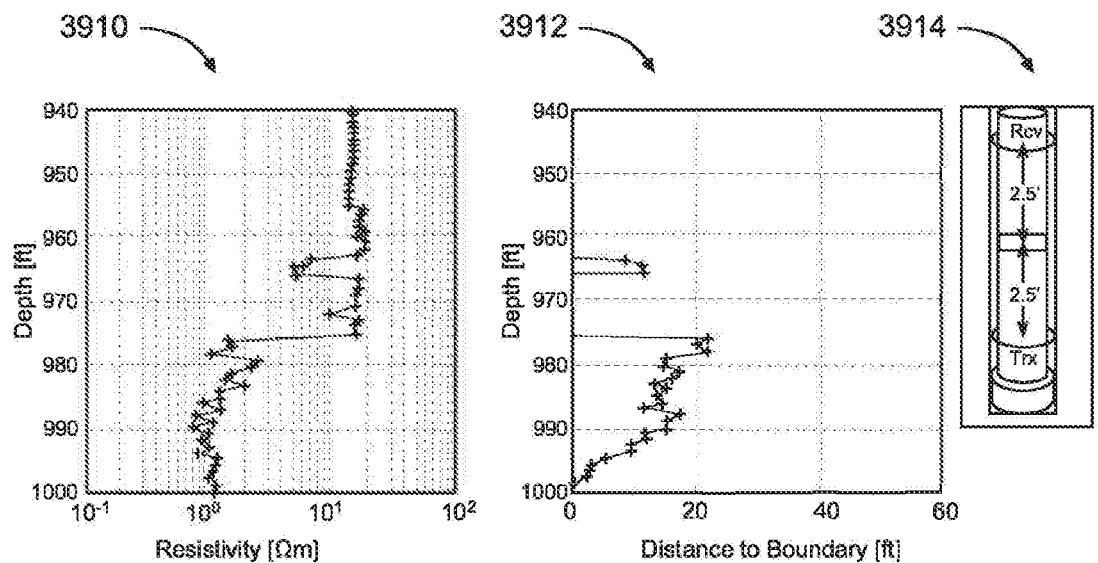
FIGS. 39A and 39B are graphs of inversion results using traditional resistivity measurements, and measurements made according to various embodiments of the invention, respectively.
Figure 39B:
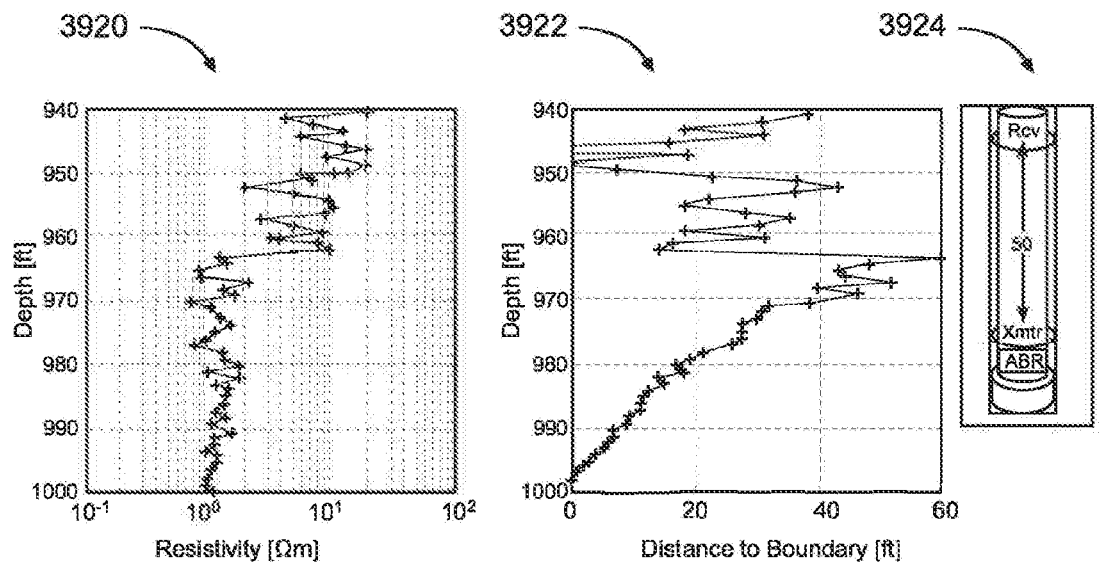

FIGS. 39A and 39B are graphs 3910, 3920 of inversion results using traditional resistivity measurements, and measurements made according to various embodiments of the invention, respectively.

FIG. 39A shows the results of a conventional resistivity 3910 measurement, without using an ARB sensor; a shallow measurement is made 25 feet behind the transmitter in the tool 3914. This distance was chosen because it is not favorable to place a shallow resistivity sensor below the drill motor (due to length limitations, and a sensor placed above the drill motor would be at least 25 feet from the transmitter). With this conventional system, a depth of investigation 3912 of about 22 feet is obtained.

In FIG. 39B, resistivity measurements 3920 are obtained using one of the embodiments described herein, such as the tool 3924. In this case, the shallow ARB sensor measurement is first inverted to provide a priori information that informs a second inversion, for a single layer below the bit. As can be seen in FIG. 39B, the depth of investigation 3922 was increased to about 37 feet.

It should be noted that even though a system based on absolute voltage measurements is shown in the example, a ratio measurement between shared receivers or transmitters (e.g., a receiver can be used to compare signals from two different transmitters, or a transmitter can be driven to provide signals to two different receivers) can also be used to derive a comparison. This can be accomplished by placing two receivers that are axially separated on top of the BHA. In this case, inversion is also based on the amplitude and phase of the complex ratio. The result is a differential measurement that can be used to resolve phase ambiguity, and to cancel (drilling) noise.

FIG. 40 is a block diagram of an apparatus 4000 and system 4046 according to various embodiments of the invention. The apparatus 4000 may comprise a number of components, including those described in the following paragraphs, as well as any of the components of the apparatus shown in FIGS. 33-35. For example, a system 4046 may comprise a surface workstation 4056 and one or more apparatus 4000. The apparatus 4000 in turn may comprise a housing 4004, sensors (e.g., a deep measurement electromagnetic antenna array 4008 and an ABR sensor 4016, among others), and one or more processors 4030. In many embodiments, the housing 4004 comprises an MWD tool or an LWD tool. Thus, the apparatus 4000 may be substituted in place of the apparatus 3205 in FIG. 32.

For the purposes of this document, an "electromagnetic antenna array" comprises antenna elements that include at least one transmitter antenna Xmtr and at least one receiver antenna Rcvr. A "deep measurement electromagnetic antenna array" 4008 is one that can make measurements of formation resistivity and layer positions ahead of the bit 4026 (i.e., layers that are not yet locally penetrated by the bit) in the formation 4014 by at least twice the distance for which the ABR sensor 4016 can make formation resistivity measurements. The processors 4030 can be used to acquire formation signals 4070 from the sensors, and to calculate an enhanced resistivity measurement.

Thus, in some embodiments, a system 4046 comprises a housing 4004, a deep measurement electromagnetic antenna array 4008 attached to the housing 4004, and an ABR sensor 4016 attached to the housing. The deep measurement electromagnetic antenna array 4008 comprises multiple elements including at least one transmitter antenna Xmtr and one receiver antenna Rcvr attached to the housing 4004. The ABR sensor 4016 comprises a drill bit 4026 electrically coupled to a toroid Tx, or to multiple electrodes (shown as large dots in the figure), the electrodes separated by at least one gap (see FIGS. 35B, 35C).

The apparatus 4000 comprises at least one processor 4030 to acquire formation signals 4070 from the deep measurement antenna array 4008 and the ABR sensor 4016, where values of the formation signals 4070 depend on properties of a geological formation 4014. The processors 4030 can be configured to invert the values of the formation signals 4070 to transform the values into an enhanced resistivity measurement for the geological formation 4014. The operation of inverting may comprise determining at least one of relative distance between layers of the geological formation, relative orientation of the layers to the housing 4004, or a resistivity gradient of the layers, wherein the layers are not locally penetrated by the bit 4026.

The processor(s) 4030 forming part of the apparatus 4000 and system 4046 may be attached to the housing 4004, or located in a workstation 4056 at a surface 4066 of the geological formation 4014, or both. Thus, the formation signal processing tasks within the system 4046 can be divided between two or more processors 4030, comprising a surface computer workstation 4056 and a sub-surface processor 4030 communicatively coupled to the workstation 4056.

The deep measurement antenna array 4008 may comprise multiple transmitter antennas Xmtrs and receiver antennas Rcvrs. One of the antennas may be located below the drill motor MOTOR, between the drill motor MOTOR and the drill bit 4026, and one of the antennas may be located above the drill motor MOTOR, away from the bit 4026. Thus, antenna elements in the array 4008 may be disposed on either side of the drill motor MOTOR, with one or more elements proximate to the bit 4026, or built on or into the bit itself 4026. Thus, in some embodiments, one of the elements in the deep measurement antenna array 4008 is located on one side of a drill motor MOTOR and another one of the elements in the deep measurement antenna array 4008 is located on another side of the drill motor MOTOR. In other words, the drill motor MOTOR is located between two elements of the deep measurement antenna array 4008.

The electromagnetic receiver antenna array (e.g., receiving antennas Rcvrs) may comprise a variety of physical devices, including a "solenoid", which is a coil having a height at least twice its diameter. Thus, the electromagnetic receiver antenna array may comprise at least one of a coil, a tilted coil, or a solenoid.

As noted previously, ABR sensor gaps may be formed to reduce or substantially cancel voltage differences between monitor electrodes. Thus, referring now to FIGS. 35C and 40, it can be seen that a voltage between monitor electrodes M1, M2 can be reduced by adjusting the voltages of current electrodes (conductive parts of the drill string that do not include the monitor electrodes M1, M2). This procedure may be known as "focusing" to those of ordinary skill in the art. It can be accomplished using hardware (by physically adjusting the currents in the current electrodes via a feedback loop), or using software (where multiple unfocused measurements are collected, and then summed with weights that reduce the measurement electrode voltage differences to a value of zero). Thus, in some embodiments, the gaps of an ABR sensor 4016 may be arranged to reduce voltage differences between monitor electrodes.

The apparatus 4000 may comprise logic 4040 to acquire and record the formation signals 4070 in a memory 4050, perhaps as part of a database 4034 that includes inverted results of the measurements made by the array 4008 and the ABR sensor 4016. The values of the signals 4070, as well as the inversion results, may be published to one of a storage medium (e.g., memory 4050), a hardcopy printout, or a display (e.g., a display on the workstation 4056). The logic 4040 may comprise part of a down hole data acquisition system 4024.

Telemetry can be used to communicate values of the signals 4070, whether pre-processing is applied or not, to the surface 4066. Thus, the apparatus 4000 may comprise a telemetry transmitter (e.g., as part of a transceiver 4044) to communicate the signals 4070, values derived from the signals 4070, as well as inversion results, to a workstation 4056 at the surface 4066.

In some embodiments, the apparatus 4000 comprises an article of manufacture, including a specific machine, according to various embodiments of the invention. For example, upon reading and comprehending the content of this disclosure, one of ordinary skill in the art will understand the manner in which a software program can be launched from a computer-readable medium (e.g., the memory 4050, which may be included down hole, in the workstation 4056, or both) in a computer-based system to execute the functions defined in the software program by a set of instructions.

One of ordinary skill in the art will further understand the various programming languages that may be employed to create one or more software programs designed to implement and perform the methods disclosed herein. The programs may be structured in an object-orientated format using an object-oriented language such as Java or C++. In some embodiments, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 4030 coupled to a machine-readable medium 4050 such as a memory (e.g., removable storage media, as well as any memory including an electrical, optical, or electromagnetic conductor comprising non-transitory, tangible media) having instructions stored thereon (e.g., computer program instructions), which when executed by the one or more processors 4030 result in the machine performing any of the actions described with respect to the methods in this document.

The machine may take the form of a specific computer system having a processor 4030 coupled to a number of components directly (e.g., the logic 4040, the transceiver 4044, and/or the array 4008 and ABR sensor 4016, perhaps using a bus or some other communication channel, either wired or wireless. Thus, the machine may be similar to or identical to the workstation 4056, or the apparatus 4000 in some embodiments. In this case, some embodiments comprise a machine-readable storage device (e.g., the memory 4050) having instructions stored thereon, which, when performed by a machine, cause the machine to perform operations, the operations comprising any of the methods described in this document. Additional examples of these methods will now be described.

Figure 41:
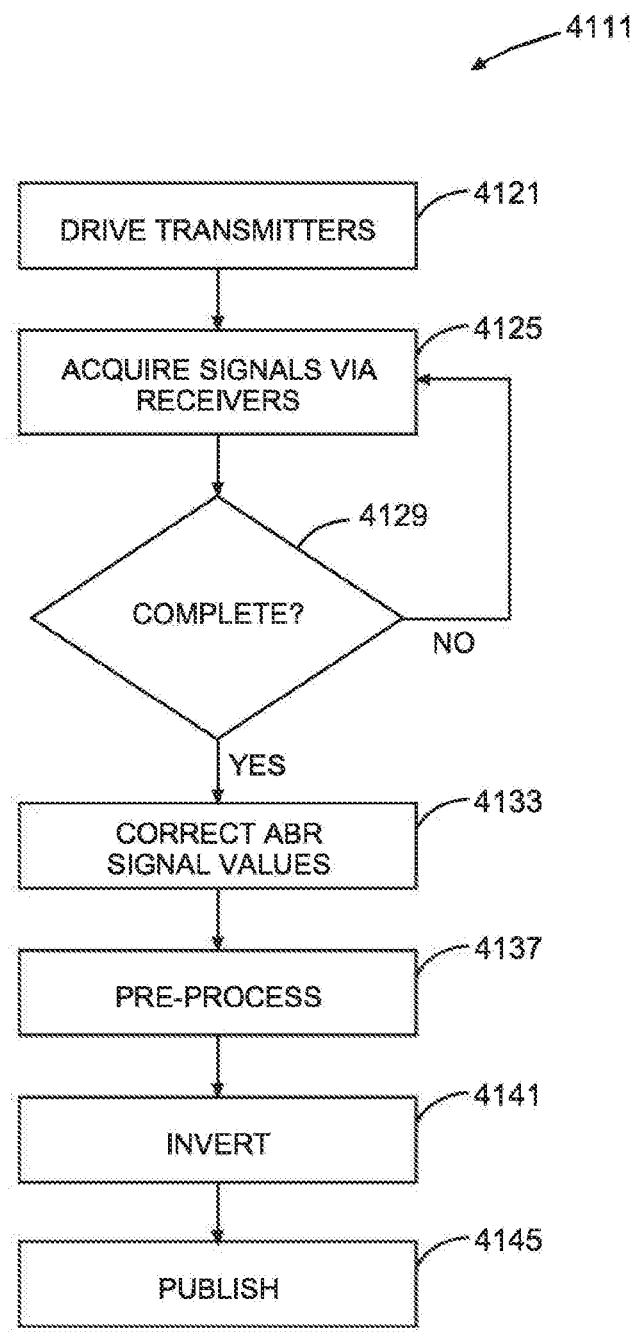
FIG. 41 is a flow chart illustrating several methods according to various embodiments of the invention.

Thus, FIG. 41 is a flow chart illustrating several methods 4111 according to various embodiments of the invention. For example, a processor-implemented method 4111 to execute on one or more processors that perform the methods to may comprise acquiring deep measurement and ABR signals, and processing the signals via inversion (e.g., a two-stage inversion) to provide an enhanced sensitivity measurement.

A transmitter array can be driven using pulsed or steady-state signals to excite receivers in the deep measurement antenna array. Thus, in some embodiments, the method 4111 may begin at block 4121 with driving one or more transmitter antennas with a pulsed or steady state transmission signal to provide the formation signals in the geological formation.

The method 4111 may continue on to block 4125 acquiring formation signals from the deep measurement electromagnetic antenna array and an ABR sensor, values of the formation signals depending on properties of a geological formation. The deep measurement electromagnetic antenna array may comprise multiple elements including at least one transmitter antenna and one receiver antenna. The ABR sensor may comprise a drill bit electrically coupled to a toroid, or to multiple electrodes separated by one or more gaps.

The deep measurement antenna array may be arranged to provide a differential measurement that resolves phase ambiguity, and helps reduce drilling noise. Thus, the activity at block 4125 may comprise acquiring formation signals from shared transmitter or receiver elements in the deep measurement antenna array to form a complex amplitude ratio of measured amplitude and phase or a phase difference.

The deep measurement antenna array may be designed to sense formation resistivity at a distance of at least four times what can be measured by the ABR sensor, with the same degree of accuracy. Thus, in some embodiments, the deep measurement antenna array is one that can make measurements of formation resistivity and layer positions ahead of the bit by at least four times the distance for which the ABR sensor can make formation resistivity measurements.

The ABR sensor may comprise additional elements (e.g., see FIG. 35D) that are used to make inductive measurements, to supplement the measurements made by the toroid or electrodes. Thus, in some embodiments, the ABR sensor is used to provide some of the formation signals by making inductive, non-azimuthal measurements.

The method 4111 may continue on to block 4129 to determine whether acquisition of the formation signals is complete. If not, then the method 4111 may return to block 4125, to continue acquisition of the signals. If so, then the method 4111 may continue on to block 4133.

ABR sensor signals can be corrected for borehole effects, since borehole conductivity can modify resistivity measurements. Thus, in some embodiments, the method 4111 comprises, at block 4133, correcting the values of the formation signals provided by the ABR sensor for borehole effects.

Other shallow-depth sensors, such as closely-spaced transmitter-receiver pairs, can be used to correct ABR sensor signal values. Thus, the activity of correcting at block 4133 may involve the use of signals provided by an induction sensor comprising a sensor transmitter antenna and a sensor receiver antenna arranged to sense local resistivity of the formation directly in front of the drill bit.

The formation signals acquired by the array and ABR sensor can be processed in a number of ways, prior to inverting their corresponding values. For example, the method 4111 may include, at block 4137, pre-processing the formation signals prior to inversion by applying at least one of filtering, focusing to increase resolution, converting measured resistivity values via table lookup, multiplication by a tool constant, multi-depth array signal synthesis, binning, recovery of multiple-components from tool rotation, or azimuthal shifting to a pre-determined strike angle.

The method 4111 may continue on to block 4141 to include inverting the values of the formation signals to transform the values into an enhanced resistivity measurement for the geological formation, wherein the inverting comprises determining at least one of relative distance between layers of the geological formation, relative orientation of the layers to a housing, or a resistivity gradient of the layers, wherein the layers are not locally penetrated by the bit.

The inversion can be applied to determine electrical and geological properties of the formation. Thus, the activity at block 4141 may comprise inverting the values of the formation signals to transform the values into measures of formation parameters comprising electrical properties or geological properties. The electrical properties or geological properties may include one or more of layer resistivities, distances to layers, or directions to layers.

Inversion may be accomplished as part of a sequential process (e.g., as shown in FIG. 37), using a first inversion of the values obtained from one sensor to serve as a basis for a second inversion of the values obtained from another sensor. Thus, the activity of inverting at block 4141 may comprise a sequential process that includes inverting the values of the formation signals provided by the ABR sensor to serve as a basis for inverting the values of the formation signals provided by the deep measurement antenna array.

Many different inversion processes can be applied at each stage. For example, a single layer boundary inversion can be used to invert ABR sensor signal values. Thus, the activity of inverting at block 4141 may comprise inverting the values of the formation signals provided by the ABR sensor with a single layer boundary inversion. In another example, inverting values of the signals provided by the deep measurement antenna array can be based on absolute phase values. Thus, the activity of inverting at block 4141, may comprise inverting the values of the formation signals provided by the deep measurement antenna array based on absolute phase values of the formation signals provided by the deep measurement antenna array.

In the two-stage process illustrated in FIG. 37, inverting the ABR signal values can provide an intermediate resistivity value, which is refined by using the intermediate resistivity value as input to an inversion of the deep measurement antenna array signal values. Thus, the activity of inverting at block 4141 may comprise inverting the values of the formation signals provided by a toroid in the ABR sensor to provide an intermediate resistivity value, the intermediate resistivity value to be transformed into the enhanced resistivity value by an inversion of the values of the formation signals provided by the deep measurement antenna array.

In many embodiments, the method 4111 continues on to block 4145 to include publishing the formation signal values, the intermediate resistivity values, or enhanced resistivity values, among others, to one or more of a storage medium, a hardcopy printout, or a display. Examples of what might be published at block 4145 include any of the inversion result values shown in FIGS. 36 and 37.

Additional activities forming a part of the methods 4111 are listed in the activities for methods claimed below, and described above with respect to FIGS. 2, 13-18, and 36-37. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Other activities may be substituted, one for another. Information, including parameters, commands, operands, and other data, can be sent and received in the form of one or more carrier waves.

In conclusion, it can be noted that by using the apparatus, systems, and methods disclosed herein, those in the petroleum recovery industry and other industries may now be able to more accurately and rapidly assess the properties of boreholes and geologic formations, including at significant distances ahead of the bit. By combining deep reading sensors and an ABR sensor, resistivity information for the layers all the way down to the bit, and beyond, can be determined. The depth of investigation can be almost doubled in some cases. Thus, geo-stopping applications can be more effective, so that increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. A system, comprising:
   a housing;
   a deep measurement electromagnetic antenna array comprising at least one transmitter antenna and at least one receiver antenna attached to the housing;
   an at-bit resistivity (ABR) sensor, wherein the ABR sensor comprises a toroid or multiple electrodes, the electrodes separated by at least one gap;
   a processor; and
   a machine-readable medium having stored therein instructions executable by the processor to cause the system to,
      apply a first numerical inversion to signals measured with the ABR sensor to determine apparent resistivity values;
      based at least partly on the apparent resistivity values, apply a second numerical inversion to signals measured by the deep measurement electromagnetic antenna array to determine ahead of bit resistivity values; and
      publish ahead of bit resistivity values generated from the second numerical inversion.

2. The system of claim 1, wherein one of the antennas of the deep measurement electromagnetic antenna array is located below a drill motor and another one of the antennas of the deep measurement electromagnetic antenna array is located above the drill motor.

3. The system of claim 1, wherein the ABR sensor comprises a toroid or multiple electrodes electrically coupled to a drill bit.

4. The system of claim 1, further comprising:
   a measurement while drilling tool or a logging while drilling tool, wherein the measurement while drilling tool or logging while drilling tool further comprises the housing.

5. The system of claim 1, wherein the deep measurement electromagnetic antenna array comprises a magnetic dipole antenna.

6. The system of claim 1, wherein the instructions executable by the processor to cause the system to apply a first numerical inversion comprise instructions to:
   iteratively minimize a difference between a measured ABR signal and a modeled ABR signal, wherein the modeled ABR signal of each iteration is based at least partly on one or more estimated apparent resistivity values of a preceding iteration.

7. The system of claim 1, wherein instructions executable by the processor to cause the system to apply a second numerical inversion comprise instructions to:
   iteratively minimize a difference between a measured deep electromagnetic antenna array signal and a modeled deep electromagnetic antenna array signal, wherein the modeled deep electromagnetic antenna array signal of each iteration is based at least partly on estimated ahead of bit resistivity values of a preceding iteration.

8. A method comprising:
   acquiring first formation signals from a deep measurement electromagnetic antenna array comprising at least one transmitter antenna and at least one receiver antenna;
   acquiring second formation signals from an at-bit resistivity (ABR) sensor, wherein the ABR sensor comprises a toroid or multiple electrodes, the electrodes separated by at least one gap;
   inverting values of the second formation signals to determine apparent resistivity values;
   inverting values of the first formation signals to determine ahead of bit resistivity values based at least partially on an output of the inverting of the second formation signals; and
   publishing ahead of bit resistivity values generated by the inverting of the first formation signals.

9. The method of claim 8, wherein acquiring first formation signals from a deep measurement electromagnetic antenna array comprises:
   driving at least one transmitter antenna with a pulsed or steady state transmission signal; and
   acquiring formation signals from at least one receiver antenna.

10. The method of claim 8, wherein acquiring formation signals further comprises:
    at least one of filtering, focusing to increase resolution, converting measured resistivity values via table lookup, multiplication by a tool constant, multi-depth array signal synthesis, binning, recovery of multiple components from tool rotation, or azimuthal shifting to a pre-determined strike angle.

11. The method of claim 8, wherein inverting the values of the second formation signals further comprises:
    calculating at least one of formation parameters comprising electrical properties or geological properties.

12. The method of claim 11, wherein the at least one of formation parameters comprise at least one of layer resistivities, distances to layers, or directions to layers.

13. The method of claim 8, wherein acquiring the values of the second formation signals from an ABR sensor further comprises:
    acquiring the second formation signals by making inductive, non-azimuthal measurements.

14. The method of claim 8, wherein inverting the values of the first formation signals comprises:
    inverting the values of the first formation signals based at least in part on the apparent resistivity.

15. The method of claim 8, wherein inverting the values of the second formation signals to determine apparent resistivity further comprises:
correcting the values of the second formation signals for borehole effects.

16. The method of claim 15, wherein the correcting further comprises:
acquiring signals from an induction sensor, wherein an induction sensor comprises a sensor transmitter antenna and a sensor receiver antenna; and
determining local resistivity of a formation directly in front of a drill bit based, at least in part, on signals from the induction sensor.

17. The method of claim 8, wherein inverting the values of the second formation signals comprises:
inverting the values of the second formation signals based at least in part on a single layer boundary inversion.

18. The method of claim 8, wherein inverting the values of the first formation signals comprises:
inverting the values of the first formation signals based on their absolute phase values.

19. The method of claim 8, wherein acquiring second formation signals from an ABR sensor comprises:
acquiring second formation signals from a toroid or multiple electrodes, the electrodes separated by at least one gap, electrically coupled to a drill bit.

20. The method of claim 8, wherein acquiring first formation signals comprises:
acquiring formation signals from at least two of the at least one transmitter antenna and the at least one receiver antenna in the deep measurement electromagnetic antenna array; and
forming at least one of a complex amplitude ratio of measured amplitude and phase or a phase difference.

21. The method of claim 8, wherein acquiring first formation signals comprises acquiring first formation signals ahead of a drill bit by at least four times further than a distance at which second formation signals are acquired.

22. The method of claim 8, wherein acquiring first formation signals from the deep measurement electromagnetic antenna array comprises acquiring first formation signals from a magnetic dipole antenna.

23. The method of claim 8, wherein inverting the values of the second formation signals to determine apparent resistivity values comprises iteratively minimizing a difference between the second formation signals and a modeled second formation signal based at least in part on one or more estimated apparent resistivity values of a preceding iteration, and wherein inverting the values of the first formation signals to determine ahead of bit resistivity values based at least partially on the output of the inverting of the second formation signals comprises iteratively minimizing a difference between the first formation signals and a modeled first formation signal based at least in part on estimated ahead of bit resistivity values of a preceding iteration.

24. A non-transitory machine-readable medium having stored therein instructions executable to:
acquire first formation signals from a deep measurement electromagnetic antenna array comprising at least one transmitter antenna and at least one receiver antenna, and
acquire second formation signals from an at-bit resistivity (ABR) sensor, wherein the ABR sensor comprises a toroid or multiple electrodes, the electrodes separated by at least one gap;
invert values of the second formation signals to determine apparent resistivity values;
invert values of the first formation signals to determine ahead of bit resistivity values based at least partially on inversion of the second formation signals; and
publish ahead of bit resistivity values generated by inversion of the first formation signals.

25. The machine-readable media of claim 24, wherein instructions executable to acquire first formation signals from a deep measurement electromagnetic antenna array comprises program code to:
drive the at least one transmitter antenna with a pulsed or steady state transmission signal.

26. The machine-readable media of claim 24, wherein instructions executable to acquire second formation signals from an ABR sensor the further comprise program code to:
process the second formation signals by applying at least one of filtering, focusing to increase resolution, converting measured resistivity values via table lookup, multiplication by a tool constant, multi-depth array signal synthesis, binning, recovery of multiple components from tool rotation, or azimuthal shifting to a pre-determined strike angle.

27. The machine-readable media of claim 24, wherein instructions executable to invert values of the first formation signals further comprises program code to:
calculate formation parameters comprising electrical properties or geological properties based, at least in part, on inverting formation signals from the deep measurement electromagnetic antenna array.

28. The machine-readable media of claim 27, wherein the electrical properties or geological properties comprise at least one of layer resistivities, distances to layers, or directions to layers.

29. The machine-readable media of claim 24, wherein the second formation signals comprise inductive, non-azimuthal measurements.

30. The machine-readable media of claim 24, wherein instructions executable to invert the values of the first formation signals comprise program code to:
invert the values of the first formation signals based at least in part on the apparent resistivity.

31. The machine-readable media of claim 24, wherein instructions executable to invert the values of the second formation signals further comprises program code to:
correct the values of the second formation signals based, at least in part, on borehole effects.

32. The machine-readable media of claim 31, wherein instructions executable to correct the values of the second formation signals further comprises program code to:
acquire signals from an induction sensor, wherein an induction sensor comprises a sensor transmitter antenna and a sensor receiver antenna; and
determine local resistivity of a formation directly in front of a drill bit based, at least in part, on signals from the induction sensor.

33. The machine-readable media of claim 24, wherein instructions executable to invert values of the second formation signals comprises program code to:
invert the values of the second formation signals based, at least in part, on a single layer boundary inversion.

34. The machine-readable media of claim 24, wherein instructions executable to invert values of the first formation signals comprises program code to:
invert the values of the first formation signals based, at least in part, on their absolute phase values.

35. The machine-readable media of claim 24, wherein instructions executable to acquire second formation signals comprises program code to:

acquire second formation signals from a toroid or multiple electrodes, the electrodes separated by at least on gap, electrically coupled to a drill bit.

36. The machine-readable media of claim 24, wherein instructions executable to acquire first formation signals comprises program code to:

acquire formation signals from at least two of the at least one transmitter and the at least one receiver antenna in the deep measurement electromagnetic antenna array; and form at least one of a complex amplitude ratio of measured amplitude and phase or a phase difference.

37. The machine-readable media of claim 24, wherein instructions executable to acquire first formation signals comprises program code to:

acquire formation signals ahead of a drill bit by at least four times further a distance than for which the first formation signals are acquired.

38. The non-transitory machine-readable storage device of claim 24, wherein instructions executable to acquire first formation signals from the deep measurement electromagnetic antenna array comprise program code to:

acquire first formation signals from at least one magnetic dipole antenna.

39. The non-transitory machine-readable storage device of claim 24, wherein instructions executable to invert the values of the second formation signals to determine apparent resistivity values further comprise instructions to:

iteratively minimize a difference between the second formation signals and a modeled second formation signal, wherein the modeled second formation signal of each iteration is based at least in part on one or more estimated apparent resistivity values of a preceding iteration.

40. The non-transitory machine-readable storage device of claim 24, wherein instructions executable to invert the values of the first formation signals to determine ahead of bit resistivity values further comprise instructions to:

iteratively minimize a difference between the first formation signals and a modeled first formation signal, wherein the modeled first formation signal of each iteration is based at least in part on the ahead of bit resistivity values.

* * * * *